(12) United States Patent
Chung

(10) Patent No.: US 9,830,674 B2
(45) Date of Patent: *Nov. 28, 2017

(54) BIOMETRIC REGISTRATION AND/OR VERIFICATION SYSTEM AND METHOD

(71) Applicant: AMERASIA INTERNATIONAL TECHNOLOGY, INC., Princeton Junction, NJ (US)

(72) Inventor: Kevin Kwong-Tai Chung, Princeton, NJ (US)

(73) Assignee: Amerasia International Technology, Inc., Princeton Junction, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,184

(22) Filed: Jun. 21, 2016

(65) Prior Publication Data

US 2016/0358296 A1 Dec. 8, 2016

Related U.S. Application Data

(62) Division of application No. 13/849,205, filed on Mar. 22, 2013, now Pat. No. 9,384,518.

(60) Provisional application No. 61/685,867, filed on Mar. 26, 2012.

(51) Int. Cl.
*G06K 9/00* (2006.01)
*G06Q 50/26* (2012.01)
*G06Q 10/00* (2012.01)
*H04N 5/225* (2006.01)

(52) U.S. Cl.
CPC ....... *G06Q 50/265* (2013.01); *G06K 9/00013* (2013.01); *G06K 9/00161* (2013.01); *G06K 9/00604* (2013.01); *G06Q 10/00* (2013.01); *H04N 5/225* (2013.01); *G06Q 2230/00* (2013.01)

(58) Field of Classification Search
CPC ...... G06Q 10/00; G06Q 50/265; G06F 21/32; G07C 9/00158; G07C 9/00166
USPC .............................. 382/118, 124, 116; 726/7
See application file for complete search history.

(56) References Cited

U.S. PATENT DOCUMENTS

| 4,135,147 | A | | 1/1979 | Riganati et al. |
| 5,982,914 | A | * | 11/1999 | Lee .................... G06K 9/00073 |
| | | | | 382/124 |
| 6,487,306 | B1 | | 11/2002 | Jain et al. |
| 6,883,710 | B2 | | 4/2005 | Chung |
| 6,892,944 | B2 | | 5/2005 | Chung |
| 6,961,000 | B2 | | 11/2005 | Chung |
| 6,973,581 | B2 | | 12/2005 | Chung |

(Continued)

OTHER PUBLICATIONS

International Searching Authority, "PCT Search Report and Written Opinion", International Application No. PCT/US13/33662, Jun. 28, 2013, 9 pages.

*Primary Examiner* — Mekonen Bekele
(74) *Attorney, Agent, or Firm* — Clement A. Berard, Esq.; Dann, Dorfman, Herrell & Skillman, PC

(57) ABSTRACT

A biometric registration and/or verification system and method may comprise: a biometric sensor for capturing biometric data; a data entry device, a computer processor for receiving captured biometric data and entered data; and a database storing records thereof. The identifying biometric data may be related to the entered data in the database record. The biometric data is tested for satisfying a predetermined quality standard before being utilized, e.g., stored in the database record and/or compared.

31 Claims, 24 Drawing Sheets

(56) References Cited

U.S. PATENT DOCUMENTS

| | | | |
|---|---|---|---|
| 7,036,729 B2 | 5/2006 | Chung | |
| 7,036,730 B2 | 5/2006 | Chung | |
| 7,077,313 B2 | 7/2006 | Chung | |
| 7,079,007 B2 * | 7/2006 | Siegel | G07C 9/00087 235/379 |
| 7,098,793 B2 | 8/2006 | Chung | |
| 7,197,167 B2 | 3/2007 | Chung | |
| 7,319,397 B2 | 1/2008 | Chung | |
| 7,342,497 B2 | 3/2008 | Chung | |
| 7,422,150 B2 | 9/2008 | Chung | |
| 7,423,535 B2 | 9/2008 | Chung | |
| 7,431,209 B2 | 10/2008 | Chung | |
| 7,436,989 B2 | 10/2008 | Chung | |
| 7,461,787 B2 | 12/2008 | Chung | |
| 7,513,425 B2 | 4/2009 | Chung | |
| 7,561,724 B2 | 7/2009 | Chung | |
| 7,614,553 B2 | 11/2009 | Chung | |
| 7,636,087 B2 | 12/2009 | Chung | |
| 7,636,088 B2 | 12/2009 | Chung | |
| 7,779,457 B2 * | 8/2010 | Taylor | G06F 21/32 713/186 |
| 7,828,215 B2 | 11/2010 | Chung | |
| 7,894,634 B2 | 2/2011 | Chung | |
| 7,975,920 B2 | 7/2011 | Chung | |
| 7,988,047 B2 | 8/2011 | Chung | |
| 8,015,118 B1 * | 9/2011 | Robinson | G06F 21/32 705/75 |
| 8,047,435 B2 * | 11/2011 | Johnson | G07C 13/00 235/386 |
| 8,066,184 B2 | 11/2011 | Chung | |
| 8,214,913 B2 | 7/2012 | Chung | |
| 2001/0036301 A1 * | 11/2001 | Yamaguchi | G06K 9/00067 382/125 |
| 2003/0026462 A1 | 2/2003 | Chung et al. | |
| 2003/0039382 A1 | 2/2003 | Yau et al. | |
| 2003/0136835 A1 * | 7/2003 | Chung | G06K 7/10346 235/386 |
| 2003/0197593 A1 * | 10/2003 | Siegel | G07C 9/00087 340/5.52 |
| 2004/0213437 A1 * | 10/2004 | Howard | G06F 17/30011 382/115 |
| 2005/0169503 A1 | 8/2005 | Howell | |
| 2006/0047970 A1 | 3/2006 | Mochizuki | |
| 2007/0014440 A1 * | 1/2007 | Lo | G06K 9/00087 382/124 |
| 2008/0273770 A1 | 11/2008 | Kohout | |
| 2008/0279416 A1 | 11/2008 | Lo | |
| 2009/0049534 A1 * | 2/2009 | Chung | G06K 7/10346 726/7 |
| 2010/0170948 A1 | 7/2010 | Chung | |
| 2010/0252628 A1 | 10/2010 | Chung | |
| 2011/0089236 A1 | 4/2011 | Chung | |
| 2011/0216948 A1 * | 9/2011 | Yalla | G06K 9/00 382/125 |
| 2011/0314526 A1 * | 12/2011 | Valentine | G06F 21/32 726/6 |
| 2012/0283871 A1 * | 11/2012 | Chai | G06F 21/32 700/237 |
| 2014/0133711 A1 * | 5/2014 | Abe | G06K 9/00067 382/115 |
| 2015/0363586 A1 * | 12/2015 | Klevan | G06F 21/32 726/19 |

* cited by examiner

Voter Registration
File  Registered Voter  Change Username & Password  About

Registered Voter
New | Auto | Delete | Search | Print Card | Scan | Image | Option | Exit Elector's No [100000017]   Surname [WALTERS]   Given name [MICHAEL]
Gender [Male ▼]            Birth Date [1964] [1] [27]   Create Date [12/08/2010 1:51:00 PM]
                            Year  Month  Day
Professional Code [OCCUPATION]   Apt? [ ]   Apt#/PO Box [ ]
Street# [ ]   Street Name [ ]   "Street" Type [ ]
City [ ]   State [Cross River]   Postal Code [ ]
LGA Code [L01 ▼]   Registration Centre Code [123456]   ☐ Finished
Note [ ]

◄◄ ◄ Voter: 15/15 ► ►►
Fingerprint
Left Hand | Right Hand

New Voter
Address
| Street# | Street Name | "Street" Type |
|---------|-------------|----------------|
| 65      | SINGER      | LANE       |
|         | 70          | fs             |
|         | 70 WASHINGTON ROAD | LANE |
|         | ed          | ROAD           |
|         | fs          | Way            |
|         | MICROSOFT   |                |
|         | SINGER  |                |
|         | WASHINGTON  |                |

[Previous]  [Next]

932

Start  ○ ○ ○  Voter Registration  Document 1 - Microso...  1:54 PM

BIOMETRIC REGISTRATION AND/OR VERIFICATION SYSTEM AND METHOD

This Application is a division of U.S. patent application Ser. No. 13/849,205 filed Mar. 22, 2013 entitled "BIOMETRIC REGISTRATION AND VERIFICATION SYSTEM AND METHOD" which issued as U.S. Pat. No. 9,384,518 and which claims the benefit of U.S. Provisional Application Ser. No. 61/685,867 filed Mar. 26, 2012 entitled "Biometric Voter Registration (BVR) and Verification Solution", each of which is hereby incorporated herein by reference in its entirety.

The present invention relates to a registration and/or verification system and method and, in particular, to a registration and/or verification system and method employing a biometric identifier of predetermined quality. The system and method may be utilized, e.g., for a variety of purposes.

Many situations involve registering persons and then permitting or denying a person the ability to participate based upon the registration. Errors and mis-identification, whether accidental or intentional or for fraudulent purpose, as well as a person participating more than the permitted times and/or whose registration and/or identity is used by another to participate, if not detected and prevented, compromise the integrity of the entire process. Even identification devices, e.g., photo identification, can be altered and/or counterfeited, although some forms thereof are more resistant to such actions. Voting in an election and receiving social welfare benefits and the like are examples of participation that can be particularly threatened thereby.

It would seem to be desirable to have a system and method usable for registration, for verification of identity and/or for conducting the participation action, that is more resistant to mis-identification and/or duplicate participation. Certain biometric data is useful for uniquely identifying a person with good accuracy and reliability.

The following US Patents and Patent Publications of the present inventor that relate to registration, election and voting systems and methods, and to tracking systems and methods, are identified as background information:

U.S. Pat. No. 7,561,724 entitled "Registration Method, as for Voting."
U.S. Pat. No. 7,635,088 entitled "Electronic Voting Method and System Employing a Printed Machine Readable Ballot."
U.S. Pat. No. 7,635,087 entitled "Method for Processing a Machine Readable Ballot and Ballot Therefor."
U.S. Pat. No. 7,614,553 entitled "Method for Reading an Optically Readable Sheet."
U.S. Pat. No. 7,461,787 entitled "Electronic Voting Apparatus, System and Method."
U.S. Pat. No. 7,436,989 entitled "Generation, Verification and Reproduction of a Digitized Writing."
U.S. Pat. No. 7,431,209 entitled "Electronic Voting Apparatus, System and Method."
U.S. Pat. No. 7,422,150 entitled "Electronic Voting Apparatus, System and Method."
U.S. Pat. No. 7,197,167 entitled "Registration Apparatus and Method, as for Voting."
U.S. Pat. No. 7,077,313 entitled "Electronic Voting Method for Optically Scanned Ballot."
U.S. Pat. No. 7,036,730 entitled "Electronic Voting Apparatus, System and Method."
U.S. Pat. No. 6,973,581 entitled "Packet-based Internet Voting Transactions with Biometric Authentication."
U.S. Pat. No. 6,892,944 entitled "Electronic Voting Apparatus and Method for Optically Scanned Ballot."
U.S. Pat. No. 8,214,913 entitled "Physically Secure Computing System and Device, and Physically Secure Container Therefor."
U.S. Pat. No. 8,066,184 entitled "Optically Readable Marking Sheet and Reading Apparatus and Method Therefor."
U.S. Pat. No. 7,988,047 entitled "Method for Decoding an Optically Readable Sheet."
U.S. Pat. No. 7,975,920 entitled "Electronic Voting Method and System Employing a Machine Readable Ballot Envelope."
U.S. Pat. No. 7,894,634 entitled "Generation and Authentication of Digitized Biometric Data for Conducting a Transaction."
U.S. Pat. No. 7,828,215 entitled "Reader for an Optically Readable Ballot."
US Patent Publication 2011/0089236 entitled "System and Method for Decoding an Optically Readable Markable Sheet and Markable Sheet therefor."
US Patent Publication 2010/0252628 entitled "Manual Recount Process Using Digitally Imaged Ballots."
US Patent Publication 2010/0170948 entitled "Method for Decoding an Optically Readable Sheet."
U.S. Pat. No. 7,513,425 entitled "Article Tracking System and Method."
U.S. Pat. No. 7,423,535 entitled "Object Monitoring, Locating, and Tracking Method Employing RFID Devices."
U.S. Pat. No. 7,342,497 entitled "Object Monitoring, Locating, and Tracking System Employing RFID Devices."
U.S. Pat. No. 7,319,397 entitled "RFID Device for Object Monitoring, Locating, and Tracking."
U.S. Pat. No. 7,098,793 entitled "Tracking System and Method Employing Plural Smart Tags."
U.S. Pat. No. 7,036,729 entitled "Article Tracking Method and System."
U.S. Pat. No. 6,961,000 entitled "Smart Tag Data Encoding Method."
U.S. Pat. No. 6,883,710 entitled "Article Tracking System and Method."
U.S. Pat. No. 7,197,167 entitled "Registration Apparatus and Method, as for Voting."
U.S. Pat. No. 7,561,724 entitled "Registration Method, as for Voting."
U.S. Pat. No. 7,894,634 entitled "Generation and Authentication of Digitized Biometric Data for Conducting a Transaction."

Applicant believes there may be a need for a registration and/or verification system and method that employs biometric data of predetermined quality for representing identity, and that can be employed for registration, e.g., for voting registration and/or for a variety of other purposes, and/or for verification.

Accordingly, a biometric registration system may comprise: a biometric sensor for capturing identifying biometric data; a data entry device for receiving entered data; a computer processor testing whether the received captured identifying biometric data satisfies predetermined quality thresholds and for a predetermined number of minutiae; and a registration database for storing registration records representing the tested satisfactory identifying biometric data and the entered data. Thus the person to be registered may be registered according to the stored registration record if the tested identifying biometric data satisfies the predetermined quality thresholds.

Accordingly, a biometric registration method may comprise:
capturing identifying biometric data;
receiving entered data;
receiving captured identifying biometric data;
testing whether the received captured identifying biometric data satisfies predetermined quality thresholds and for a predetermined number of minutiae; and
storing registration records representing the tested satisfactory identifying biometric data and the entered data for the person to be registered in a database.

Thus the person to be registered is registered according to the stored registration record if the tested identifying biometric data satisfies the predetermined quality thresholds.

Further, a biometric verification system may comprise: a registration database storing identifying biometric data and entered data; a biometric sensor for capturing verification biometric data; a data entry device for receiving entered verification data; a computer processor configured for testing whether the received captured verification biometric data satisfies predetermined quality thresholds; and if the tested verification biometric data corresponds to identifying biometric data from the registration database, then providing an indication of verification. The person to be verified may thus be verified against the registration database.

A biometric verification method may comprise:
accessing a database of identifying biometric data;
capturing verification biometric data;
receiving entered verification data;
testing whether the captured verification biometric data satisfies predetermined quality thresholds;
comparing the tested verification biometric data with the identifying biometric data from the registration database; and
if the tested verification biometric data corresponds to identifying biometric data from the registration database, then providing an indication of verification of the person to be verified.

The person to be verified may thus be verified against the registration database.

According to another aspect, a biometric registration and verification system usable for registration, for verification and/or for participation, the system may comprise: a biometric sensor for capturing identifying biometric data; a data entry device for receiving entered data; a processor coupled to the biometric sensor and to the data entry device for receiving captured biometric data and entered data; a database for storing records representing the identifying biometric data and the entered data, wherein the identifying biometric data of the person is related to the entered data in the database record wherein the biometric sensor captures verification biometric data; wherein the data entry device receives verification data; wherein the processor compares the verification biometric data and the received verification data with the identifying biometric data and entered data from the database, and if the verification biometric data and the received verification data of the person to be verified corresponds to identifying biometric data and entered data from the database, then providing an indication of verification of the person to be verified.

According to another aspect, a biometric registration and verification method usable for registration, for verification and/or for participation, the method may comprise:
capturing identifying biometric data;
receiving entered data;
receiving captured identifying biometric data and entered data;
storing registration records representing identifying biometric data and entered data;
then capturing verification biometric data;
receiving verification data;
comparing the verification biometric data and the received verification data with the stored identifying biometric data and entered data; and
if the verification biometric data and the received verification data corresponds to identifying biometric data and entered data, then providing an indication of verification of the person to be verified.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIGS. 5A, 5B and 5C illustrate an example embodiment of a registration and voting device according to the present arrangement.

FIGS. 9A through 9F illustrate a series of display screens relating to registration data entry;

Figure 1:
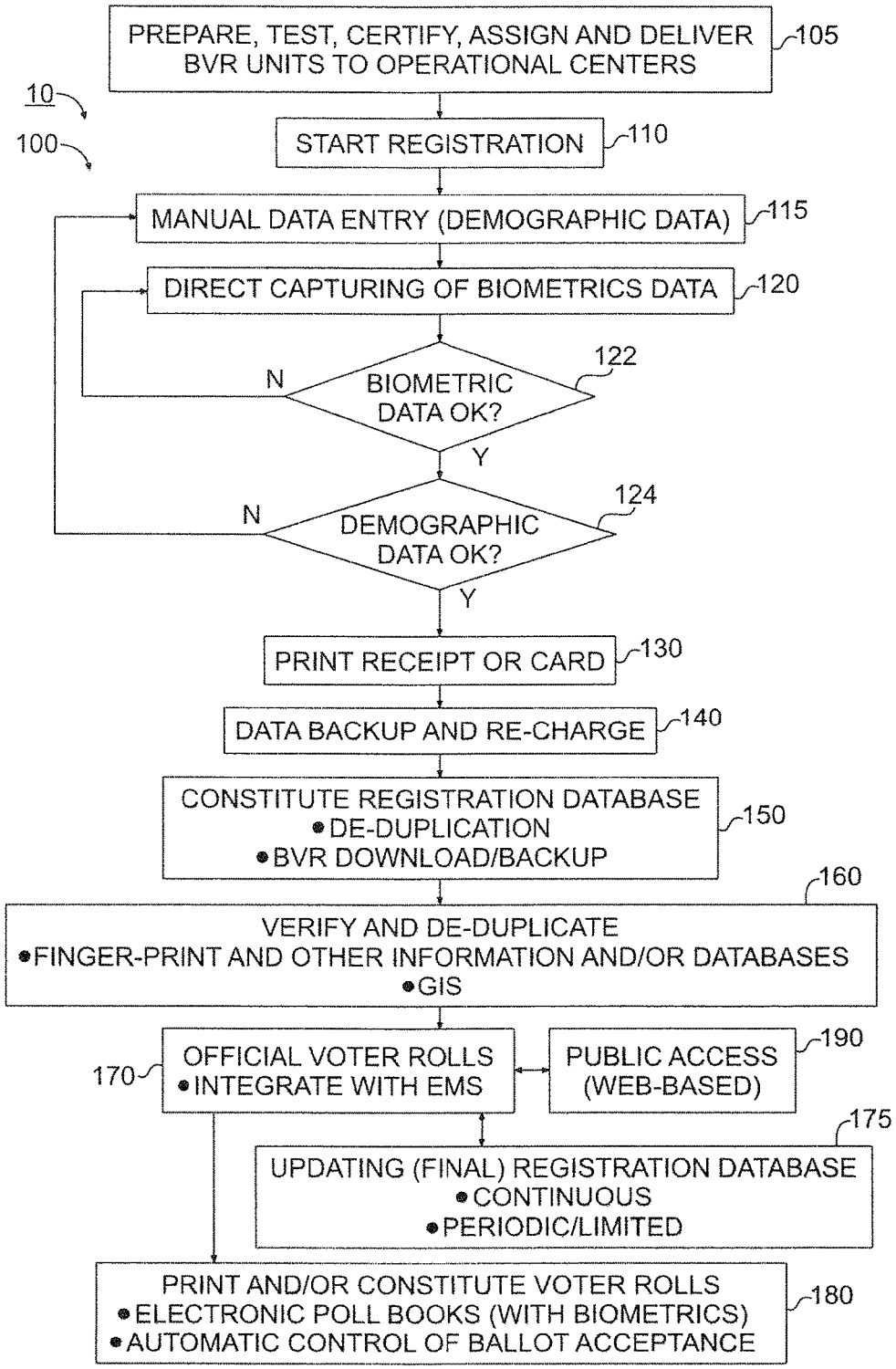
FIG. 1 is a schematic flow diagram illustrating the flow of information and data in an example embodiment of a registration aspect of a voting system and method according to the present arrangement.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification, but in the Drawing are preceded by digits unique to the embodiment described. For example, a particular element may be designated as "xx" in one figure, by "1xx" in another figure, by "2xx" in another figure, and so on. According to common practice, the various features of the drawing are not to scale, and the dimensions of the various features may be arbitrarily expanded or reduced for clarity, and any value stated in any Figure is given by way of example only.

DESCRIPTION OF THE PREFERRED EMBODIMENT(S)

The described registration and voting systems and methods include the registration of persons seeking to participate by entry of their demographic data and capturing their biometric data and the generation of an electronic registration database and electronic "poll books" for use at polling places in the conduct of an election. Processing for quality control, security, removal of duplicate registrations and facilitating elections conducted at local polling places is included. All registration and voting data is preferably hashed and encrypted for security and prevention of alteration.

Ballots for various particular polling locations and jurisdictions are generated, printed and distributed electronically based upon the qualification and certification of candidates and ballot measures of various types and kinds. Where and when ballots are printed, the ballots preferably include certain anti-copying and/or copy-evident features that make the production of unauthorized ballots much more difficult and expensive and make the detection of unauthorized ballots substantially easier if not obvious. Ballots and/or electronic voting equipment may be delivered, either directly or via storage and/or distribution facilities, to various polling places in advance of the commencement of the period for voting.

Voter verification is performed prior to a person being authorized to vote using the electronic poll books and comparison of demographic data and/or biometric data obtained from the person presenting to vote with that from the voter registration data stored in the electronic voting devices and/or communicated with a computer and/or server at a regional and/or central election facility. Additional verification such as by human visual comparison and/or signing the poll book may be included. Voting may be denied if the identity and data of the person presenting to vote does not match the registration data or the person has previously voted, e.g., the identity and registration data are not verified.

If the voter is identified and verified as being eligible to vote, and has not already voted, then a ballot is issued and/or an electronic voting machine is enabled to accept that verified person's vote and a unique voting identifier that is unrelated to the voter or to the voter's registration and/or identity is associated with that person's vote. The votes are counted, e.g., by an electronic direct recording voting machine, by scanning a marked ballot sheet, or both, and the votes, in either case the voter having the opportunity to review the machine interpreted voting selections before the ballot is officially cast. All voting machines, ballots and results are secured by election officials during voting and upon closing of the polling place. The local results are produced and communicated to regional and/or central tabulating facilities using secure forms and/or transmission media.

The tabulated results are made publicly available by election officials as they become available and/or are certified as complete, as the applicable law may allow and require. Because a unique anonymous voting identifier is associated with the voting for each particular voter, the voting and the voting results may be verified and/or audited completely on a vote-by-vote basis from the voting machine to end result without the loss of voter privacy, ballot secrecy and anonymity.

It is noted that while the use of the present system and method is described herein for convenience principally in the example context of a voter registration and voting system, it may be employed for other forms of registration, e.g., citizen registration, resident registration, visitor registration, student registration, test registration, and the like.

FIG. 1 is a schematic flow diagram illustrating the flow of information and data in an example embodiment of a registration system 100 aspect of a voting system 10 and method according to the present arrangement. Initially, registration process 100 involves preparing 105 Biometric Voting Registration (BVR) units for use, followed by testing and certifying 105 the BVR units for use in registering voters. The tested and certified BVR units may then be delivered 105 to one or more operational centers and/or other locations at which they can be stored, checked out, deployed and/or employed for registering voters during a registration session or a registration season, e.g., a number of registration sessions conducted over a period of time. BVR units may also include, as described below, elements necessary to also operate and function as an electronic voting machine.

The status, location and other relevant data relating to the BVR units may be and preferably is recorded in and tracked by an asset management system (AMS) to provide monitoring and visibility of the BVR units and other registration and election equipment by election officials, by an election authority and by other entities. Access to the AMS may be via dedicated computer, a dedicated and/or public network and/or the Internet.

Typical events and data that may be monitored, captured and stored by an AMS may include check-in and check-out of BVR units and other equipment, inventory of BVR units at central, regional and/or local storage locations and/or at polling places, inspections and quality testing of BVR units and other equipment, uploading and downloading of data and software and the installed version thereof, inventory of software loaded and versions thereof, BVR unit tags and other identification numbers, training operation, registration operation, election operation, identification of personnel doing or performing particular actions, equipment locations (actual past, present and/or planned future), movement and tracking data, including accessory equipment such as removable hard drives, flash drives, battery packs and the like.

Assets to be managed, monitored and/or tracked may be identified by bar coded (e.g., 2D QR coded) tags, RFID tags and other suitable identification means. The asset management system may be part of an Election Management System (EMS) or may be separate therefrom, however, in any case, the asset management data is preferably acquired as automatically as circumstances allow, thereby to improve accuracy and reduce the opportunity for inadvertent and/or intentional subverting of the AMS.

In preparation for registering voters, an election authority may issue official notices and optionally informal information, e.g., commercials, public service announcements, and the like, to notify citizens when and where they may register, and what the registration process may require. Requirements may include official documents, e.g., birth certificates, passports, government issued identification, other photo identification, and the like, and will be reviewed and examined by registration officials as part of the registration process.

Registration starts 110 with authorized registration workers and/or other officials checking out BVR units and transporting them to the locations at which registration is to be conducted. Authorized workers and officials typically are issued photo identification, e.g., badges and/or cards, that may also include RFID or other chip technology, and may also include stored biometric data identifying the person to who the identification was issued.

The BVR units are opened 110 for registration by an authorized worker or other official who preferably enter identifying information and a security code to unlock the BVR unit so that it can be used for registering persons seeking to register. Identifying the worker or other official may include scanning an identifying badge or identification card for the BVR unit to capture the identifying information, and fingerprints and/or facial images could be used for confirmation and/or verification of official identity.

Registration includes the entry of demographic data 115 relating to the person seeking to register into an electronic registration unit, either by the person registering or by an official, or by both. Because a trained registration official would likely be more familiar with the registration forms and with manually keying in data, such official may enter the data, and the person may complete a pre-registration form so the needed data is readily available in the registration process. Data to be entered may include, e.g., surname, given name, address, date of birth, occupation, and the like. In any event, the person registering should be given opportunity to review the entered demographic data, e.g., for correctness and accuracy.

Where a person seeking to register under the arrangement described herein has previously registered under a registration system previously in use, data from the earlier registration may be retrieved from a database of the earlier registration system, if available in suitable electronic form, and may be entered into the presently described registration system automatically, subject to review and verification by the person seeking to register.

Supplementing the demographic data, and/or for verifying identity, is the capturing 120 of biometric data relating to the person seeking to register, preferably by Direct Data Capture (DDC) using one or more biometric sensors or other biometric devices associated with the registration BVR unit. In a preferred arrangement, the captured biometric data includes fingerprint data and facial image data, however, other biometric data, e.g., an eye scan, an iris scan, dynamic signature, and the like, may also be captured. As described herein, fingerprint data preferably includes all ten fingers (if present) and a facial image preferably has the persons head directly facing the imager with eyes open and is within a range of preferred sizes relative to the overall image size.

Quality of the captured fingerprint biometric data may be enhanced by fingerprint image enhancement processing and may be controlled by requiring a minimum fingerprint area for each finger (which may be different for different fingers), minimum minutiae point counts (which may be different for different fingers), plural segments for each finger, limits on finger spacing, capturing all ten fingerprints, de-duplication of individual fingerprints as captured and as sets of ten fingerprints, de-duplication at the BVR level and/or at regional and/or central database levels, and the like. Quality of captured facial image biometric data may be controlled by the orientation of the face, distance of the face from the image camera, spatial relationship between the eyes, nose and mouth, de-duplication at the BVR level and/or at regional and/or central database levels, and other facial characteristics.

Preferably, biometric data is hashed, e.g., at a 256 bit security level, as it is captured, e.g., for the image and minutiae template for each fingerprint of an individual finger, and is again hashed as a set of biometric data, e.g., a set of ten fingerprints, to prevent the data from being changed, tampered with and/or substituted for by another fingerprint image and/or template. In addition, biometric data may be hashed and/or encrypted in combination with other data, e.g., demographic data, for additional security.

Both entered demographic data and captured biometric data are preferably tested for adequacy and quality before registration can be completed. Biometric data is tested and/or checked 122 to verify that it satisfies predetermined quality criteria before process 100 proceeds further. If the captured biometric data does not satisfy 122-N the predetermined quality criteria, e.g., sufficient fingerprint data and detail (minutia) and/or facial image with eyes open, then process 100 returns 122-N to the capturing biometric data 120 to repeat the capture of acceptable biometric data.

If the captured biometric data does satisfy 122-Y the predetermined quality criteria, then process 100 proceeds to test and/or check 124 to verify that the entered demographic data satisfies predetermined quality criteria before process 100 proceeds further. If the entered demographic data does not satisfy 124-N the predetermined quality criteria, e.g., there are one or more missing and/or invalid data items, then process 100 returns 124-N to the manual data entry 115 to receive the missing demographic data and/or corrected demographic data. Preferably, the fields from which required data is missing will be highlighted in the registration screen display. If the entered demographic data does satisfy 124-Y the predetermined quality criteria, then process 100 proceeds to printing 130 a registration receipt and/or a registration card.

When all required data has properly been entered and/or captured, a registration receipt may be printed 130 so that the person has a physical record of his registration, both for reviewing and verifying the demographic and biometric data entered, and as proof of registration, e.g., as a registration document or card.

De-duplication of the data entered and/or captured may be performed by the BVR unit in "real time," e.g., essentially as the data is entered and/or captured, or may be performed at the end of a registration session and/or the end of a day. Real time de-duplication may be preferred for preventing a duplicate registration from being completed because it is likely to detect the attempt to register a second or further time before the second or further registration has been completed. As a result it is expected that all of the registrations completed on any given BVR unit will be unique and will not include any duplicate or plural registrations, and that there is a very low likelihood that duplicate registrations will be communicated to a regional and/or central server/location.

In addition, it is preferred that the entered demographic data and the captured biometric data be hashed and encrypted before being stored in a BVR unit hard drive, flash drive or other physical storage device, including a storage device utilized for transporting the stored data from the BVR unit to another computer, e.g., a local, regional and/or central server and/or other computer. Both hashing and encryption each preferably employ an at least 256-bit security level.

At the end of each registration session, the registration worker or official closes the BVR unit, e.g., using an identifying process similar to that employed in unlocking the BVR unit for use. After the end of a registration session, the authorized worker or official returns the BVR unit to the operations location where BVR units are checked in 140, whereby the status and locations of all BVR units may be tracked and monitored. The BVR units are kept under physical security until they are next checked out 110 for use in conducting a registration session.

To reduce the likelihood that registration data could be lost or corrupted, each BVR registration unit is backed up 140 regularly, and data is hashed and/or encrypted as accepted. Typically, backup could be performed daily, e.g., at the end of registration for the day, but could be performed more frequently. Typically, the BVR unit is connected to a source of electrical power, e.g., an AC power source such as a 110 volt or 220 volt AC outlet, in operation, but it includes a battery for operating the BVR unit through a registration session of a defined duration, e.g., six or eight hours, or up to twelve hours, when local AC power is not available at the location or is interrupted. The BVR unit typically includes and/or is connected to a charging device for recharging the battery thereof in preparation for subsequent use, or the battery may be exchanged for a fully charged battery.

Data backup 140 may include the downloading of registration data electronically, e.g., by transmission via a communication link to a local server and database or a central registration location, e.g., to a server and database at the central location, or by exchanging a memory device, e.g., a data card or flash drive, and physically transporting the memory device to the central registration location. It is preferred that the registration data be stored and maintained on at least two separate and independent physical media memory devices, e.g., a hard drive of the BVR unit, a solid state memory, a memory card, an optical drive, and the like, at least one of which is a non-volatile Write Once, Read Many (WORM) device and at least one of which is built into the BVR unit and not accessible to or removable by users.

A registration database is constituted 150, e.g., is generated, at a central location, and preferably also at a physically separated mirror location for redundancy, for security, for protection from damage and destruction and for restoration. The central location typically includes one or more servers that regularly receive registration data from BVR units, whether by electronic transmission from the BVR units or via local servers, or by physical transfer using physical media, and store such data in a relational database. Examples of suitable databases include, e.g., Microsoft SQL, SQL server, and other databases available from Microsoft Corporation and from Oracle Corporation. Updating at least daily is preferred, e.g., at the end of a registration session, at least to a local server. Typically the local server does not process the registration data it receives, but may simply hold and communicate the registration data to the servers at a central location.

The registration data is processed 150 at the central registration location to verify 160 the integrity thereof, to eliminate duplicate registrations (referred to as "de-duplication") 160, and to transform the data into entries in a standardized database format in a central registration database. Processing may be on an ongoing basis, e.g., substantially in "real time," or may be performed periodically, or may be performed at certain prescribed times and/or events, e.g., after the close of a registration session and/or of a registration season.

Constitution 150 and verification 160 of the registration database may be performed at one central location, e.g., on servers and/or computers of a state or national authority, or may be performed first at local and/or regional locations, e.g., on servers and/or computers of county and/or state registration authorities, as the applicable governmental organization and law may require. In the latter instance, operations 150 and 160 could first be performed at the local level for registration data obtained in that jurisdiction, or at the regional level for registration data obtained in that jurisdiction, or at local and regional levels for registration data obtained in those jurisdictions, and would then be again performed at a central (state or national) authority for the combined registration data obtained from the local and/or regional authorities.

While de-duplication may be performed using any of the registration information deemed suitable, however, it is preferred that fingerprint data be employed in a de-duplication process 160, and preferably as the primary criteria to eliminate duplicate registrations. Other data and records, e.g., other biometric data, name and address data and/or Geographic Information System (GIS) address and location data, may be employed as a secondary test in the de-duplication process 160, and verification may be performed against other databases, e.g., driver's license records, national health care records, birth and death records, and the like.

The resulting database of registered persons (voters) is integrated 170 with an election management system (EMS) to compile the official roll of registered voters that will be used to permit registered persons to actually vote. The EMS compiles 170 voter rolls into county, district and/or precinct level voter rolls base upon, e.g., constituency, county, assembly, ward, party, and the like, so as to correspond to the governmental jurisdictional divisions applicable to the particular election.

The official rolls of registered persons may be updated 175 from time to time, except possibly within a given time when registration is closed immediately prior to an election, however, correction of data errors discovered for properly registered persons may be permitted even though the time is close before an election. At other times, updating 175 may be done on an ongoing basis or at specified times, as may be deemed appropriate.

Finally, national voter rolls may be constituted 180 and/or printed 180 to be used as poll books for use in conducting an election. While paper poll books might be printed, preferably the voter rolls are "printed" to electronic poll books as described herein whereby the biometric data for each voter is available to be employed at the polling places for verifying the identity of the person presenting himself to vote.

Biometric comparisons and verification are preferably performed automatically at the polling place by the electronic polling system described herein by comparing, e.g., fingerprint characteristics from the registration data with fingerprints obtained from the person appearing to vote at the polling place, or facial image data from the registration data with a facial image obtained of the person appearing at the polling place, whereby voter identity can be verified by biometric characteristics that are substantially impossible to falsify. Preferably, access to cast a ballot is conditioned upon satisfactory biometric verification of identity.

Optionally, the official voter rolls 170 may be made available 190 for inspection by the public, e.g., for review via the World Wide Web or Internet. Such access may be provided to registered persons who may use an identifier on their registration receipt 130 or card to review their own registration record, and/or web-based access may be made available to registration and/or election officials, and/or limited web-based access may be made available to political parties, and/or may be made available openly to anyone in the public although only limited information might be available to the public. In the latter instance, the information available may be redacted or otherwise limited to protect the privacy of registered persons and/or the integrity and/or security of the voter registration rolls.

Figure 2:
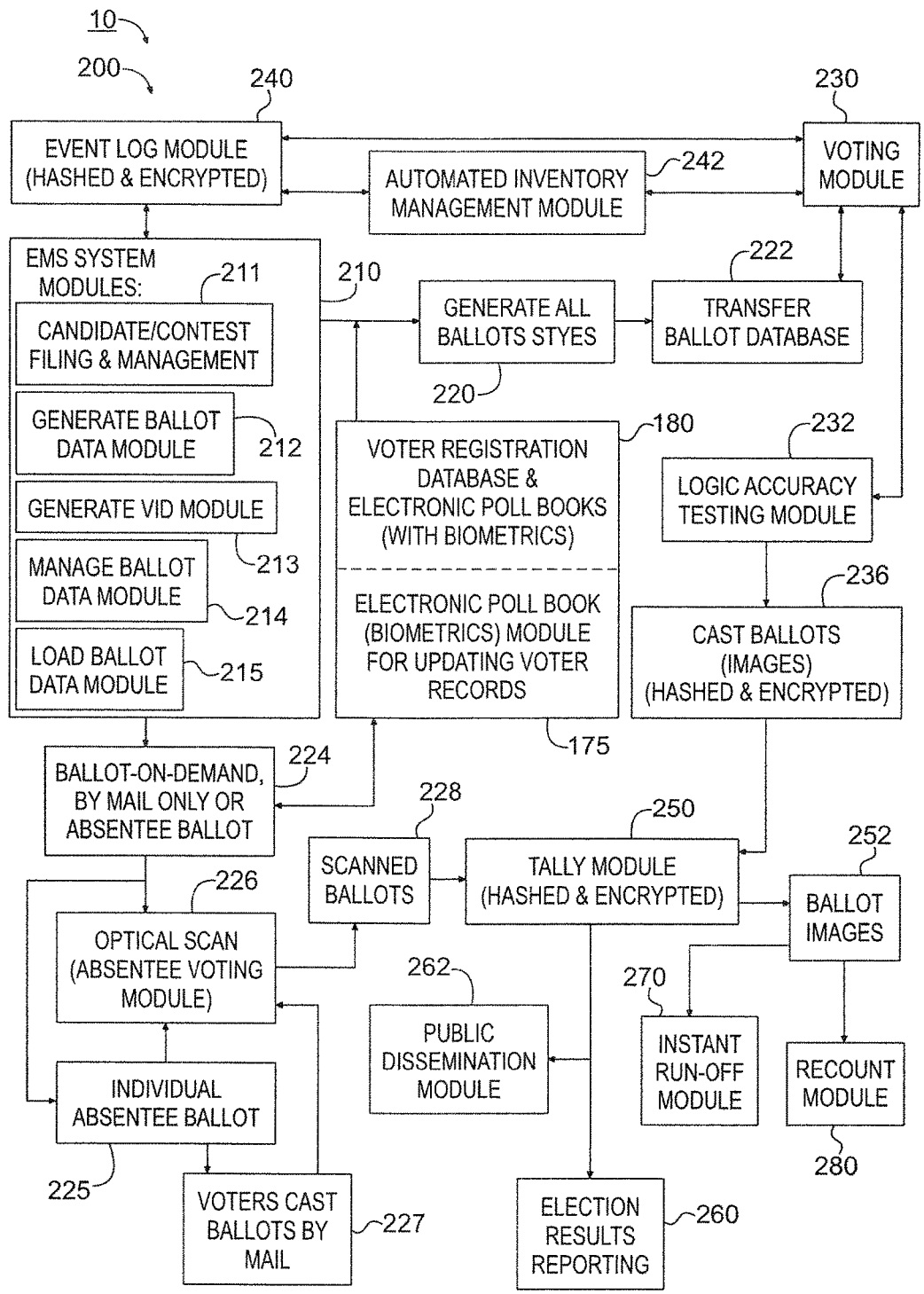
FIG. 2 is a schematic flow diagram illustrating the flow of information and data in an example embodiment of a voting system aspect of a voting system and method according to the present arrangement.

FIG. 2 is a schematic flow diagram illustrating the flow of information and data in an example embodiment of a voting system 200 aspect of a voting system 10 and method according to the present arrangement. Election management system (EMS) 210 provides overall control and coordination of the conduct of elections and the voting process. EMS 210, which includes one or more computer programs that configure one or more servers and/or other computers to control and monitor an election may include a candidate and/or contest filing and management module 211, a generate ballot data module 212, a generate a voting identifier (VID) module 213, a manage ballot data module 214 and a load ballot data module 215.

Election officials enter data 211 representing contests, candidates, questions, amendments and the like, to be on the election ballot, and enter data 211 representing governmental organizations and divisions, e.g., states, provinces, counties, cities, municipalities, towns, and the like, according to the political jurisdictional organization of the jurisdiction, using module 211. Data representing ballots for each particular jurisdiction and sub jurisdiction are generated by module 212 from the data provided by module 211.

In addition, a voting identifier (VID) is generated by module 213 for each ballot. The VID is a set of characters and/or symbols that is random and unique to each ballot, so that it can serve as a positive identifier of a ballot and not be related to the voter or identity of a person who completed or cast that ballot, thereby to reserve voter anonymity and privacy, render the ballot "secret" and provide complete transparency and accountability to an election, whereby each and every ballot can be verified and authenticated without compromising the secrecy of the ballot or the identity of the voter. VID identifiers are described in relation to ballots and voting systems as described in several of the US Patents identified herein above.

Module 214 manages the ballot data in the process of generating ballots and module 215 loads ballot data into the proper ballot formats for each of the various jurisdictions, sub jurisdictions and the like.

Ballots for all of the ballot types and/or styles are generated 220 from the data generated by modules 212-215 of EMS 210 in the form of a ballot database which is transferred 222 to one or more voting modules 230 which are employed to conduct voting at one or more polling locations. Along with the ballot database, the voter registration database 180 and electronic poll books are communicated 222 to the voting module 230 so as to be available at the polling places for verifying voter registration and identity while remaining separated from the voting ballots for preserving voter anonymity and privacy. Optionally, a voter registration updating module 175 may also be provided whereby registration data may be updated before and/or during an election.

Typically, the ballots are in an electronic format, e.g., a database format, which can be employed by voting modules 230 of electronic voting machines to display the ballot and receive voting selections, by electronic voting machines to display the ballot, receive voting selections and print a completed paper or other physical ballot with the voter's voting selections printed thereon, or to print paper ballots for marking by voters.

Typically, the voter registration database and electronic poll book database are in a format that is employed by an electronic poll book device at the polling places for verifying voter registration and voter identity so that only persons who are properly registered and whose identity is verified may vote. In case of uncertainty as to registration and/or identity of the person appearing to vote, provisional voting may be permitted as provided by the applicable law, e.g., by provisional ballot which is not counted or tallied until after the election if and when the registration and identity of the person wanting to vote is verified.

Logic accuracy testing module 232 of voting module 230 tests for ensuring end to end accuracy based upon the defined logic for receiving selections, e.g., voting selections, given that the selections that can be made are defined and predictable and so can be tested for conformity to all allowed variations of voting selection choices. As a result, the election results for each BVR unit and for the accumulated results can be verified for each and every candidate, contest, question and the like.

Ballots are "marked" 236 and cast 236 by voters, e.g., by making selections on an electronic voting machine, on an electronic voting machine that prints a marked ballot, or by marking voting selections on a paper or other physical ballot. Ballots are cast by being recorded on a Direct Recording Electronic (DRE) voting machine in response to the voter pressing a Cast Ballot button, or by scanning a physical ballot whether printed by a voting machine or marked by a person. Ballot images may be a captured actual image, e.g., generated by an optical scanner or camera, of a physical ballot or may be a data set representing voting selections made on an electronic voting machine, or both, and in either case includes the VID identifier for that ballot by which the ballot can be tracked, verified and authenticated separately from any information relating to the voter or his identity.

Ballot images of cast ballots 236 are communicated to a tally module 250 that tallies the voting selections made to provide an election result. Cast ballots 236 cast in a particular electronic voting machine or ballot scanner may be tallied in that electronic voting machine or scanner from the ballot images produced thereby and communicated to tally module 250, or may be tallied in tally module 250 from the ballot images received thereby. The VID identifier remains permanently associated with the ballot image for auditing, recounting and otherwise authenticating and certifying the voting results.

Tally module 2250 provides tallies of votes cast for reporting 260 to election officials as the results of the election, typically after all polls have closed and the results from the various voting machines have been tallied, although some jurisdictions may report interim and unofficial election results as the votes are counted and tallied. Voting results may be reported to the public via public dissemination module 262 and the results made publicly available may be the same as are reported 260 to election officials or may be a redacted and/or delayed.

Apart from and in addition to the voting process at public voting places as thus far described, provision is made for voting by persons unable to present themselves at a polling place and/or otherwise absent during the time for the election, e.g., an absentee voter. EMS 210 can provide 224 a ballot on demand from the ballot database generated by generating and data modules 212-215 in conjunction with the voter registration database 180. If an application for absentee ballot is made by a person who is verified from the registration database to be registered and whose identity is verified, then a ballot is issued 224 to that person, either at that time (ballot on demand) or by mail.

A ballot on demand may be voted and cast immediately or later, is optically scanned 226 by absentee voting module 226 either immediately or later, and the scanned ballot 228 image is communicated (immediately or later) to tally module 250 to be tallied at the appropriate time, e.g., after the polls have closed. Alternatively, the individual absentee ballot produced 226 may be provided 225 to the identified registered person who may take the ballot away and then later mark the ballot with his voting selections and submit the ballot for optical scanning 226 or if the ballot is mailed 224, 225, it may be returned in person or by mail 227 and after being verified as an authentic ballot, be cast and counted by optical scanning 226.

Review and verification of voting and tallying may be desired in certain instances, whether to sample an election to verify that ballots were properly cast, read and tallied so as to verify the operation and integrity of election system 200, e.g., a quality check, certain conditions may require such review and verification. In other instances, e.g., as when the result of the voting does not produce a winner under the applicable law or where the result is challenged, provision is made for further processing of the ballot images and/or voting selections determined therefrom.

Where the election results do not produce a final outcome under the applicable standards for determining the outcome, e.g., where no candidate has a majority of the vote, but only a plurality where the law requires a majority, further processing is required. Typically this uncertainty is resolved by conducting a run-off election involving the only the two or three candidates who received the most votes in the original voting. Holding a separate election involves delay in deciding the contest and can be expensive and otherwise burdensome. To avoid the cost and delay of a separate run-off election, voters may be able to vote for more than one candidate indicating one as a first choice, another as a second choice, and so forth, or may be able to cast more than one vote for a given candidate. In either of those instances, instant run-off module 270 can, from ballot images 252, in effect conduct a run-off election by counting not only the primary votes for each candidate, but also the ranked and/or secondary votes for the candidates who qualify for the run-off election, thereby to almost instantly hold a run-off election using the original ballots and voting selections.

Where an election result is challenged, contested or is sufficiently close as to indicate review is needed or desired, ballot images 252 stored by tally module 250 may be provided to recount module 280 which implements a recounting process to independently re-read and tally voting selections from the ballot images 252 so as confirm the election result.

Recount module 280 preferably makes available to election officials images of the ballots cast, e.g., on a human viewable display, for individual human inspection. Recount module 280 may also permit the voting selections to be counted from ballot images 252 using criteria for determining marked and unmarked marking spaces that differ from those used by voting module/cast ballot 230, 236 and/or tally module 250, as the case may be. It is noted that in counting ballots, all voting modules 230, 236 and tally module 250 utilize the same officially established predetermined thresholds for determining whether a mark space has been marked or is unmarked, so that all ballots are read and counted according to the same predetermined official criteria and produce the same vote count irrespective of which module or device performs the vote counting operation.

System 200 also preferably includes an event log module 240 that receives reports of all events taking place in system 200, which reports are stored and maintained in a database for review of the election process by election officials for auditing, investigating, verifying performance and/or other purposes. Log module 240 provides greater transparency and traceability for all events taking place in and during the voting process, e.g., voting machines employed, numbers of voter identities verified, numbers of voters voting, voting machine problems and other issues, status changes, poll worker presence and activity, poll opening and closing, supervisor over-rides, and the like, each with a consistent date and time stamp, e.g., as from a sealed local clock and/or a server or network based time standard.

While events recorded by log module 240 may include which registered persons present themselves to vote, which are permitted to vote and which are not permitted, and even which voting machine was used, there is no connection through log module 240 that could allow any election official or other person to associate a particular voter with any particular ballot or voting selection. Anonymity and privacy and a secret ballot are preserved.

In addition, an automated inventory management module 242 receives data for each physical element of the voting system, including, e.g., voting machines, electronic poll books, docking stations, items removed and returned to storage facilities, and the like, so that at any time the location and status of any piece of voting equipment may be obtained and such equipment may be tracked and monitored.

Figure 3:
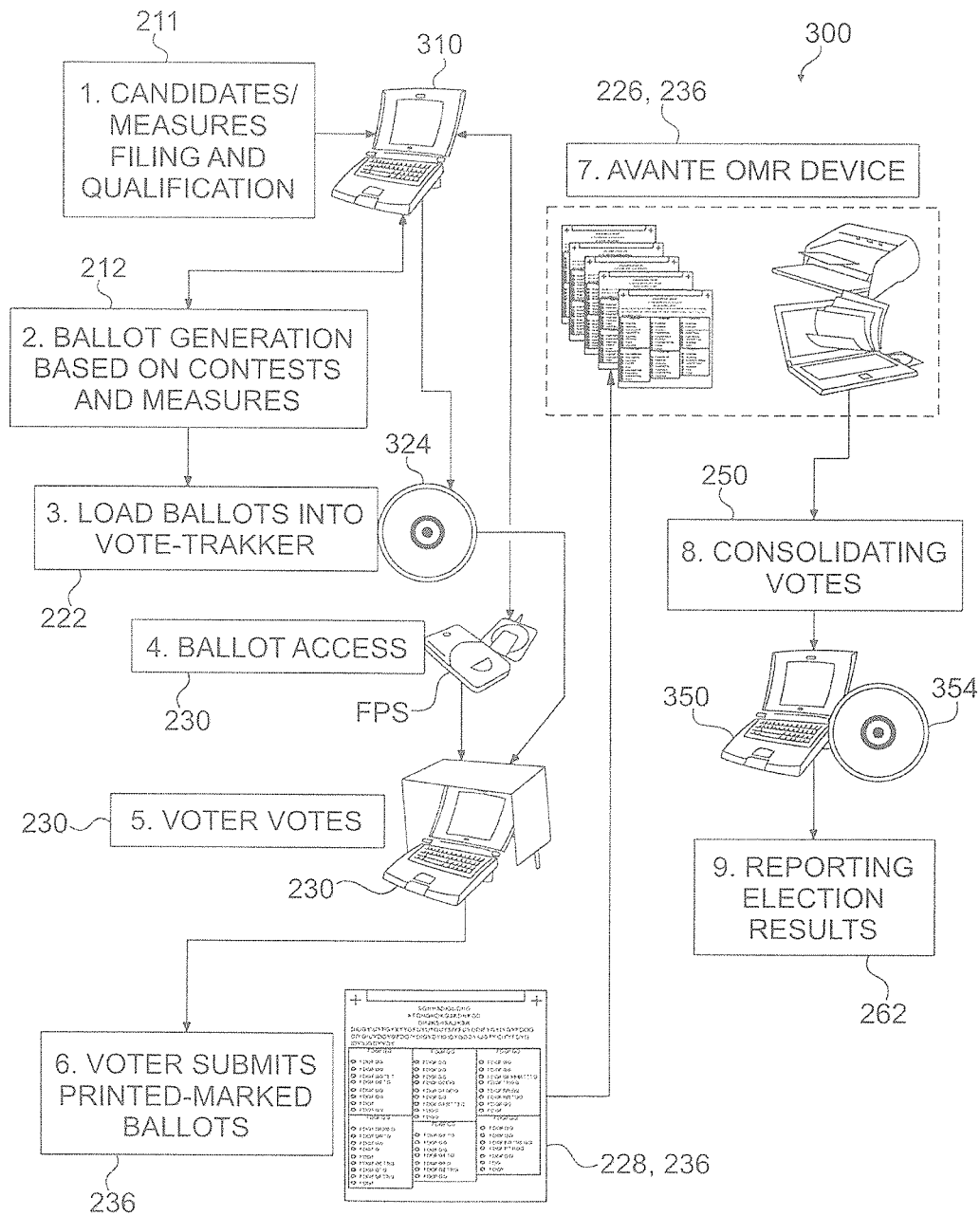
FIGS. 3 and 3A are schematic diagrams illustrating an example utilization of an embodiment of a system and method according to the present arrangement.
Figure 3A:
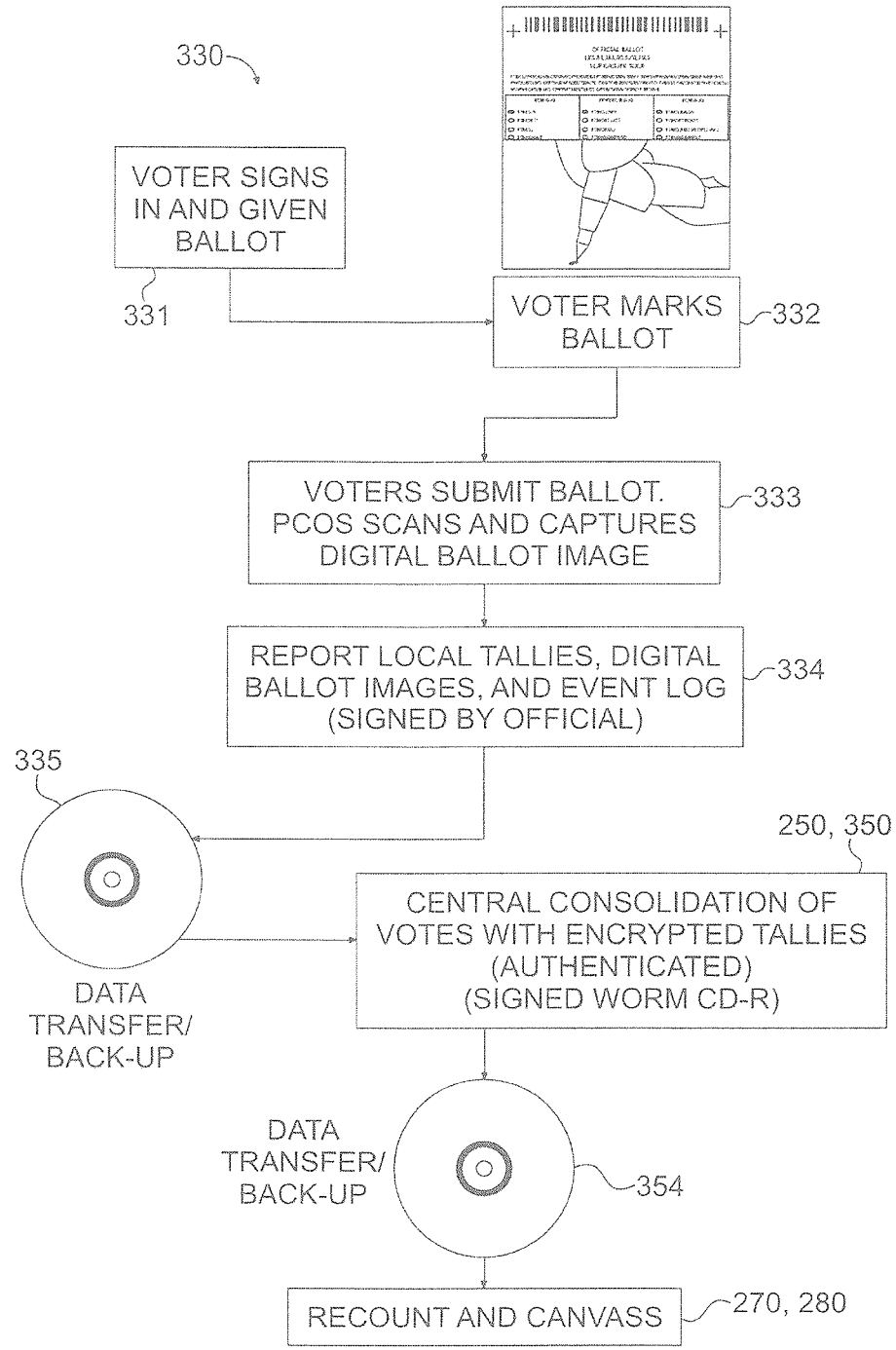

FIGS. 3 and 3A are schematic diagrams illustrating an example utilization 300 of an embodiment of a system 10 and method according to the present arrangement. Schematic 300 illustrates the operation of system 10 including information relating to the candidates and/or ballot measures, filing and/or qualification being entered 211 into the computer 310 being utilized to provide the EMS 310 function in voting operation 200, to computer 310 generating 212 ballot data based upon the entered 211 information regarding candidates and/or measures.

The generated 212 ballot data, which defines the ballot types and styles, is communicated 224 from computer 310 to the voting machines 330, e.g., by writing the ballot data to a transportable physical medium such as a CD data disk 324 which may be inserted into and read by voting machine computer 330, or via electronic transmission. A fingerprint scanner FP is associated with EMS computer 310 for verifying the identity of persons seeking to operate and/or use computer 310, thereby to provide identification verification and security.

Voting machines 330 may be electronic DRE voting machines and/or electronic voting machines providing printed optically readable ballots 228, 236 with the voter's voting selections printed thereon, e.g., as filled in mark spaces, or electronic voting machines that are both dre voting machines and optically readable ballot printing voting machines. In any case, each voting session and/or ballot includes a voting identifier VID that uniquely identifies the voting session and/or ballot, but that is not related to the voter or to the voter's identity or to any other data or information from which the identity of the voter can be determined, thereby to provide a completely auditable voting process without compromising voter anonymity or the secrecy of the ballots.

Voting machine voting records are communicated to one or more central and/or regional computers 350 that tally 350 the voting data received from the voting machines 330 of the various voting jurisdictions, e.g., districts, precincts, wards, and the like. Communication may be direct where the voting machine is a DRE voting machine or one that provides voting results in electronic file form, or may be via an Optical Marksense Reader (OMR) ballot reading device 226, 236 that reads optically readable ballots 228, 236 to capture digital ballot images thereof and to decode from the digital ballot images the voting selections that have been marked on the optically readable ballot, whether hand marked thereon or machine printed thereon.

OMR device 226, 236 tabulates the voting selections decoded from digital ballot images, consolidates the results for all ballots scanned and read thereby and communicates the consolidated voting results to the tally computer 350, while internally preserving both the digital ballot images and the consolidated voting selection results on two or more separate and independent memory devices, at least one of which is a non-volatile WORM type memory device. The stored data may be recorded on a CD data disk or other physical data storage medium that can be separated and preserved apart from the voting machine and/or reader.

Tally computer 350 receives, stores and consolidates (tabulates) the voting data and the voting results from all of the voting machines 330 and OMR ballot readers 226, 336 employed in conducting an election and provides reports 262 of the election results to election officials and optionally to the public. Tally computer 350 internally preserves the digital ballot images, the received voting selection results, and the consolidated and tabulated voting results it generates on two or more separate and independent memory devices, at least one of which is a non-volatile WORM type memory device. The stored data may be recorded on a CD data disk 354 or other physical data storage medium that can be separated and preserved apart from tally computer 350.

FIG. 3A illustrates additional detail regarding the voting operation 330 wherein a voter signs in 331 to vote and, if the voter's identity is verified 331, e.g., by comparison of fingerprint and/or other biometric data, then the voter is issued 331 a ballot, e.g., a paper ballot sheet. The voter then marks 332 voting selections on the ballot sheet, e.g., by placing a mark in a mark spaces corresponding to the voting selections, and submits 333 the marked ballot to be scanned 333, e.g., by a Precinct Count Optical Scanner (PCOS) device whereby a digital ballot image thereof is captured 333. The voter may submit 333 the ballot by placing the ballot into the PCOS scanner device or may submit 333 the ballot to an election worker and/or official who places the ballot into the PCOS scanner device.

The PCOS device decodes 333 the digital ballot images to obtain the voting selections that are marked on the ballot, and includes a verification process that detects and rejects ballots that are fakes, altered and/or counterfeit, and ballots that are a duplicate ballot cast by a registered person who has previously cast a ballot in the present election, thereby eliminating duplicate voting and duplicate counting of votes, e.g., as where a ballot is fed to the PCOS scanning device more than once. Preferably each ballot includes a unique identifier that is decoded and is associated with the ballot image and voting selections marked thereon, whereby ballot by ballot auditing and verification may be performed and duplicate ballot counting may be eliminated.

The PCOS device provides a tally 334 of the local votes cast as represented by the ballots scanned and decoded thereby, and generates 334 an event log including each ballot scanned and its operation, e.g., times turned on and shut down, identities of officials who turned it on and shut it down, operational issues (if any), and the like. The digital ballot images, vote tallies, event log and other data collected are all stored on two or more separate and independent memory devices of the PCOS device, at least one of which is a non-volatile WORM type memory device. The stored PCOS data is "signed" by the election official(s), e.g., by the reading of their official identification card or badge, to authenticate the data and the authentication "signature" is stored with the data authenticated. The stored PCOS data and the authentication thereof may be recorded on a CD data disk 335 or other physical data storage medium that can be separated and preserved apart from PCOS 333 and that can be read by an election computer or server at a regional and/or central location.

All data stored by the PCOS 333, 334 is encrypted for security as stored, in communication, or both. Encryption preferably includes hashing the data and applying a standard encryption algorithm, and all data generated and/or produced is subject to similar hashing and encryption.

The stored PCOS data is communicated 335 to a central computer 250, 350 where it is consolidated with election data from other machines and locations to produce 250, 350 an overall election result, which is likewise stored and operation of the central computer likewise produces an event log that is stored for later review, verification and/or authentication. All data accumulated at a regional and/or central computer, including digital ballot images, vote tallies, event logs and other data collected and/or generated are stored on two or more separate and independent memory devices, at least one of which is a non-volatile WORM type memory device, and is "signed" by the election official(s), e.g., by the reading of their official identification card or badge, to authenticate the data and the authentication "signature" is stored with the data authenticated. The stored data and the authentication thereof may be recorded on a CD data disk 354 or other physical data storage medium that can be separated and preserved apart from the regional and/or central computers and that can be read by an election computer or server as desired, e.g., for conducting 270, 280 a run off, recount, verification or other review or processing of the election result data, e.g., at a central computer location.

Preferably, plural levels of access to data and/or equipment, e.g., BVR units, may be provided taking into account the level and role of the person granted access. For example, where three categories of access are established, the lower or operator level of access might include BVR operators and a server or database operator, while an intermediate or supervisor level of access might include a precinct supervisor, a constituency supervisor ad a national supervisor, and a higher or system administrator level of access might include a database administrator, a security administrator and/or other highest level personnel.

Audit and/or event logs for BVR units and for regional and central facilities and equipment preferably log all events and information relating thereto, e.g., logins (e.g., user names, IP addresses, and the like), incomplete and/or unsuccessful logins, attempted plural contemporaneous logins, who accessed and when an equipment is accessed and/or operated and/or signed in to (e.g., for BVR units, workstations and servers), what was accessed and what was entered and/or changed e.g., data and/or software), the date and time of each event. Certain access and/or changes may require access and action by plural authorized persons, e.g., for changing registration data, preparing and/or changing ballot data, and the like.

Figure 4:
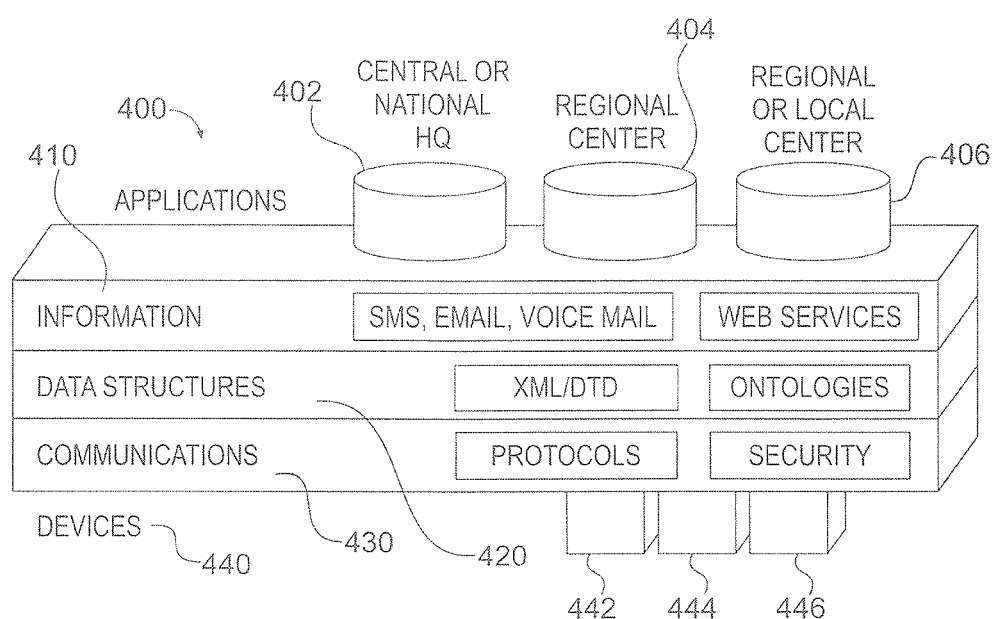
FIG. 4 is a schematic diagram illustrating a communication and data structure associated with the example system and method according to the present arrangement.

FIG. 4 is a schematic diagram illustrating a communication and data structure 400 associated with the example system 10 and method according to the present arrangement. Communication structure 400 includes an information layer 410, data structure layer 420, communications layer 430 and devices layer 440, for providing two way secure communication among and between various election authority locations 402, 404, 406 and various equipment utilized in the system and method 100, 200 as described.

Information layer 410 is the layer that directly interfaces with and provides communication among and between various election authority locations and/or facilities and/or centers 402-406, some of which may be at the same location or nearby locations and some of which may be at one or more remote locations. Information layer 410 may provide information via various means including but not limited to Short Message Service (SMS), e-mail, voice, voice mail and/or via web based (e.g., Internet and/or other network) services.

The facilities may include a headquarters 402, e.g., a national headquarters 402 where an election is conducted at a national level or a state or provincial headquarters 402 where an election is conducted at a state or provincial level. The facilities may also include one or more regional centers, e.g., a state or provincial center 404 where an election is conducted at a national level or a county or district center 404 where an election is conducted at a state or provincial level. The facilities may also include one or more local centers 406, e.g., a county, district or municipal center 406 where an election is conducted at a state or provincial level.

Data structures layer 420 organizes data into standardized structures, e.g., eXtensible Markup language (XML) files with or without Document Type Definition (DTD) files, and provides for ontologies that track the nature of data that exists or may have existed at a particular place and time, e.g., as in events logging and data compilation as the system 10 is operated and the method is performed, whereby transparency, verification and auditability may be provided.

Communications layer 430 provides communication paths and links for communicating structured data between various devices 440 and the various locations 402-406. Communications layer 430 defines and applies the communication protocols by which data is transmitted and received data is interpreted, and further provides security for the data communicated. Preferably data is hashed and encrypted when stored and when communicated, both for security in transmission and against alteration and/or corruption, whether accidental or intentional.

Devices layer 440 includes various devices by which data and information may be communicated between communication and data structure 400 and various equipment employed in the operation and use of system 10. An example thereof may include an Internet Protocol (IP) based bar code scanner 442 (either 1D or 2D), preferably including an embedded Global Positioning System (GPS) or other geographic locating device, which may be employed for scanning bar coded data of worker cards and/or badges, of voter registration cards and/or identification documents, of registration and/or voting equipment and parts thereof, and the like. Another example thereof may include an Internet Protocol (IP) based RFID reader and/or encoder 444 which may be employed for reading RFID devices of worker cards and/or badges, of voter registration cards and/or identification documents, of registration and/or voting equipment and parts thereof, and the like, and/or for encoding data to such RFID devices. One preferred type of RFID reader operates in the UHF frequency band. Another example thereof may include an Internet Protocol (IP) based active RFID monitoring reader that operates with active RFID tags and devices, e.g., worker cards and/or badges, voter registration cards and/or identification documents, registration and/or voting equipment and parts thereof, and the like, and/or for encoding data to such active RFID devices. Other devices 440 may provide WiFi, Bluetooth and/or other wireless and/or radio connections.

Figure 5D:
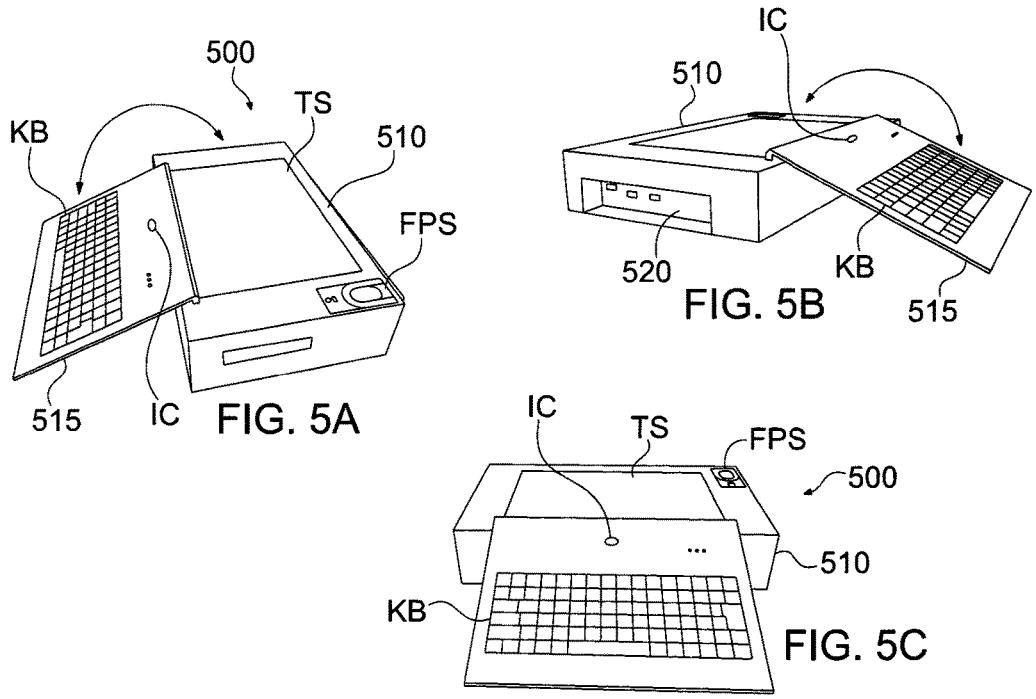
FIG. 5D is a schematic block diagram of the registration and voting device of FIGS. 5A-5C.
Figure 5D:
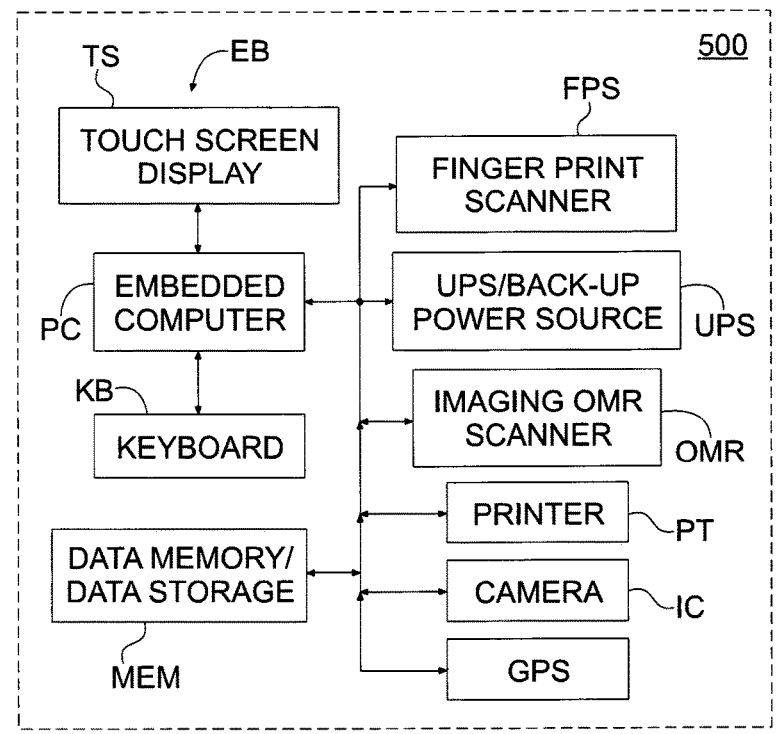

FIG. 5 includes FIGS. 5A, 5B and 5C that illustrate an example embodiment of a registration and voting device 500 according to the present arrangement, and FIG. 5D that is a schematic block diagram of the registration and voting device 500 of FIGS. 5A-5C. Device 500 preferably includes all of the devices necessary for it to serve as a registration device as described herein as well as to serve as an identity verification device and as an electronic voting device. Device 500 includes a housing 510 or physical case 510 that contains all of the devices thereof, and housing 510 may have a cover 515 that may be closed to protect touch screen TS and may be opened to expose touch screen TS. Optionally, a data entry device KB, e.g., a keyboard KB, typically a QWERTY keyboard, may be provided on cover 515 or on housing 510 such that keyboard KB is exposed when cover 515 is open. Cover 515 may be hinged or otherwise pivotably attached to housing 510 so as to be movable between open and closed positions, as indicated by the curved double-ended arrow.

Typically a personal computer PC is included in device 500 to provide the embedded processor PC as well as touch screen TS and keyboard KB. Typically, touch screen TS and keyboard KB are both used in the entry of data, e.g., as in registration, however, touch screen TS may be sufficient for voting, e.g., for displaying a ballot for touch screen voting. Computer PC may be an actual personal computer, laptop computer, or tablet computer, or may be a PC motherboard, one or more microprocessors or other digital processors. Device 500 also includes one or more data storage devices and/or memories MEM for storing registration data, biometric data entered data and other data, and some or part of memory MEM may be provided and/or part of computer PC. Preferably data memory and storage MEM includes data storage devices of different types and kinds, e.g., a hard drive (magnetic), semiconductor memory (e.g., RAM, DRAM), an optical drive (e.g., for CD and/or DVD media).

A fingerprint scanner FPS and/or an imaging camera IC may be provided in housing 510 for capturing biometric data, e.g., fingerprint data and/or facial image data. Fingerprint scanner FPS has an exposed touch sensitive surface upon which fingers may be placed for capturing fingerprint data. Imaging camera IC, which may be optional, preferably has an exposed lens for capturing facial image data, and the lens may be in a fixed position or may be adjustable for capturing facial images for persons in different positions relative to device 500, e.g., a person entering data via keyboard KB or a person opposite a person entering data via keyboard KB. Fingerprint scanner FPS and/or imaging camera IC may be employed for capturing biometric data for registration and/or for verifying identity in voting. image camera IC may be provided as part of an accessory kit for a BVR unit and may include a pan, tilt, zoom and/or focus unit whereby the camera direction may be controlled by a registration official, e.g., via the BVR unit and/or an external control, and/or may be controlled automatically via the BVR unit facial imaging software, to at least center and size a facial image, and optionally to focus the facial image, within predetermined image quality limits.

An electrical interface 520 is provided on housing 510, e.g., on a rear or side surface thereof, for connecting device 500 to one or more external devices, and interface 520 may have an openable cover for protecting interface 520 and/or limiting access to interface 520 to persons authorized such access, e.g., election workers and officials. The cover may be lockable with a key lock for security, or may have an electrical lock that is releasable responsive to entry of key data via touch screens TS and/or keyboard KB. Interface 520 may include various data, signal and/or electrical power ports or connections, as described below.

Housing 510 also includes a source of electrical power for operating device 500. Typically the source of electrical power includes a power supply operable from available external electrical power, e.g., local 110 volt-220 volt AC power mains, and preferably a battery or other source of backup power in the event external electrical power is not available or is interrupted, thereby providing a so-called uninterruptible power source UPS. Optionally, an external charging device may also be provided, e.g., a solar power source.

Optionally, a printer PT may be provided for printing documents produced at device 500, e.g., a registration receipt, a registration card, a paper ballot to be marked, and/or a marked paper ballot with voting selections printed thereon. Also optionally, an imaging digital scanner OMR may be provided where device 500 is to be utilized as a ballot scanner for receiving marked ballots, whether a voter's voting selections are marked thereon by hand or are printed thereon with the ballot format.

Optionally, a location determining device GPS, e.g., a Global Positioning System (GPS) device or other locating device, may be included in device 500 so that the location thereof may be correlated with specific operations performed thereby. Then the location of the device 500 at any given time may be, e.g., stored in the relevant database record and/or in the events log, and may be correlated with the specific operations performed, e.g., the registrations made thereby, the addresses entered for registrants, the voting performed thereby and the like, whereby events and operations may be geo-tagged. In addition, the specific operations and/or data entered may be geographically overlaid onto a map, e.g., by a Geographic Information System (GIS) application or other software application, using GPS, geo-tagging and/or entered location data. The GIS software may be resident on device 500, or may be on a regional and/or central server or other computer.

Optionally, a privacy screen may be provided for attaching to housing 510 for shielding touch screen TS from the view of people other than the person using device 500 thereby to increase privacy, and/or a protective case may be provided for transportation, security and storage of device 500.

Figure 6A:
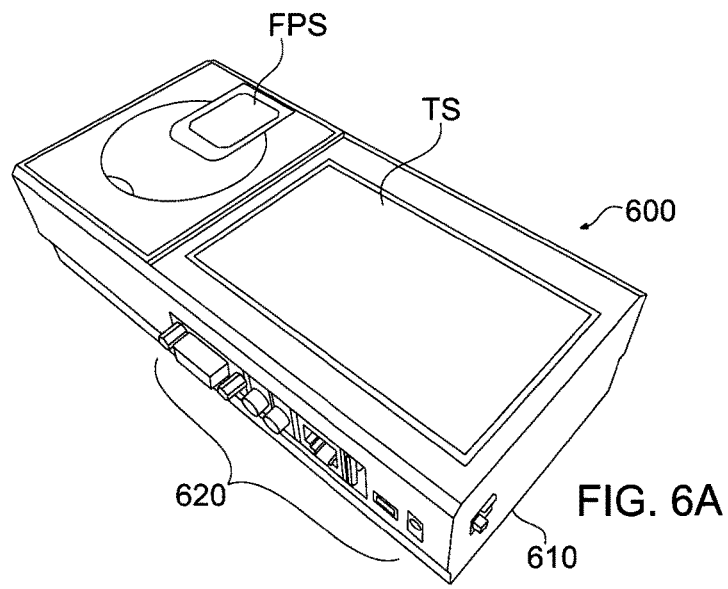
FIGS. 6A and 6B illustrate an example embodiment of a registration and voting device according to the present arrangement.
Figure 6B:
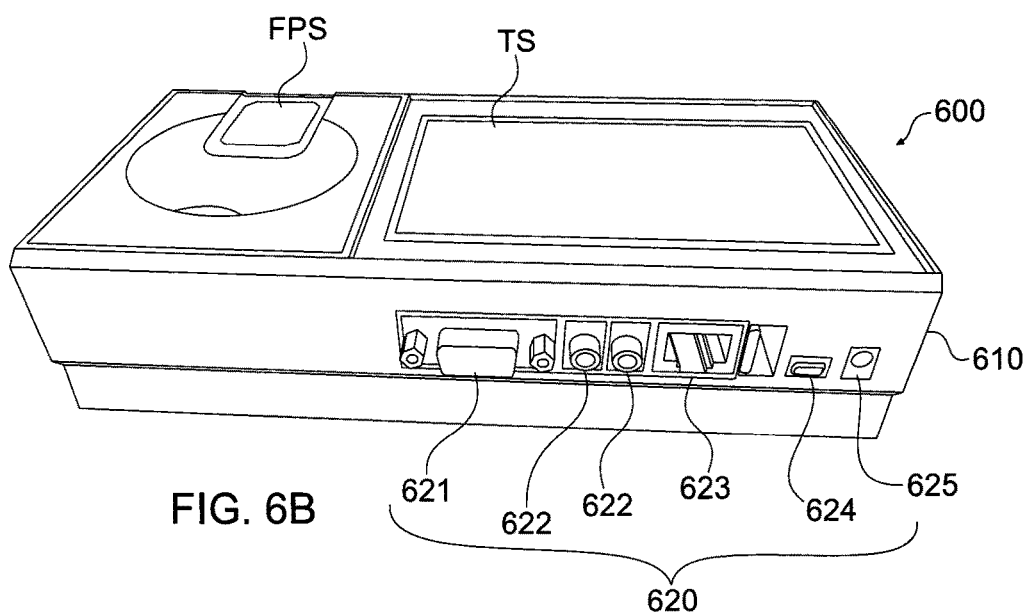

FIG. 6 includes FIGS. 6A and 6B that illustrate an example embodiment of a registration and voting device 600 according to the present arrangement. Device 600, similarly to device 500, preferably includes all of the devices necessary for it to serve as a registration device as described herein as well as to serve as an identity verification device and as an electronic voting device. Device 600 includes a housing 610 or physical case 610 that contains all of the devices thereof. A touch screen TS is provided to serve as a display and as a data entry device KB. Typically, a keyboard KB, e.g., a QWERTY keyboard, may be displayed on touch screen TS where it is usable for entering data. An optional cover may be hinged or otherwise pivotably attached to housing 610 so as to be movable between open and closed positions, so as to cover and uncover touch screen TS.

Typically a personal computer PC is included in device 600 to provide the embedded processor PC as well as touch screen TS with keyboard KB. Typically, touch screen TS may be used in the entry of data, e.g., as in registration, and for voting, e.g., for displaying a ballot for touch screen voting.

A fingerprint scanner FPS and/or an imaging camera IC may be provided in housing 610 for capturing biometric data, e.g., fingerprint data and/or facial image data, similarly to device 500 as described above. Housing 610 also includes a source of electrical power and/or an external charging device for operating device 600, similarly to device 500 as described above. Optionally, a printer PT and/or a scanning device OMR may be provided, similarly to device 500 as described above. Optionally, a location determining device GPS, e.g., a Global Positioning System (GPS) device or other locating device, may be included in device 600, similarly to device 500 as described above. Also optionally, a privacy screen and/or a protective case may be provided, similarly to device 500 as described above.

An electrical interface 620 is provided on housing 610, e.g., on a rear or side surface thereof, for connecting device 600 to one or more external devices, and interface 620 may have an openable cover for protecting interface 620 and/or limiting access to interface 620 to persons authorized such access, e.g., election workers and officials, similarly to device 500. The cover may be lockable with a key lock for security, or may have an electrical lock that is releasable responsive to entry of key data via touch screens TS and/or keyboard KB.

Electrical interface 620 may include various data, signal and/or electrical power ports or connections, as may be necessary and/or desired for device 600. For example, a multi-pin connector 621 may provide a serial or parallel data port, e.g., for connecting device 600 to a computer, display, printer, scanner, external storage device such as an external hard drive, and the like. Coaxial sockets 622 may provide plug in connections for external sound reproducing and sound receiving devices, e.g., headphones and a microphone, whereby registration and voting device 600 is accessible to persons having a visual or hearing impairment. A USB port 623 may provide for a plug in connection to a computer, flash drive, thumb drive, external hard drive, scanner, printer, and the like. Connecter 624, e.g., a micro USB or other connection, may provide an additional connection similar to USB port 623. Power input connector 625 receives electrical power from an external charger or other external electrical power source.

Figure 7:
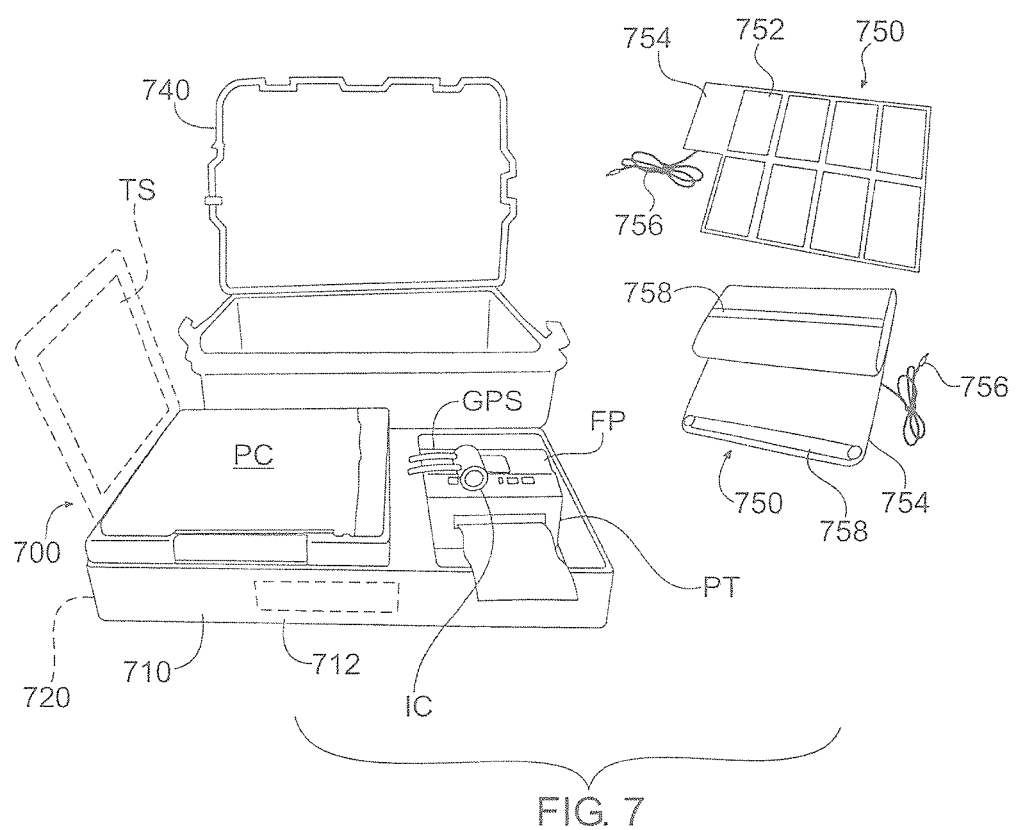
FIG. 7 illustrates an example embodiment of a registration and voting device according to the present arrangement.

FIG. 7 illustrates an example embodiment of a registration and voting device 700 according to the present arrangement Device 700, similarly to devices 500 and 600, preferably includes all of the devices necessary for it to serve as a registration device as described herein as well as to serve as an identity verification device and as an electronic voting device. Device 700 includes a housing 710 or physical case 710 that contains all of the devices thereof. A portable computer PC is provided in a position wherein its monitor may be rotated upward into position (shown in dashed line) where it provides access to touch screen TS that serves as a display and as a data entry device KB. Typically, a keyboard KB, e.g., a QWERTY keyboard, of computer PC is exposed when its monitor display TS is rotated to an open position. Housing 710 includes members that surround and retain the base portion of computer PC therein and, at least when a removable and preferably lockable cover thereof is closed, blocks access to the various USB and other data ports of computer PC. Housing 710 may optionally include a closable storage compartment for receiving various accessories usable with device 700, e.g., an external charger, USB and other cables, extra printer ink cartridges, and the like.

A fingerprint scanner FPS and/or an imaging camera IC may be provided in housing 710 for capturing biometric data, e.g., fingerprint data and/or facial image data, similarly to devices 500 and 600 as described above. Housing 710 also includes a source of electrical power and/or an external charging device for operating device 700, similarly to devices 500 and 600 as described above. A printer PT and/or optionally a scanning device OMR may be provided, similarly to devices 500 and 600 as described above. In the illustrated embodiment, printer PT is secured near a corner of housing 710 where blank paper may be easily fed and printed documents may easily be provided, and where field servicing, e.g., replacement of ink cartridges, may easily be accomplished.

A location determining device GPS, e.g., a Global Positioning System (GPS) device or other locating device, may be included in device 700, similarly to devices 500 and 600 as described above. Also optionally, a privacy screen and/or a protective case may be provided, similarly to devices 500 and 600 as described above.

An electrical interface 720 is provided on housing 610, e.g., on a rear or side surface thereof, for connecting device 700 to one or more external devices, and may have an openable cover, similarly to devices 500 and 600 described above. Housing may also have a storage compartment 712 for storing accessories, e.g., an ink cartridge, cables and the like.

An optional case 740 is provided for the storage and/or transport of voting device 700. Case 740 typically includes a base portion having one or more carrying handles and a padded recess shaped to receive and cushion device 700 therein, and a hinged cover portion that can be closed over device 700 to retain it securely in case 740. The joint between cover and base portions may be gasketed to provide a seal against entry of contaminants, e.g., moisture, dirt, debris and the like, when the clasps and/or latches thereof are secured.

Device 700 may further include an optional solar powered portable charging device 750 which provides at least sufficient electrical power via power cable 756 to recharge the internal battery of device 700 within a reasonable time, and preferably provides sufficient electrical power when properly positioned in bright sunlight to operate device 700. In the example embodiment illustrated, eight solar cell panels 752 can typically provide up to about 80 watts of power (a typical BVR unit requires about 40 watts when operating) and can typically recharge the battery of device 700 in about 8-24 hours.

Solar charging device 750 includes a foldable substrate 754 on which are disposed a plurality of solar cell panels 752. Substrate 754 supports and provides electrical connections between panels 752 and folds to provide a protective case and cover for solar panels 752, and may have hook and loop 758 or another fastener 758 for securing the folded solar charging device in a folded up configuration. Electrical charging cable 756 has a connector at the remote end thereof that plugs into a charging connector of interface 720 on housing 710. In the example illustrated, solar powered charger 750 is about 12-18 inches by 18-24 inches (about 30.5-45.7 cm by 45.7-61 cm) when deployed and about one-quarter that size when folded up for storage and/or transport.

Figure 8:
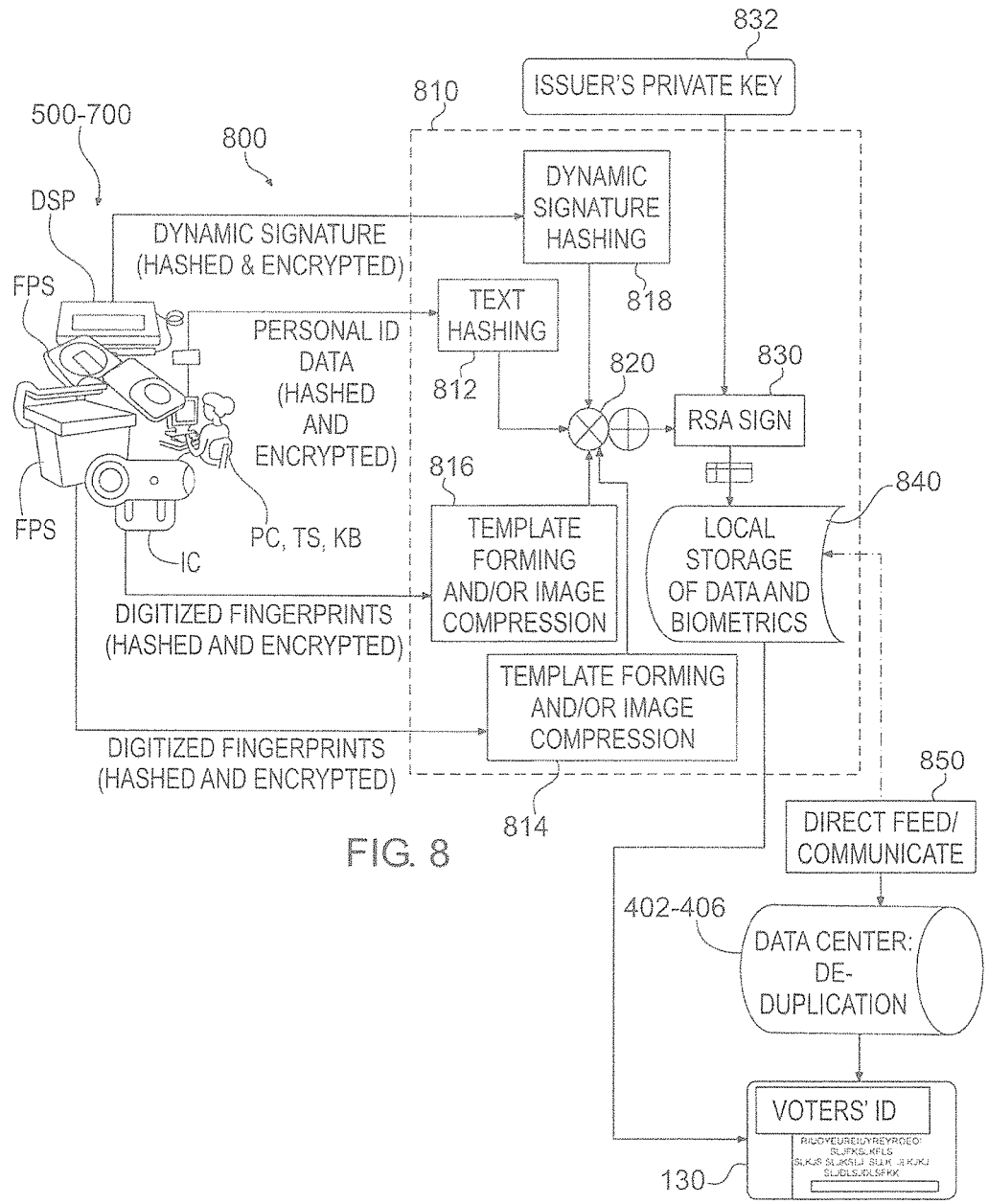
FIG. 8 is a schematic block diagram illustrating certain privacy and security aspects of the registration.

FIG. 8 is a schematic block diagram illustrating certain privacy and security aspects 800 of the registration. Entered and captured data is protected 810 for privacy and security by hashing the data and/or by encrypting the hashed data. A person seeking to register and/or an election worker or election official enter registrant data using a BVR unit, e.g., a BVR unit 500-700, wherein personal data is entered via a data input device, e.g., a touch screen TS and/or a keyboard KB, and the demographic registration data entered is hashed 812. Biometric data is captured by fingerprint scanner FPS and/or image camera IC; the biometric fingerprint data is hashed 814 and the biometric facial image data is hashed 816. A dynamic digital signature may also be captured, e.g., by a digital signature pad DSP, also know as a touch sensitive pad, which captures the strokes, timing, pressure and/or other direct and/or dynamic characteristics of a signed signature, and the captured dynamic signature data is hashed 818.

The hashed demographic data 812, the hashed fingerprint data 814, the hashed facial image data 816, the hashed dynamic digital signature data 818 and any other entered and/or captured data is combined 820 and is encrypted by an encryption algorithm of which many are known in the art. Suitable standard encryption algorithms include the RSA encryption algorithms, e.g., types SHA1, SHA3, MD5 or an equivalent, which operate in response to an issuer's private key 832 and employs a public key as well. The encrypted hashed entered demographic data and the encrypted hashed captured biometric data is stored 840 on one or more storage devices, e.g., at least one of which is a non-volatile WORM device, and all or part of that data may be provided 130 to the registrant and/or to a registration official, e.g., in the form of a printed registration receipt and/or registration card. The receipt and/or card may include a bar code with certain of the data encoded therein, an image, a fingerprint, human readable textual data, or a combination thereof.

The encrypted hashed entered demographic data and the encrypted hashed captured biometric data is communicated 850 via available communication links and/or paths to a data center, e.g., a registration and/or other center 402-406 for storage and/or processing, which processing may include "de-duplication" to remove duplicate registrations, e.g., based upon certain demographic data, certain biometric data, or both.

Figure 9A:
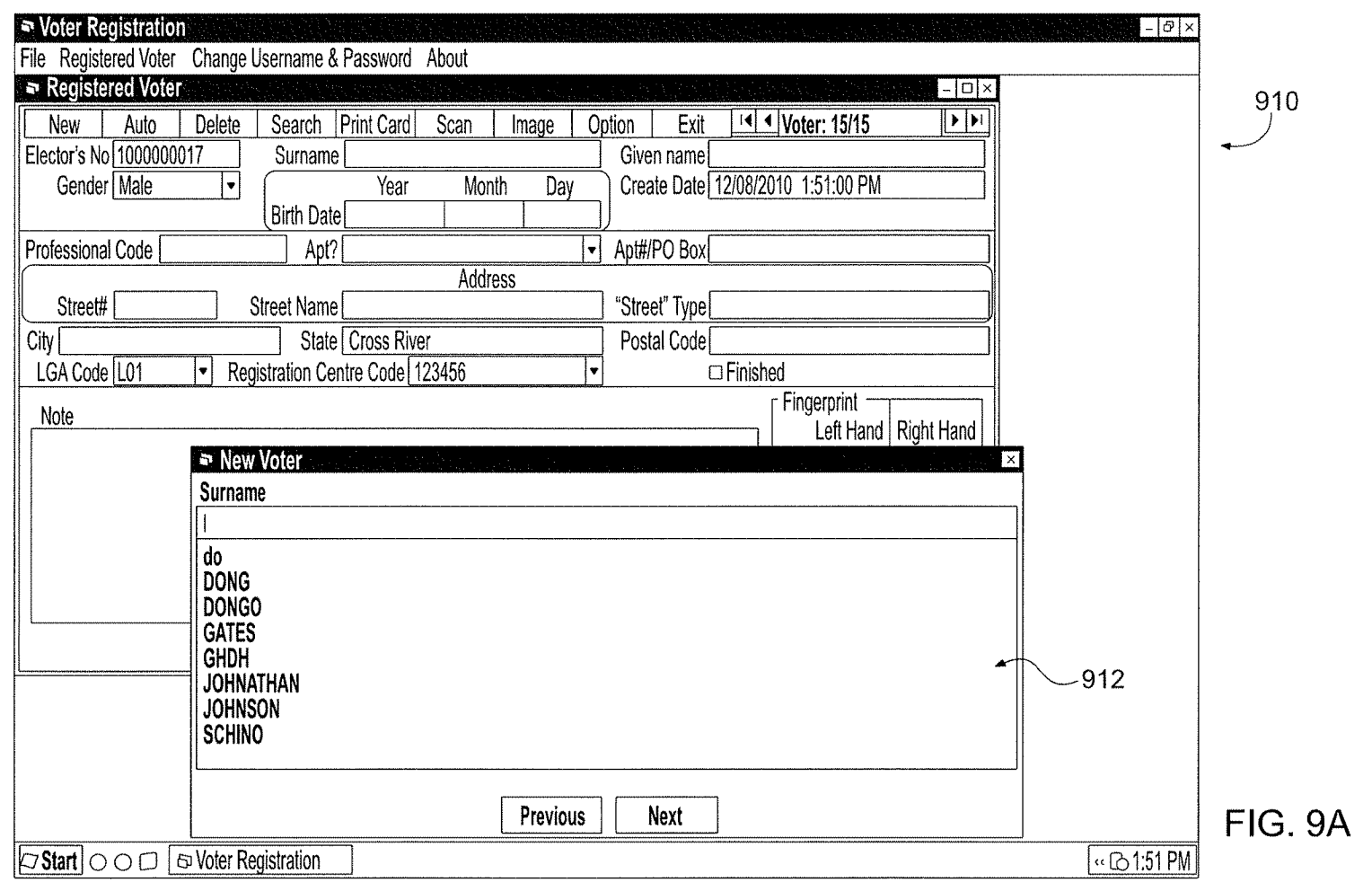
Figure 9B:
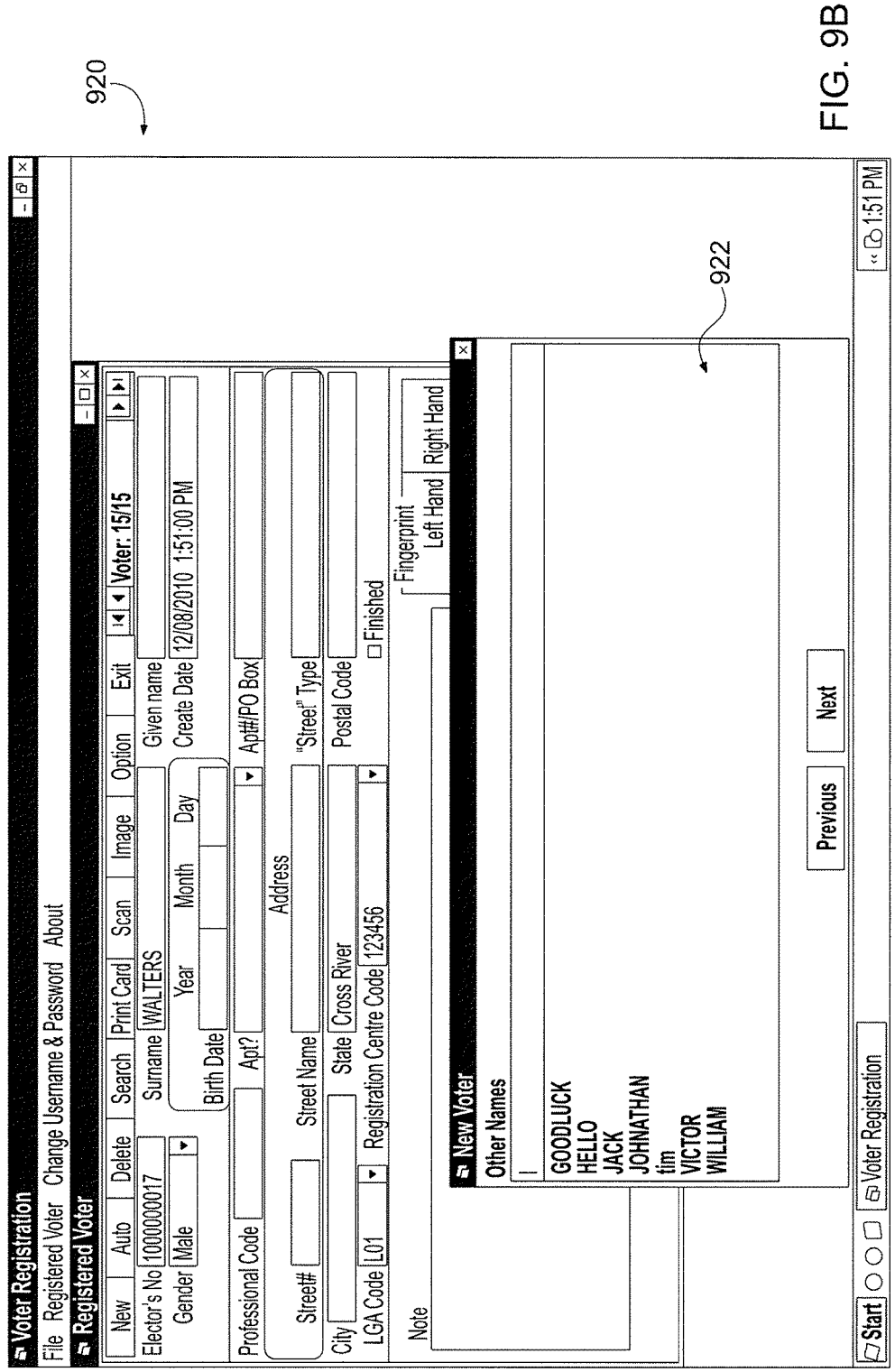
Figure 9D:
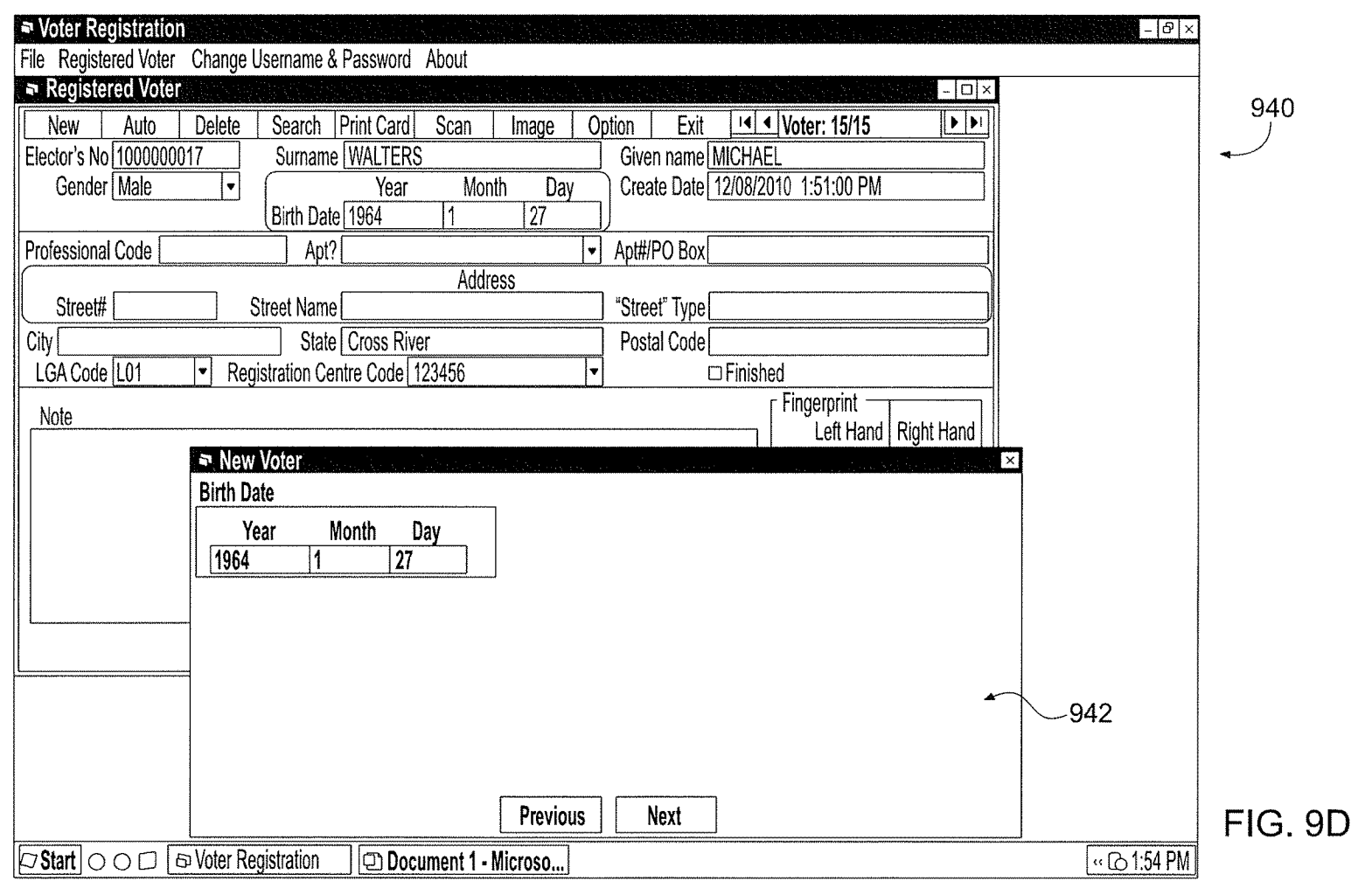
Figure 9E:
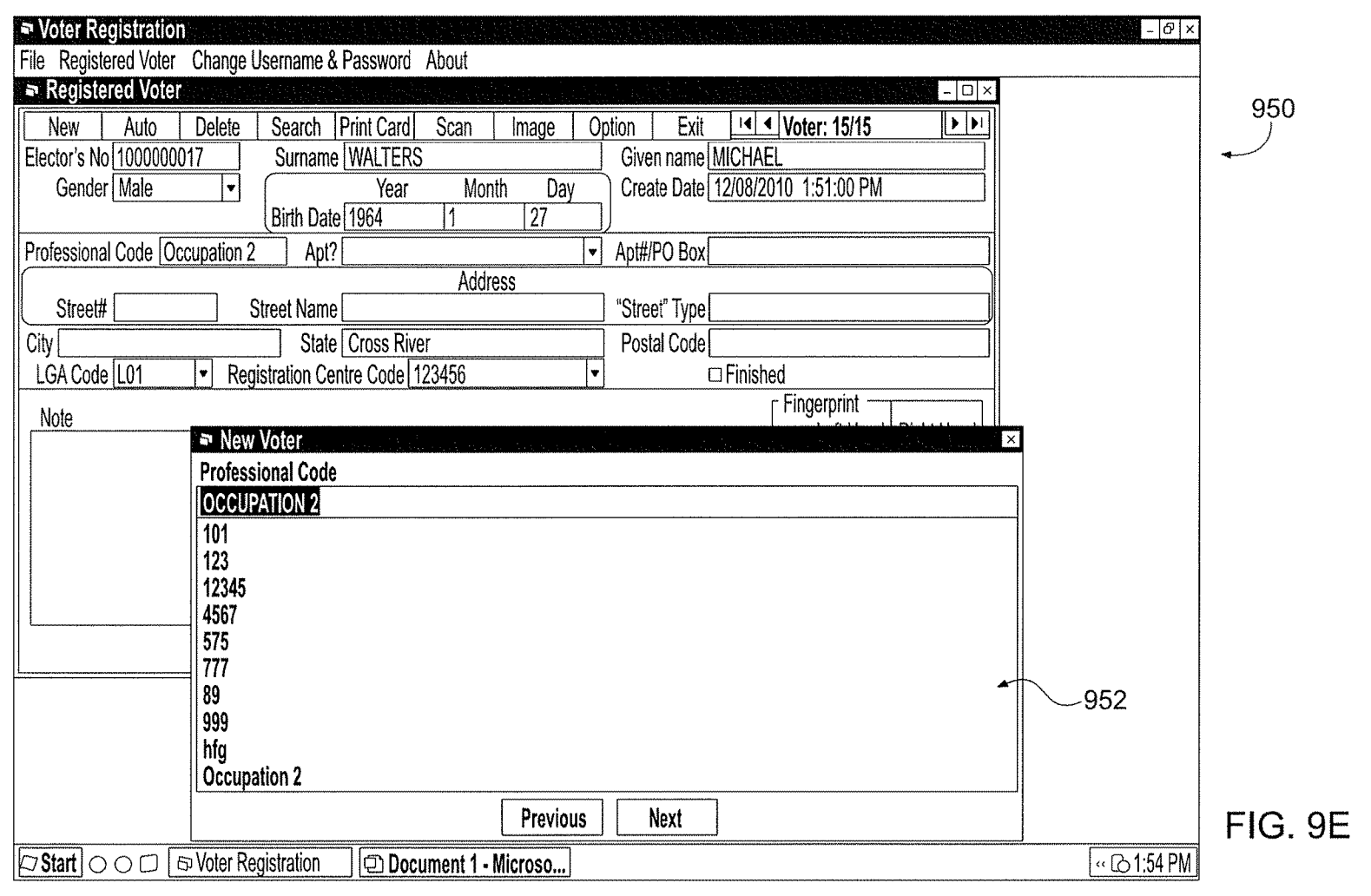
Figure 9F:
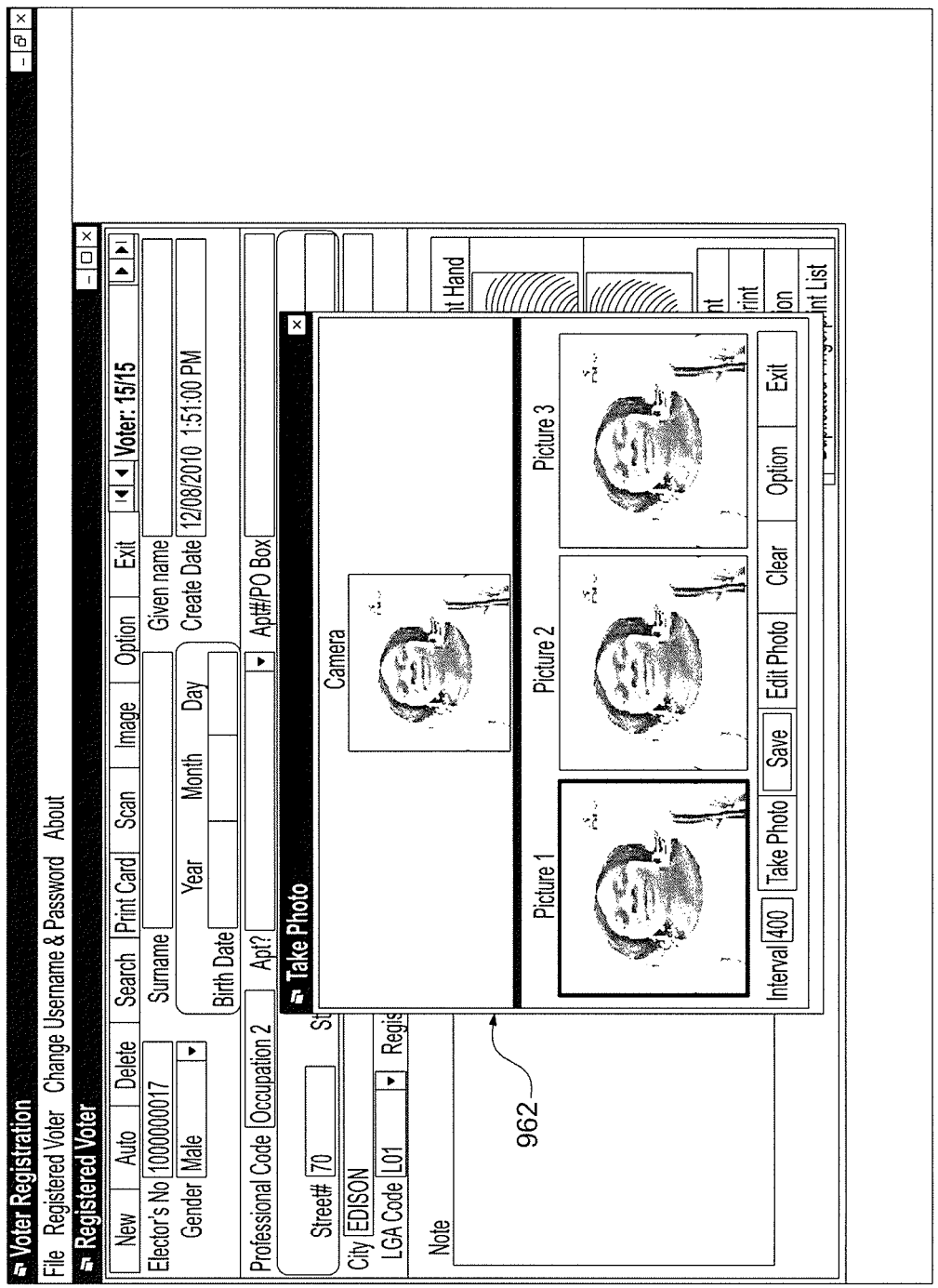

FIG. 9 includes FIGS. 9A through 9F illustrating a series for display screens 910-960 relating to an example embodiment for entry of registration data. Registration process 900 data includes, e.g., demographic data and biometric data relating to a person seeking to register and to his or her identity. Display data entry screens 910-960 are essentially the same basic display screen which includes plural fields wherein demographic data may be entered manually, e.g., by typing data using a touch screen TS and/or a keyboard KB, the demographic data including, e.g., a surname, a given name, gender, birth date (year, month, day), physical data (height, weight, eye color, hair color, and the like), professional (occupation) code, address (building number, street name, street type, apartment, post office box, city, state, postal code), local government authority or agency (LGA) code, registration center code, and other desired data. Age may be required as a separate data entry or may be calculated by the BVR unit from the entered birth date, or both age and birth date may be required to be entered and then are checked against each other by the BVR unit.

The registration process 900 requires that all required data has been entered and is within the predetermined ranges for the type and kind of data, e.g., a quality check, before registration 900 can be completed. Preferably, the data fields from which required data is missing are highlighted in the registration screen display 910-960. Certain data fields, e.g., fields for date-time data, an elector (official) number, registration center code, and the like, may be automatically completed from data entered into the BVR units by elections officials and/or programmed by BVR unit the software data.

Display screens 910-960 primarily differ in the drop down menu 912-962 that opens over display screens 910-960, respectively, depending upon the data field into which data is being entered. Drop down menus are seen to facilitate the entry of data, to reduce the time required to enter data and/or to reduce data entry errors, e.g., typographical errors, and is seen to be especially effective where demographic data is entered by the registering person and not by a person trained in data entry. Data entry from drop down menus 912-962 is typically accomplished by using up and/or down arrow keys to highlight a desired selection and pressing the "Enter" key and/or by moving a cursor over the desired selection and then "clicking" the mouse or touch pad button. Each drop down menu 912-962 preferably has a "Next" button and a "Previous" button, e.g., near the bottom thereof, for advancing to the next data entry field and for returning to the previous data entry field, respectively.

Certain data, e.g., an elector number, date and time data, registration center code, may be entered automatically by the BVR unit using data from a known valid source, e.g., elector number and/or registration center number from the identification and/or sign in data of the registration worker or official who opened and/or activated the BVR unit, and e.g., date/time data from an internal clock and/or from a server or network date and time stamp source. Other data, e.g., at least the initial letters of names, addresses and the like are manually entered. Selections presented via drop down menu may be based upon external data, e.g., frequently occurring data derived and/or selected from driver's license records, from street maps, and the like, and/or may be updated as registrations are completed and certain data entries are determined to occur with sufficient frequency as to be made one of the available selections of a drop down menu.

FIG. 9A illustrates a display data entry screen 910 including a drop down selection menu 912 displaying a list of selections of common names, e.g., surnames, that can be selected so that the name if on the menu list need not be manually entered. As letters of the name are manually entered, the menu list may automatically eliminate names not consistent with the entered letters, thereby to reduce the menu list to only names that are possible selections and to reduce the time required for most registrants to enter their name data, but not precluding completion of entry of a name that is not on the menu list. Preferably a data base of available name selections that is listed in the drop down menu 912 is updated (e.g., added to) as registrations are made and the frequency of names occurring becomes known.

FIG. 9B illustrates a display data entry screen 920 including a drop down selection menu 922 displaying a list of selections of names, e.g., given and/or other names that are common in the locale and custom, that can be selected so that the name if on the menu list need not be manually entered by typing its letters. Data entry with drop down menu 922, as well as for the other drop down menus, operates similarly to that described in relation to drop down menu 912. Preferably a data base of available name selections that is listed in the drop down menu 922 is updated (e.g., added to) as registrations are made and the frequency of names occurring becomes known.

FIG. 9C illustrates a display data entry screen 930 including a drop down selection menu 932 displaying a list of selections relating to addresses which may include street names as well as street building (house) numbers and/or street type, e.g., street, avenue, road and the like. Preferably, the complete address is separated into plural data fields, e.g., house number, street name, street type and the like, to facilitate making selections from drop down menus for each data field. Preferably a data base of available address data selections that is listed in the drop down menu 932 is pre-loaded, e.g., from available data bases, from maps, from GIS data and the like, and is updated (e.g., added to) as registrations are made and the frequency of names occurring becomes known. The pre-loaded address data may be the same for BVR units in different locations, e.g., may be a generalized set of address data, or may be tailored to the particular locale where the BVR unit is employed, may be a particularized set of address data.

FIG. 9D illustrates a display data entry screen 940 including a drop down selection menu 942 displaying data entry fields relating to a date, e.g., a birth date. Preferably, the date field is separated into three separate fields, one for the year, one for the month and another for the day. Any or all of these three fields may itself provide a drop down menu with available selections, e.g., years over a given period, years excluding birth years of persons too young to vote, the names of months, day numbers from 1 up to the number of days in a selected month. Improved accuracy of data entry is thought to be possible because confusion by a person entering data may be reduced and because each component of the date data may be separately checked for being within proper data value ranges. Preferably, whether the age of a person registering is within the necessary legal age, e.g., must be 18 years old or older, may be checked automatically from the entered birth date data.

FIG. 9E illustrates a display data entry screen 950 including a drop down selection menu 952 displaying a list of selections of occupations and/or professions, e.g., by name of profession and/or by a profession code. Available selections are preferably pre-loaded from an official source, e.g., labor agency categories and/or codes, employment categories and/or codes, and the like. Use of predetermined categories and/or profession codes is seen to reduce data entry errors, save time and improve data consistency for professions.

FIG. 9F illustrates a display data entry screen 960 for capturing image biometric data. Display screen 960 may include a drop down selection menu 962 and/or pop-up window 962, e.g., a "Take Photo" window, for displaying an array of images captured by an image camera IC associated with a registration BVR unit. Preferably the image camera IC of the BVR unit is programmed to capture, when actuated, plural images of the person registering within a predetermined time period, e.g., three images within about one second. Each of the plural captured images is analyzed by software that determines whether that image satisfies all of a set of predetermined image quality criteria and limits. If no image satisfies all of the image quality criteria and limits, another set of images may be captured and the evaluation thereof repeated. This image capturing and testing process is seen as reducing the need for repeating the image capture sequence, thereby saving time while improving the quality and reliability of identifying biometric data.

In the illustrated display screen 960, a window 962 displays along a bottom row thereof the series of three captured images and in an upper row the current camera image. Once a suitable image is identified, is selected and is processed, the selected processed image may appear in the upper row either in place of the camera image or along side of the camera image.

Examples of image quality criteria and limits may include whether image focus is within limit, all features (e.g., eyes, nose and mouth) are identifiable, the eyes are open (not blinking), the distance between subject and camera IC is within predetermined limits, the face tilt is within limit (e.g., less than 15°), exposure and/or contrast is within predetermined limits, and the like. One of the images is then selected, preferably automatically, as being acceptable, e.g., within all limits and criteria, and the selected image is then cropped to include the complete head and is normalized in size and facial recognition software may then extract from the selected facial image the identifying characteristics thereof which are then stored in the registration database as part of the record entry for that registrant.

Figure 10A:
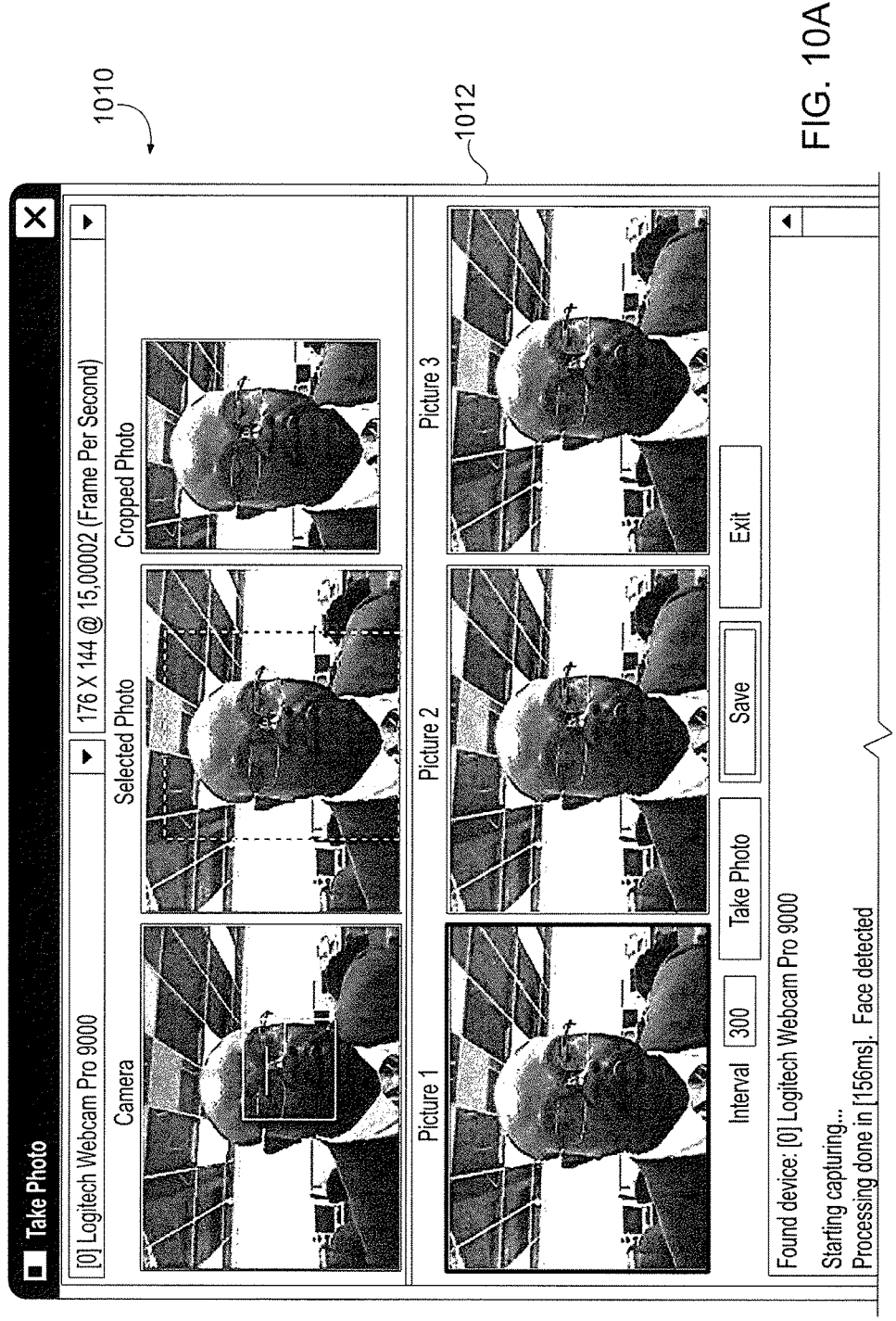
FIGS. 10A through 10B illustrate a series of display screens relating to registration data entry.
Figure 10B:
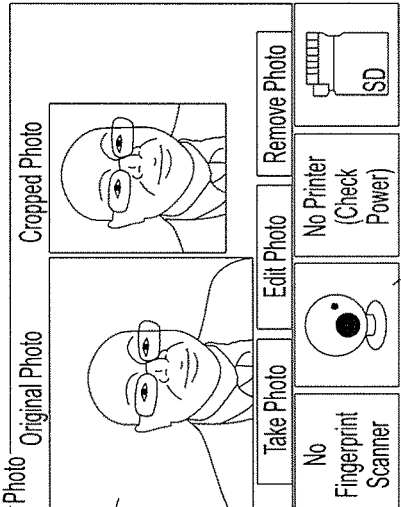

FIG. 10 includes FIGS. 10A through 10B illustrating a series of display screens 1010-1020 relating to an example embodiment for entry of registration data, in particular, image biometric data captured by an image camera IC. Specifically, FIG. 10A illustrates an enlarged "Take Photo" window 1012 that may overlay or be superimposed on a display screen 1010 wherein three images ("Picture 1," "Picture 2" and "Picture 3") of a registrant have been captured and are displayed in a bottom row in window 1012. In an upper row thereof are displayed the current image ("Camera") being captured by the image camera IC, a selected one of the three captured images ("Selected Photo"), and a cropped version ("Cropped Photo") of the selected image. Window 1012 may also display data relating to the image and/or image camera, e.g., the type and/or model (e.g., "Logitech Webcam Pro 9000") thereof, the pixel count (e.g., "176×144") of the image, and the status (e.g., "Starting capturing . . . Face Detected") of the image capturing and evaluating process.

As described, the image capturing and processing software preferably captures plural images within a relatively short period of time, checks the images for focus, facial image orientation, eye characteristics, head tilt, and the like automatically, selects the "best" image and then crops and normalizes the image, for determining sufficient biometric data points (sometimes referred to as "minutiae") for providing verification of identity with suitable confidence and precision, and for identifying and eliminating duplicate registrations.

FIG. 10B illustrates a screen display 1020 suitable for gathering and capturing demographic data entered manually and/or using drop down menus as described, and further displaying captured biometric data relating to the person registering as well as the status of various items of equipment associated with the registration equipment, e.g., a BVR unit. Demographic data may also be obtained from passport and/or national identity cards, e.g., by manually entering the data therefrom, by scanning or other wise reading the passport and/or identity card, and/or by retrieving data from an external governmental passport and/or identity card database. Passport and/or identity card data obtained from an external governmental passport and/or identity card database may be used to check the data entered manually or from another source. The upper portion of display screen 1020 is substantially similar to the display screens already described and so will not be repeated.

The lower and right hand portions 1022, 1024, 1026 of display screen 1020 may provide status information produced by the operating software for the BVR unit which automatically checks for the presence and operating status of each of its elements and provides a displayed indication thereof. For example, captured biometric data relating to the person registering may be displayed 1022. For example, an original photo, e.g., the selected one of plural images captured in a defined period of time, and a cropped normalized version thereof, may be displayed in a "Photo" section 1022, and a set of fingerprint images may be displayed in a fingerprint section 1024 thereof. Further, the status of the fingerprint scanner FPS, of the image camera IC, and/or of a printer PT, and/or of a power source UPS, may be displayed in an equipment status section 1026 thereof.

In the illustrated example screen display 1020, biometric image data has been captured and is displayed in biometric image data section 1022, partial biometric fingerprint data (only three fingerprints on the left hand) has been captured is displayed in biometric fingerprint data section 1024, and BVR unit equipment status section 1026 displays icons indicating that image camera IC is present (icon for a webcam) and power source UPS is available (icon of a battery pack or UPS), while fingerprint scanner FPS is indicated as being not connected or not operating and the printer PT is indicated as being not connected or unpowered.

Figure 11A:
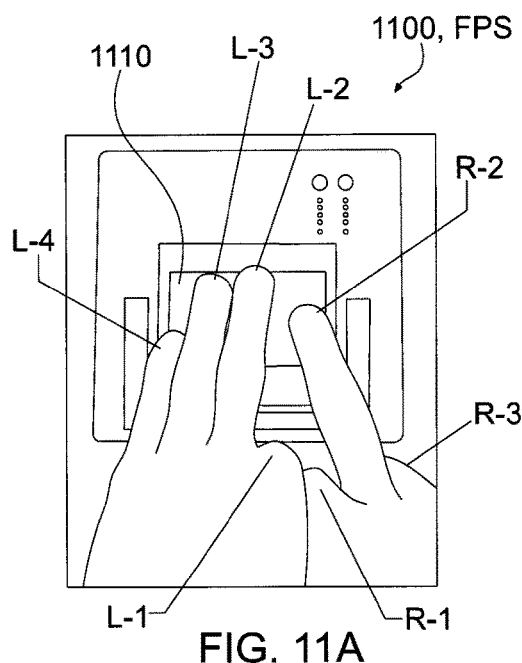
FIG. 11A illustrates a fingerprint scanner device.
Figure 11B:
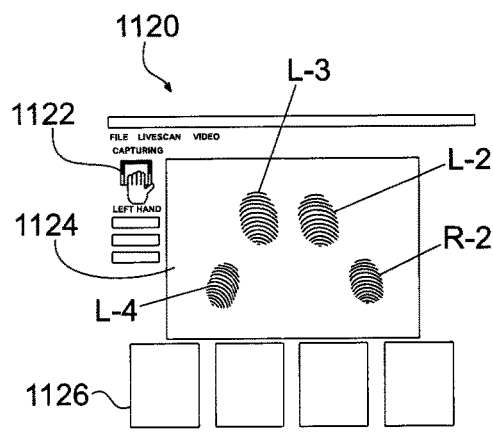
FIG. 11B illustrates a screen display of a fingerprint scanning.
Figure 11C:
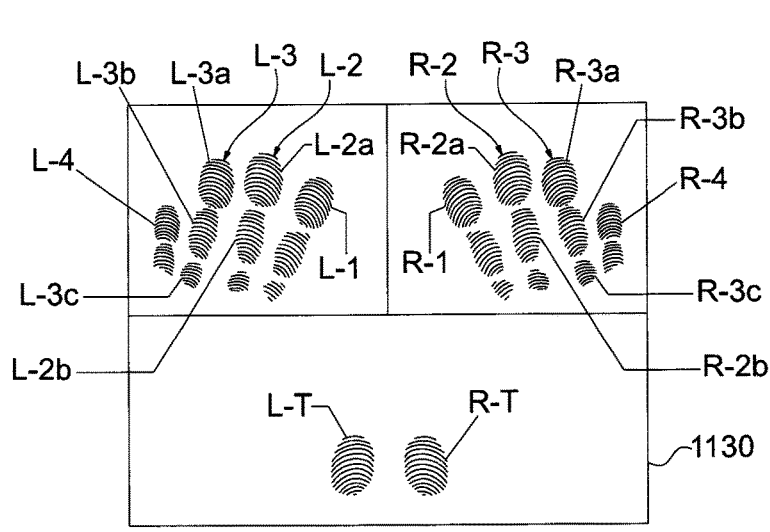
FIG. 11C illustrates a set of scanned fingerprints.
Figure 11D:
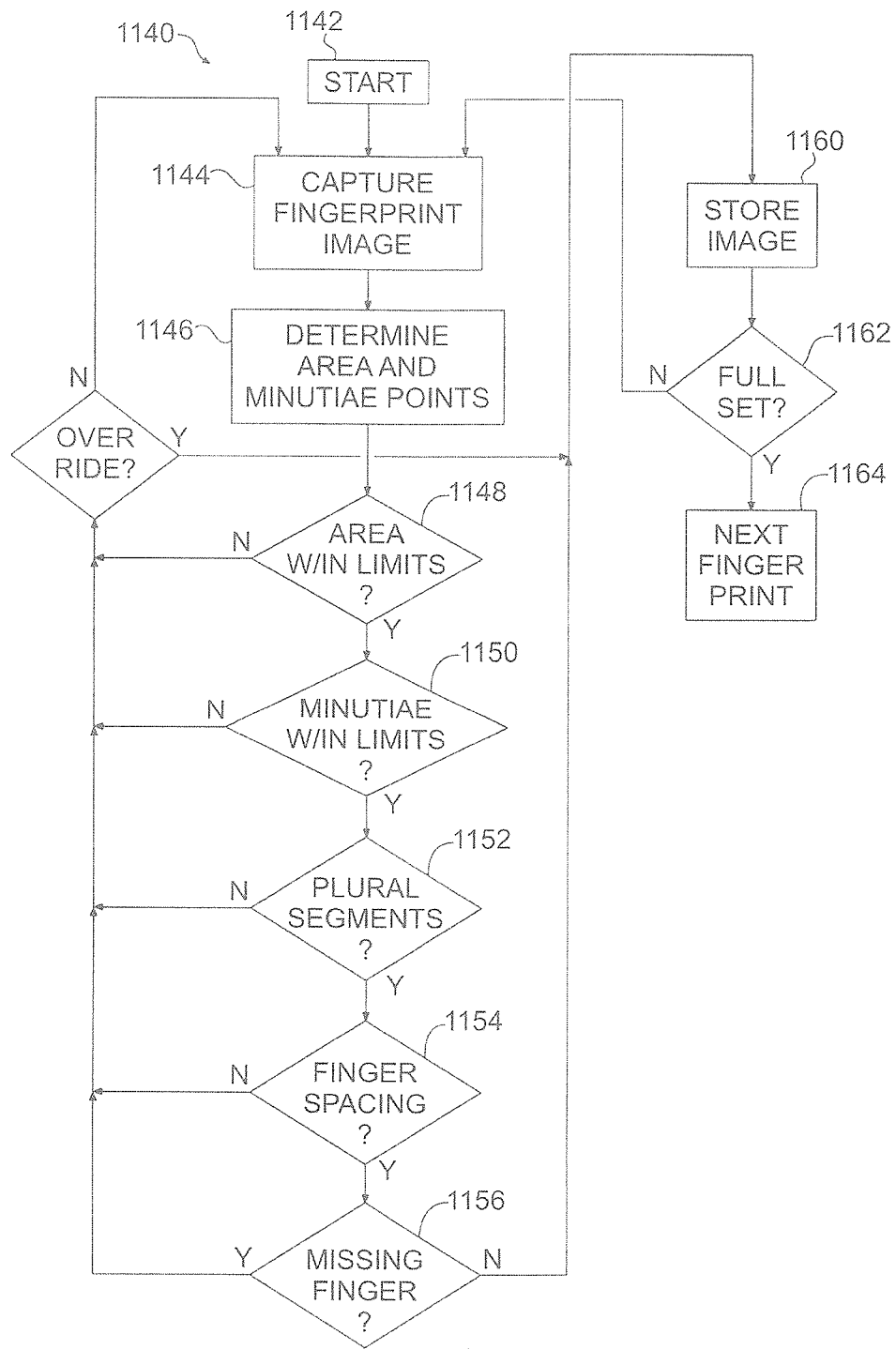
FIG. 11D is a schematic flow diagram of a fingerprint checking process and FIGS. 11E and 11F illustrate display screens relating to fingerprint scanning and quality.
Figure 11E:
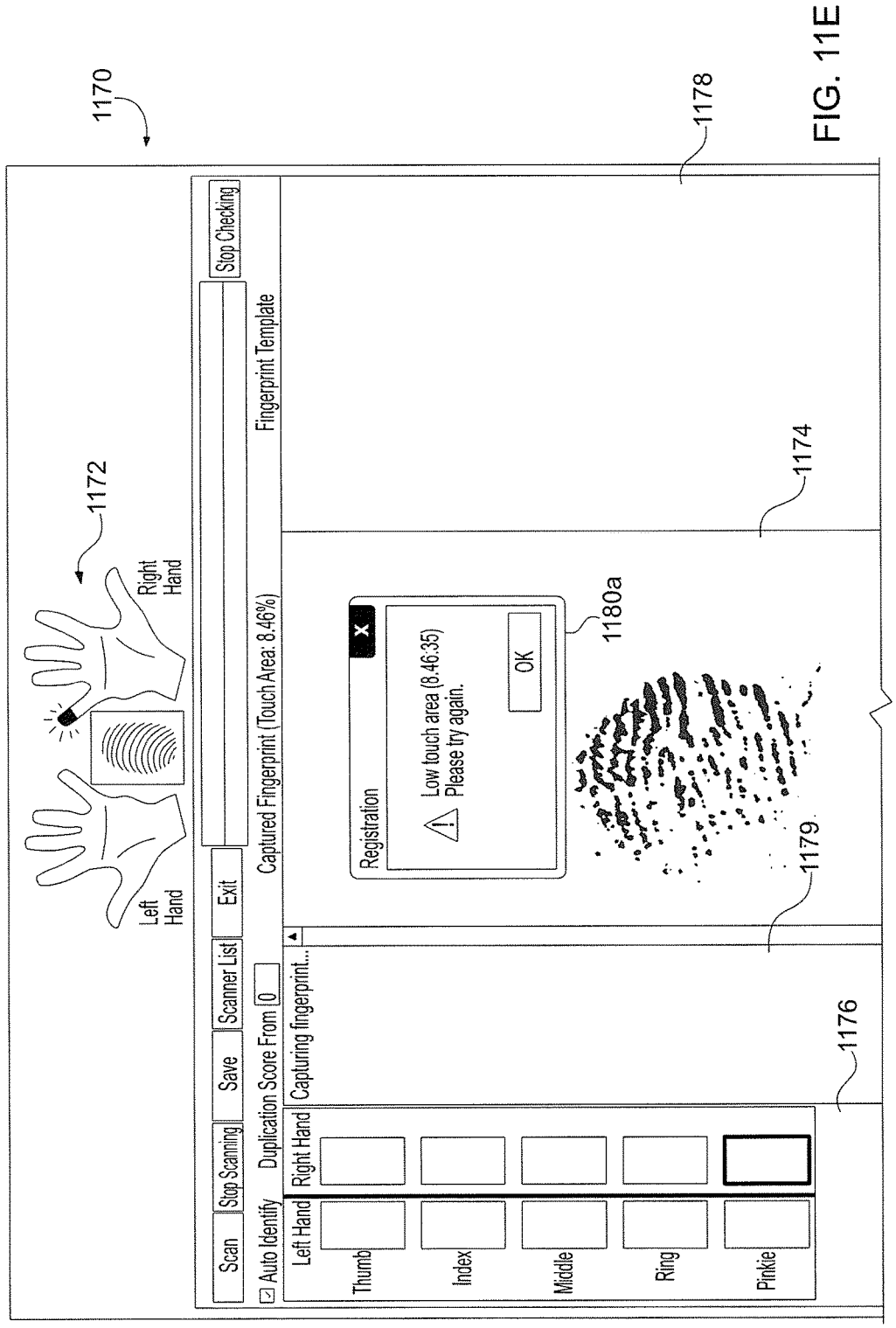
Figure 11F:
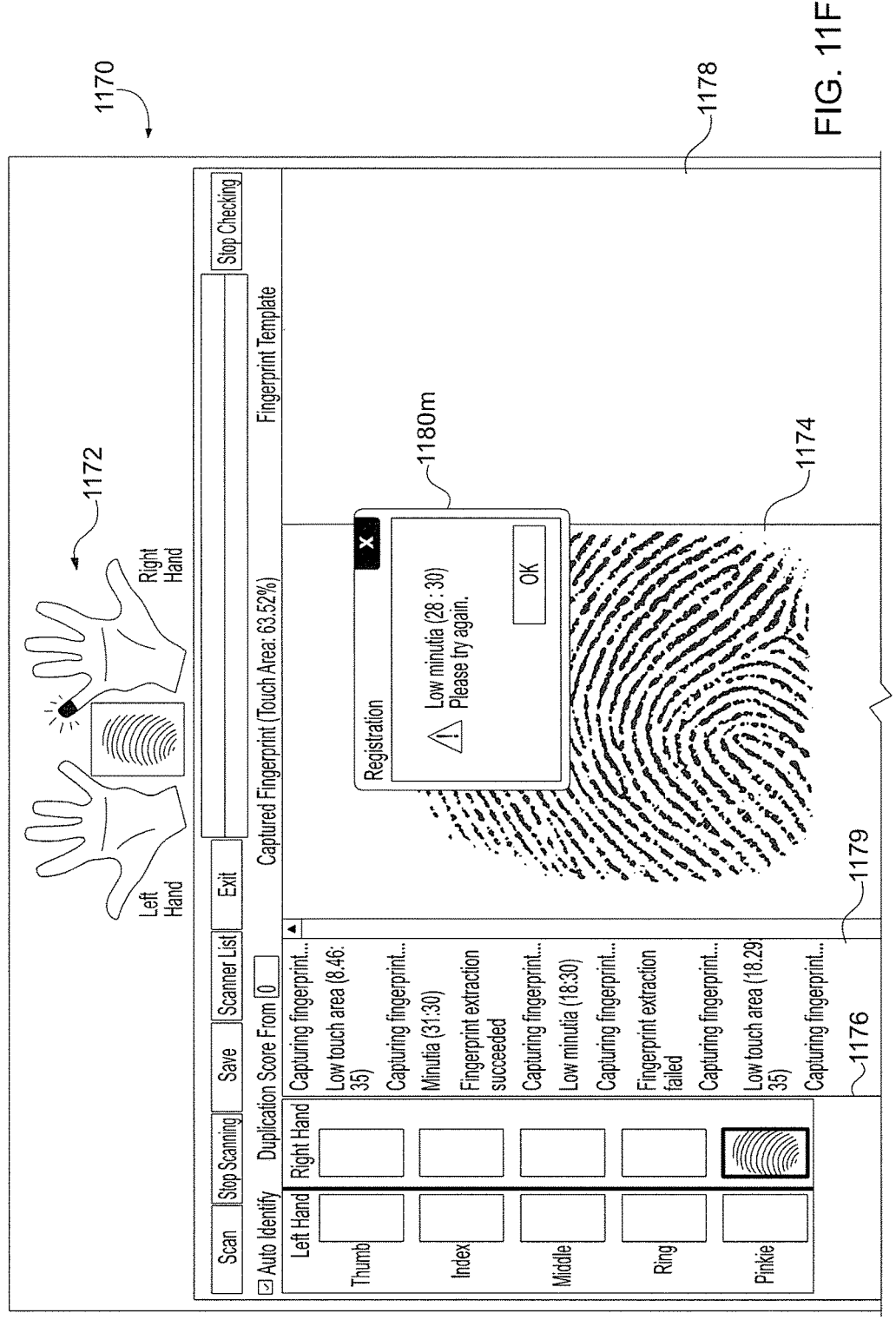

FIG. 11 includes FIGS. 11A which illustrates a fingerprint scanner device 1100, FIG. 11B which illustrates a screen display 1120 of a fingerprint scanning, FIG. 11C which illustrates a set of scanned fingerprints 1130, FIG. 11D which is a schematic flow diagram of a fingerprint checking process 1140, and FIGS. 11E and 11F which illustrate display screens 1170 relating to fingerprint scanning and quality. In FIG. 11A is shown an example fingerprint scanning device FPS, 1100 having a scanning surface 1110 to which the fingers to be scanned for fingerprints are placed. Scanner FPS, 1100 may be light sensitive or heat sensitive or otherwise sensitive to the ridges and valleys of fingerprints for capturing an "image" of the fingerprints. The captured fingerprint "image" need not be an optical image as in a photographic image.

Fingerprint scanner FPS, 110 is preferably connected to the embedded computer or other processor of a BVR unit, if not installed in the BVR unit, and produces display screens on the display of the BVR unit to guide the user through the process of capturing the set of fingerprints. A preferred type of fingerprint scanner FPS, 1100 includes a so-called "4-4-2" fingerprint scanner that is programmed to capture a full set, e.g., ten fingers per set, of fingerprints for each person. A "4-4-2" fingerprint scanner is programmed to capture the four fingers of one hand, e.g., the left hand, then to capture the four fingers of the other hand, and then to capture the two thumb prints, thereby to capture the complete set of fingerprints from sensing surface 1110 in three steps.

Suitable and/or preferred fingerprint scanner devices include FBI certified 4-4-2 fingerprint scanners that provide high quality fingerprint images and high minutiae point count data. Suitable biometric data scanners and/or image enhancement software may be obtained, e.g., from Identification International, Inc. of Houston, Tex., from Suprema Inc. of Gyeonggi, Korea, from Warwick Warp company of Coventry, England, and/or from Neurotechnology corporation of Vilnius, Lithuania.

FIG. 11B illustrates an example screen display 1120 produced by fingerprint scanner 1100, e.g., in capturing the four fingers L-1 through L-4 of the left hand. Status indicator 1122 indicates what step is currently being performed, e.g., capturing the left hand fingers. Display 1124 shows the images of the fingerprints being sensed and when those fingerprints are captured, those fingerprint are then displayed in the display 1126 regions near the bottom of display 1120.

While one might presume that the person whose fingerprints are being captured will properly place his or her fingers on sensing surface 1110, and most do, that may not necessarily be the case. In the normal case, the fingers L-1 through L-4 of the left hand is captured by one fingerprint scan, the fingers R-1 through R-4 of the right hand is captured on one fingerprint scan, and the two thumbs are captured by another fingerprint scan. In the example illustrated, the fingers L-2 to L-4 have been placed on surface 1110, however, the right finger R-3 has been placed on surface 1110 in place of left finger L-1 which is curled. Ordinarily this sort of error or intentional substitution could go undetected by conventional fingerprint scanners which merely record whatever fingerprint image is captured, typically an image of part of the pad between the finger tip and the first joint. In addition, out of order fingers would likely be more difficult to detect as being a duplicate set of fingerprints to the same fingerprints arrayed in the normal order.

The described system includes a fingerprint image checking process 1140 to eliminate the vast majority of improper and/or inadequate fingerprints, and to improve the quality of the fingerprints captured. This method 1140 for checking a fingerprint starts 1142 with the capturing 144 of a fingerprint image, e.g., of the four fingers of one hand. The captured fingerprint image for each finger is analyzed 1146 to determined the area of the fingerprint and the number of minutiae points, e.g., identification points, in the fingerprint image. Adequate area and certain numbers of minutiae, which preferably are different for each finger and the thumb, are necessary to achieve a high degree of differentiation between large numbers of fingerprints as well as for reliably determining fingerprint matches and non-matches with a high degree of confidence, thereby to reduce both false matches and false mis-matches.

FIG. 11C illustrates a typical fingerprint set that is likely to satisfy all of the tests described, e.g., tests for fingerprint area, minutiae points, finger segments, finger spacing and missing fingers, and FIG. 11D illustrates an example embodiment of a process 1140 by which such tests may be made. Fingerprints 1130 include fingers L-1 through L-4 of the left hand in an upper left region, the fingers R-1 through R-4 of the right hand in an upper right region. and the two thumbs L-T and R-T in a lower region. In the illustrated example, certain finger segments are labeled, e.g., finger segments L-3a, L-3b and L-3c of left finger L-3 and finger segments R-3a, R-3b and R-3c of right finger R-3. Ordinarily, thumbs do not have segments as do the other fingers.

A number of different characteristics of the fingerprints are tested, some for individual fingers and some for groups of fingers, e.g., an image of four fingers, and the order in which the various tests are performed may be ordered differently than in the example illustrated. Screen displays 1170 may be provided to indicate progress in capturing fingerprint biometric data and to indicate the exceptions, if any, to the normal and/or allowable limits of the acceptability criteria therefor. Screen display 1170 may have, e.g., an indicator 1172 that indicates the status of the capturing and testing process, e.g., as where five fingered hand icons 1172 are displayed near the top thereof and the finger being captured and/or tested may be highlighted (right first finger illustrated), colored or otherwise made visually different from the other fingers. The fingerprint currently being captured and/or processed may be displayed in a Captured Fingerprint region 1174 where it can be visually inspected if and as necessary, e.g., where an override 1158 might be possible. The enhanced fingerprint image, sometimes referred to as a fingerprint template, may be displayed in a region 1178 illustrated adjacent captured image region 1174, if the fingerprint data is acceptable within the predetermined quality limits for fingerprint data. Region 1179 may display the operating status for the fingerprint capturing process, e.g., by listing the steps thereof as completed and/or in progress.

As fingerprints are successfully captured and tested, they may be displayed in a ten segment region 1176 here illustrated as being along the left side of the display 1170. Where an exception or other unusual event occurs, a pop-up display window 1180 may be displayed to provide information relating thereto. For example, pop-up display window 1180a in FIG. 11E indicates that the captured fingerprint has a touch area that is less than the acceptable minimum area therefor, and pop-up display window 1180m in FIG. 11F indicates that the captured fingerprint has a number of minutiae points that is less than the acceptable lower limit therefor. Other pop-up windows may be provided for others of tests 1148-1156 and/or for other tests and/or conditions that may occur, e.g., when the fingerprint scanner needs attention, e.g., the scanner surface needs cleaning.

For example, the area of each the fingerprint for each finger is tested 1148 to determine whether the area of the fingerprint is of sufficient size for proper analysis and characterization. If the area is within limits 1148-Y, then the next test or operation may be performed, but if not 1148-N, then an override 1158 may be needed and may be performed. Test 1148 is performed for each finger whether the image thereof is captured in a scan of four fingers of one hand or in a scan of two thumbs or in a scan of an individual finger.

In another example, the area of number of minutiae points for the fingerprint for each finger is tested 1150 to determine whether the number of minutiae determined is sufficient for proper characterization and identification. If the number of minutiae is within limits 1150-Y, then the next test or operation may be performed, but if not 1150-N, then an override 1158 may be needed and may be performed. Test 1150 is performed for each finger whether the image thereof is captured in a scan of four fingers of one hand or in a scan of two thumbs or in a scan of an individual finger.

In another example, the number of finger segments for the fingerprint for each finger is tested 1152 to determine whether the number of finger segments for each of the fingers is sufficient to indicate that the fingers were likely from one hand placed together on the scanner surface 1110.

If the numbers of finger segments are within limits 1152-Y, then the next test or operation may be performed, but if not 1152-N, then an override 1158 may be needed and may be performed. Test 1152 is performed for each finger whether the image thereof is captured in a scan of four fingers of one hand or of an individual finger.

In yet another example, the relative locations of finger segments for the fingerprint for the fingers and/or the spacing of the fingers is tested 1154 to determine whether the relative locations of the finger segments for the fingers of one hand and/or the spacing thereof are in relative locations likely to indicate that the fingers were from one hand placed together on the scanner surface 1110. If the locations of finger segments for the fingers and/or the spacing thereof are within limits 1154-Y, then the next test or operation may be performed, but if not 1154-N, then an override 1158 may be needed and may be performed. Test 1154 is performed for the fingers of one hand when the image thereof is captured in a scan of four fingers.

In yet another example, the presence of all expected fingers, e.g., of four fingers of each hand and the two thumbs, is tested 1156 to determine whether or not all of the expected fingers are present. If all of the fingers are present 1156-Y, then the next test or operation may be performed, but if not 1156-N, then an override 1158 may be needed and may be performed. Test 1156 is performed for the fingers and thumbs of both hands irrespective of how the image thereof is captured.

Override 1158 is provided to allow the registration process to continue where there are certain predetermined exceptions to the captured fingerprints satisfying any one or more of the testing criteria and/or limits. Preferably, the override 1158 requires the intervention of a registration official who is trained to deal with the permitted exceptions. For example, if the registration official determines that the person seeking to register is in fact missing one or more fingers, then the official can override 1158 the failure of test 1156. If the registration official determines that a person's finger prints are worn or otherwise defaced, e.g., as a result of manual labor or scaring, so that the number of minutiae points determined is below the minimum limit, then the registration official may override 1158 the normal test 1150 limit in favor of a reduced test limit, or may be required to re-capture the fingerprints one or more times before the test 1150 limit may be reduced. Typically, override 1158 may not be permitted where the number of finger segments is below test 1152 limits or where the finger spacing is outside of test 1154 limits, unless the election official determines that a physical infirmity, deformity or other physical condition prevents the person from placing his or her fingers on the scanner surface 1110 in the usual position.

When all of the tests 1148-1156 have been satisfied and/or overridden 1158, the next operation is to store 1160 the captured fingerprint image, e.g., the biometric data representing the fingerprint. If the full set of fingerprints have been captured 1162-Y, e.g., as ten individual fingerprints comprising a set of fingerprints or as four plus four fingers plus two thumbs in a 4-4-2 fingerprint scan, then process 1140 is completed and waits to capture 1164 the fingerprints of the next person seeking to register. If the full set of fingerprints have not been captured 1162-N, then process 1140 returns one or more times to capturing 1144 the next fingerprint or fingerprints, thereby to be working towards capturing a full set of fingerprints.

Figure 12A:
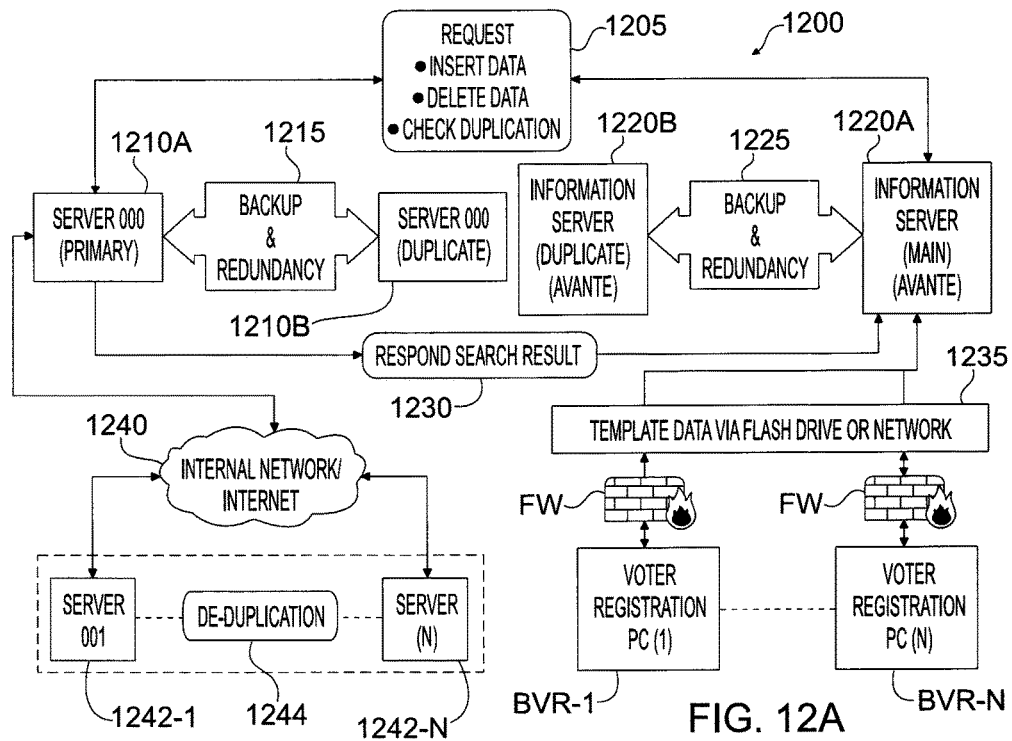
FIGS. 12A and 12B are schematic block diagrams of an example embodiment of a de-duplication system and method.
Figure 12B:
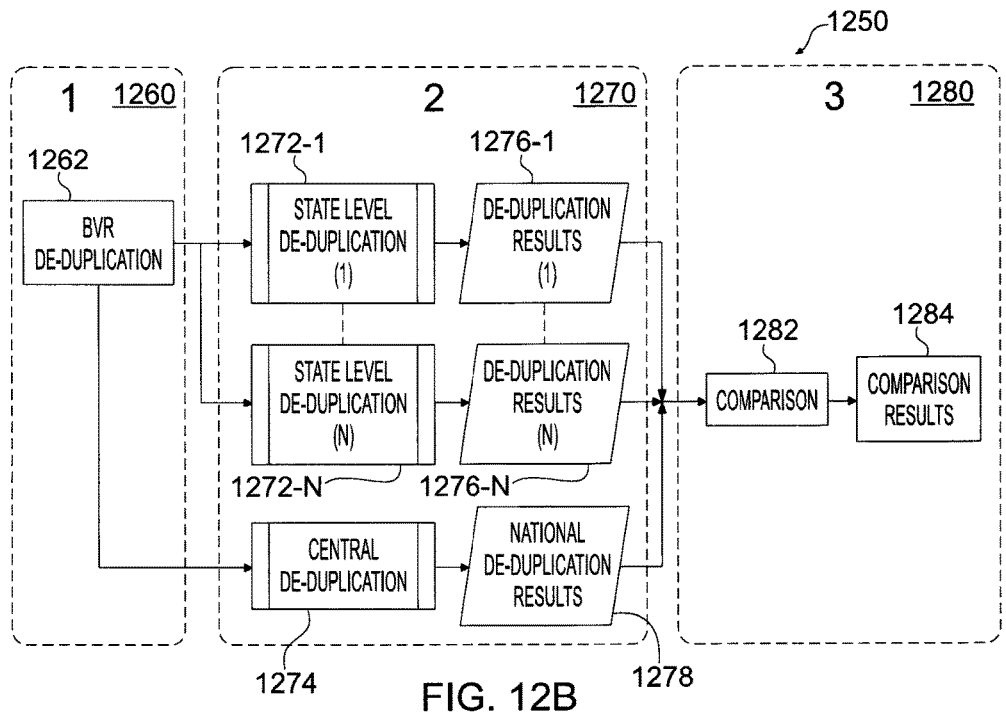
Figure 13:
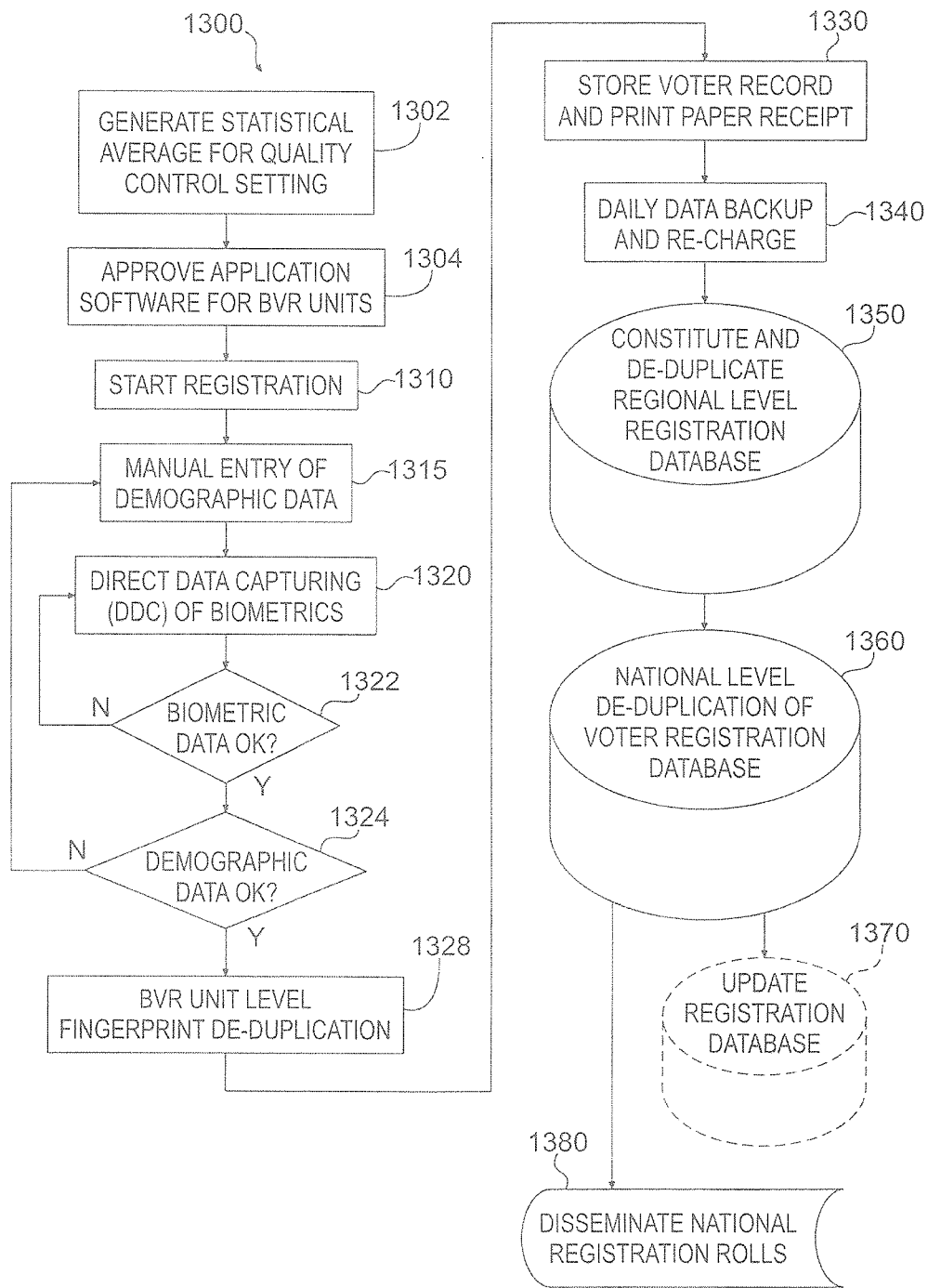
FIG. 13 is a schematic flow diagram illustrating the flow of information and data in an example embodiment of a de-duplication aspect of a voting system and method according to the present arrangement.

FIGS. 12A and 12B are schematic block diagrams of an example embodiment of a de-duplication system and method 1200, 1250, and FIG. 13 is a schematic flow diagram illustrating the flow of information and data in an example embodiment 1300 of a de-duplication aspect of a voting system and method according to the present arrangement. Because persons may seek to register more than once or may succeed in registering more than once, and may do so at different geographic and/or jurisdictional locations, system 100 provides for identifying duplicate registrations and removing duplicate registrations, a process sometimes referred to herein as "de-duplication." Some duplicative registration may be normal, e.g., as where a person moves to a new residence and seeks to register there without canceling his registration at a previous residence, and some may involve seeking to be able to vote more than once. No matter the reason, duplicate registrations are undesirable and should be minimized. De-duplication may be, and preferably is, performed more than once and at different times and/or at different places during the registration process.

For example, as described above, de-duplication may be and preferably is performed on each BVR unit essentially continuously, e.g., in "real time," at the end of a registration session and/or day, and/or at the end of a registration season. De-duplication may also be performed at local, regional (e.g., state or provincial) and/or central (e.g., state or national) registration centers on and by the servers and/or other computers thereof. De-duplication at any or all levels may be performed essentially continuously, e.g., as data is received and stored, or at one or more predetermined times, at the end of one or more predetermined periods, and/or at any time that may be desired.

A de-duplication center 1200 may be configured to operate at one or more levels of a registration system. On request 1205, e.g., to insert data into a database, to delete data from a database and/or to check for duplications, server 1210A, and its duplicate (or backup) server 1210B conduct a de-duplication search of their respective databases to identify duplicative registrations and to report 1230 the identified duplicative registrations to information servers 1220. Server 1210A and its duplicate server 1210B are interconnected by a backup and redundancy unit 1215 that allows certain data communication there between while preserving the separate integrity of servers 1210A and 1210B.

Information server 1220A, and its duplicate (or backup) server 1220B, receive the search results report 1230 and respond by associating duplicate records and eliminating the duplicate record in accordance with predetermined criteria. Information server 1220A, and its duplicate (or backup) server 1220B are interconnected by a backup and redundancy unit 1225 that allows certain data communication while preserving the separate integrity of servers 1220A and 1220B.

Voter registration BVR units BVR-1 through BVR-N accumulate database records of registrations as persons register thereon and communicate 1235 those records, e.g., via one or more firewalls FW, to information servers 1220. Communication 1235 may include transfer of physical media, e.g., a hard drive, flash drive, CD data disk and the like, and/or may include data transfer via the Internet and/or another network. After receipt of registration records from BVR units BVR-1 to BVR-N, servers 1220 may perform a database search to identify duplicate registrations and may then generate a request 1205 for servers 1210 to further search for duplicate registrations and/or to confirm duplicate registrations that servers 1220 may have identified.

De-duplication may also be performed between and among servers whether located relatively near to each other, e.g., in the same room or building, or relatively remotely, e.g., in different buildings, cities, states and/or countries ans do forth. For example, servers 1210 may communicate 1240, e.g., via the Internet and/or another network, with one or more servers 1242-1 through 1242-N, wherein servers 1242-1 through 1242-N perform de-duplication among themselves and/or with servers 1210

The de-duplication process or method 1250 may be considered to comprise one or more de-duplication operations. De-duplication 1260 of one or more BVR units 1262 may be and preferably is performed as a separate de-duplication operation 1262 for the records generated and stored therein, e.g., in a registration database, to identify and/or remove duplicate registrations therefrom. In another de-duplication operation, 1270 regional servers 1272-1 to 1272-N and/or one or more central servers 1274 may each perform a de-duplication operation, and the results of each of these de-duplication operations is reported 1276-1 to 1276-N and 1278. The reported de-duplication results 1276-1 to 1276-N, 1278 are combined 1282 and compared 1282 to produce comparison results 1284 from which data relating to duplicate registrations may be generated and analyzed, and removal of duplicate registrations may be confirmed.

Because there will usually be available computer processing capacity and time at the regional and central servers 1210, 1220, especially at times when registrations are being conducted, de-duplication on and by those servers 1210, 1220 may be performed in much greater detail than might be practical for a BVR unit, especially when the BVR unit is being utilized for conducting registrations. For example, regional and/or central de-duplication by comparing the biometric fingerprint data of each and every individual finger in the constituted (cumulative) registration database to the biometric fingerprint data of each and every other finger in the constituted registration database which typically covers the registrations of many persons who may be located throughout plural regions, provinces, states and the like.

In addition, regional and/or central de-duplication of biometric data using ten finger minutiae point sets and/or using facial image biometric data may also be performed, and may be preferred at the central or national level where there is a very large number of persons registered, e.g., one million or more. Further, regional and/or central de-duplication of entered demographic data may also be performed, e.g., by searching for combinations of demographic data such as name and occupation/profession, name and age/birth date, and the like.

Where GIS data, GPS data and/or other location data of the location at which registrations are made is acquired and stored, de-duplication may include searching the database to identify registrations where the relationship between the registrant's address data and the GIS, GPS and/or other location data is unusual, e.g., far apart, or where a registrant's address differs from that appearing to be for the same person in another government record, e.g., a driver's license database, a professional license database, an identification card and/or passport database, and the like, and then inquiring and/or investigating those registrations identified by the database search or searches.

Plural levels of de-duplication as described are seen to provide not only a more thorough and accurate de-duplication, but one that also makes efficient use of computing resources, e.g., at the BVR unit level as well as at regional and central processing levels Immediate de-duplication at the BVR level efficiently identifies local attempts at duplicate registration where it is in many ways more likely to occur. At the BVR unit level finger by finger de-duplication comparisons can be made without requiring substantial computer resources as would be required for finger by finger de-duplication at the regional and/or national levels where there are substantially more fingerprints to be de-duplicated. With finger by finger comparison coupled with other quality checks as described, a "known good set" of fingerprints for each person registering may be obtained by the BVR unit at the local level, and the known good set may then be employed as the basis for fingerprint de-duplication at the regional and/or central levels.

Fingerprints determined by de-duplication to be duplicates may be again de-duplicated using a higher comparison limit for a more accurate comparison, or may be again de-duplication using a different fingerprint comparison engine and/or software. Further, fingerprints determined by de-duplication to be duplicates may be compared by a trained official, e.g., considering captured digital fingerprint images and/or enhanced images, for final determination, including using other data sources, e.g., demographic data, other databases.

FIG. 13 is a schematic flow diagram illustrating the flow of information and data in an example embodiment of a de-duplication aspect 1300 of a voting system and method according to the present arrangement. Process 1300 begins with the generation 1302 and testing of statistical average data useful for determining quality control limits useful in de-duplication process 1300. Examples thereof may include values for finger-specific minutiae and for finger-specific area ratios, it being preferred that different minutiae limits be predetermined for different fingers given the relatively different sizes of their fingerprints, e.g., a thumb being larger than an index finger which is larger than the pinkie finger. Further examples may include allowable ranges of finger spacings for 4-4-2 fingerprint scans and finger segment completeness values for 4-4-2 fingerprint scans.

After the various limit values are determined and approved 1304, e.g., by the election authority, the values are loaded into the BVR unit software which is verified and approved 1304 before being loaded into the BVR units in preparation for the start 1310 of registration. Registration then commences and demographic data is entered 1315, e.g., manually, as described, and biometric data is captured 1320, e.g., by direct data capturing (DDC), from biometric data capturing devices, e.g., fingerprint scanners such as 4-4-2 fingerprint scanners FPS, and image cameras IC, e.g., webcams. Entered 1315 demographic data and DDC 1320 biometric data are tested 1322, 1324 to confirm that they meet the data quality requirements, similarly to the tests 122, 124 described in relation to FIG. 1.

Facial image biometric data are hashed for each facial image and fingerprint biometric data, e.g., fingerprint images and minutiae templates, are hashed for each finger and are again hashed as a set of ten fingerprints for a particular registrant, thereby to preclude their being changed and/or replaced by other data. As a result, the de-duplicated fingerprints produce a "known good set" of fingerprints for each registrant.

Unit level de-duplication for the BVR unit de-duplication 1328, e.g., of fingerprint biometric data, is performed on the biometric data and possibly on other data captured during registration, e.g., by comparing templates representative of the minutiae points data of the fingerprints of individual fingers. BVR unit level de-duplication 1328 may be performed as biometric data is captured, e.g., in "real time," and/or at any desired time or times, as described. Such comparisons may employ fingerprint image enhancement technology, which increases the number of minutiae points identified, such as Warwick Warp image enhancement technology available from the Warwick Warp company located in Coventry, England.

Apparently duplicate registrations may be defined as registrations where the biometric data, e.g., fingerprint and/or facial image data, substantially match. Where apparently duplicate registrations are identified, the duplicate records may be deleted, e.g., marked as a duplicate registration, and/or reserved for review and adjudication by registration officials. Registration and/or election officials may review and adjudicate biometric data, e.g., fingerprint and/or facial image data, for apparently duplicate registrations, as well as demographic data, before the apparently duplicate registrations are removed as active registrations or are deleted; apparently duplicate registrations may be submitted to further investigation.

As described, when each registration is completed, a registration receipt and/or registration card is printed 1330 for the registrant as confirmation of registration and of the capturing of a known good set of biometric data. BVR unit data is backed up 1340 daily or more frequently to protect the data gathered thereby and are charged 1340 and/or receive a replacement power source daily, so as to be ready for the next registration session.

Registration data from all of the BVR units are communicated to a regional 1350 and/or central 1360 registration server where the registration data is entered into a registration database to constitute 1350, 1360 a registration roll and is again de-duplicated at that regional and/or central server. While BVR unit level de-duplication removes duplicate registrations made at that BVR unit, the regional and/or central de-duplication of the combined registration data from many BVR units serves to remove duplicate registrations made on different BVR units, and can be very effective because the biometric data from the BVR units includes known good sets of fingerprints from the individual persons who registered thereon, and may also include the raw biometric data captured, and all of the biometric data is linked with the demographic data for that person which has also been hashed to prevent it being changed or replaced.

After the registration data is constituted and de-duplicated 1360 at the central or national level, registration databases are updated 1370 which may be done at defined times and/or substantially continuously. The registration database is disseminated and/or distributed 1380 as a national registration roll, e.g., in the form of electronic poll books that can be loaded into BVR units which may then be used as voter identity verification units and as electronic voting machines as described.

Figure 14:
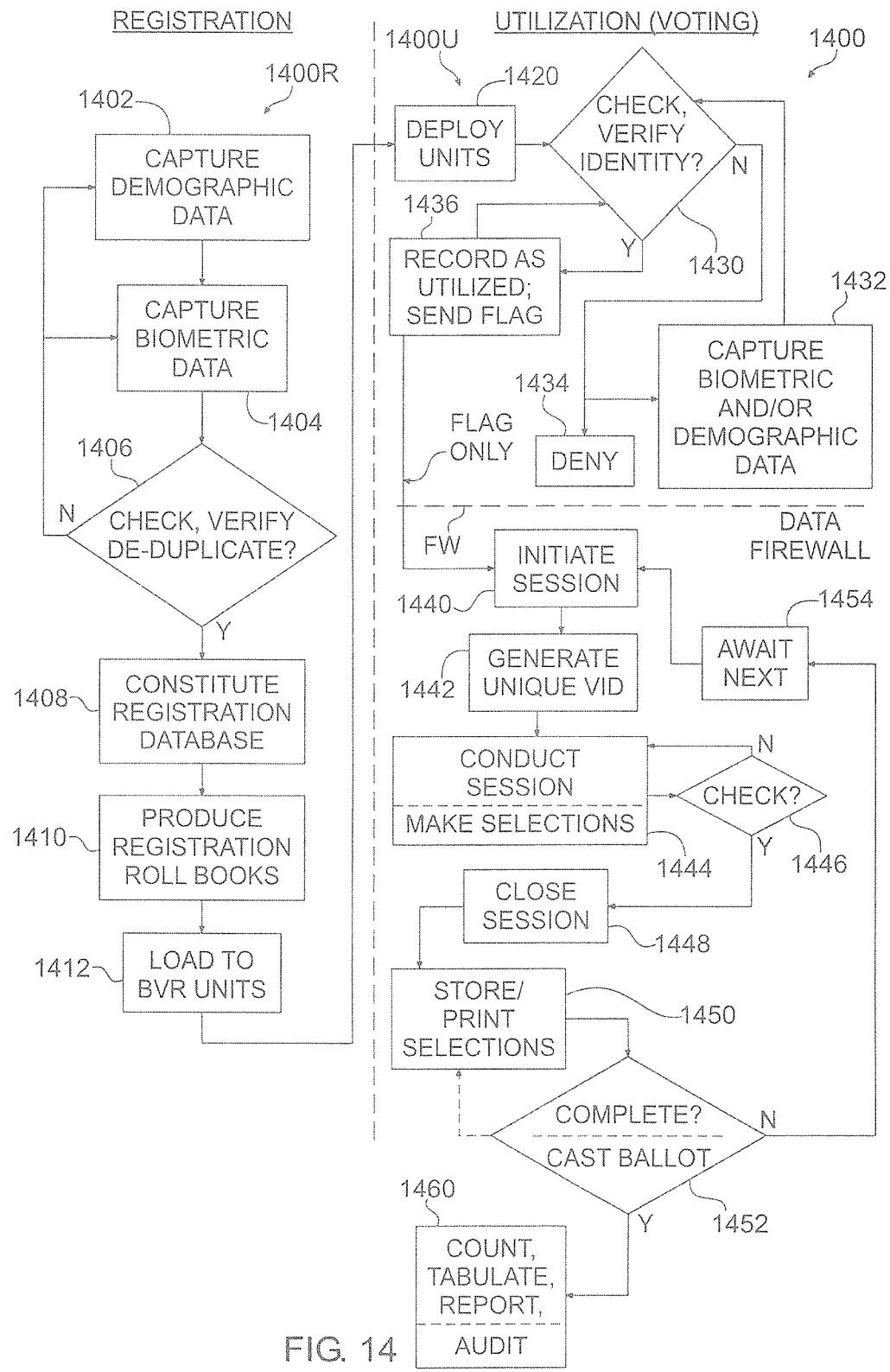
FIG. 14 is a schematic flow diagram illustrating an example embodiment of a registration and utilization system and process as described herein.

FIG. 14 is a schematic flow diagram illustrating an example embodiment 1400 of a registration 1400R and utilization 1400U system and process as described herein. System and process 1400 is in certain respects simplified from the detailed descriptions thereof herein above to facilitate understanding of the overall system and process. Registration 1400R may include capturing 1402 of biometric data, capturing 1404 of demographic data and the checking, verification and/or de-duplication of such registration data 1406 as described herein, e.g., employing a BVR unit. Acquired registration data is accumulated 1408, e.g., by uploading from registration BVR units to local, regional and/or central registration databases, thereby to constitute 1408 a database of the registrations from which may be produced 1410 registration roll books which may be downloaded (loaded) 1412 to BVR units on which has been installed utilization software, e.g., software usable for voting and/or for producing voting ballots and/or forms.

The various BVR units are transported to utilization locations, e.g., polling places if for voting, where they are deployed 1420, e.g., set up and activated for utilization. If for voting the deployed BVR units are preferably usable for verification of voter registration and/or for voting, e.g., different BVR units may be utilized for registration verification and for voting, or a BVR unit may be utilized for both registration verification and voting—the BVR unit is configured to perform both utilizations, however, officials may choose to use different BVR units for different aspects of a utilization.

In utilization, biometric data and/or demographic data of a person presenting himself, e.g., to vote, is captured 1432 and is checked and verified 1430 against the biometric and demographic data of registered persons as stored in the BVR unit. The captured 1432 biometric data utilized in identifying the person may be stored so as to provide for an audit of the verification process and practice. If the captured 1432 data is not verified 1430-N with the registration roll book data stored 1412 in the BVR unit, then another one or more data captures 1432 may be permitted before the person is denied 1434 to participate or the person may immediately be denied to participate. In voting, the denied 1434 person may be permitted to vote by provisional ballot which will be verified, typically after the voting is completed, before the votes thereof are counted.

If the captured 1432 data is verified 1430-Y as corresponding to a registered person, then that registered person is recorded 1436 as having participated, e.g., as having voted, and a flag signal is sent to activate the operating, e.g., voting, function of the BVR unit. The flag signal is just that—an enabling signal that is completely devoid of any information or data that could be connected and/or correlated with the registered person, his or her registration data and/or identity. This provides that in the following functions 1440 and up, the identity of the registered person is completely hidden and undetectable, and so there is anonymity and secrecy afforded to the participant, which is considered extremely important, if not critical, for a secret ballot election. Of course, this anonymity feature may be disabled and/or not utilized where the BVR unit is utilized for another function, e.g., registering for and obtaining a government benefit, such as a driver's license, health care and/or social welfare assistance, and the like.

In response to the flag signal, a participation session, e.g., voting session, is initiated 1440 and the BVR unit generates 1442 a unique random identifier, e.g., a VID identifier, that uniquely identifies the voting session and is associated with all data from the voting session and is stored 1450 therewith at the end of the session. A complete description of the use of session identifiers, e.g., VID numbers and BID numbers, that may be adapted for use with the present arrangement may be found in certain of Applicant's patents listed herein above and incorporated herein by reference, e.g., U.S. Pat. Nos. 7,431,209 and 7,635,087. While the identifiers may be referred to as VID numbers and BID numbers, the characters and/or symbols comprising the VID numbers and BID numbers need not be numerals, but may be any character and/or symbol.

After initiating 1440 a participation session and generating 1442 a unique, randomly generated identifier VID, the BVR unit conducts 1444 the session, e.g., for voting by the participant making voting selections, e.g., selecting candidates in one or more contests and/or selecting responses to one or more referenda, constitutional amendments and/or other questions, typically by touching icons and/or symbols on the touch screen TS and/or data input device KB thereof.

At the end of making selections for each voting screen and at the end of making selections for all voting screens, the voting selections preferably are checked 1446, e.g., for completeness, for under voting and for over voting in each contest and/or question. If the check 1446 finds any condition other than a ballot that is complete and ready to be cast, process 1400U returns to conducting 1444 the session presenting again the screens that did not check 1446. The participant eventually completes all of the voting screens and/or intentionally accepts those voting selections that did not check 1446, and casts or submits 1448 his selections, e.g., ballot in voting, to close 1448 the session.

In closing 1448 the session, the BVR unit preferably hashes and encrypts the set of voting selections for the voting session along with the VID identifier thereof, for security and for providing a complete audit trail for each voting session via the VID identifier. The hashed and encrypted voting session result (data) is stored 1450, preferably in two or more non-volatile WORM memory devices as described. The voting session data may also include identifying information for the BVR unit and ballot style (form). The voting session data preferably is stored 1450 in a randomized order in the one or more memory devices and not in order of voting order. Preferably a tangible receipt is printed 1450 which includes a representation of the set of voting selections for each voting session at the completion 1452 of each voting session.

Where the BVR unit is utilized in a non-voting context, a date time stamp may be associated with the session data, but in a voting setting, a date time stamp should not be utilized so as to avoid any connection through the date and time, e.g., via surveillance video monitoring, to the identify of the voter. However, a date time stamp may be associated with the checking in and verification 1430 of the registered participant to participate in a session, where it cannot be associated with the voting session because only an enabling flag signal may be transmitted through the data firewall FW.

Where voting is by paper ballot, the printed 1450 tangible receipt may be in the form of a ballot sheet which has all of the voting contests and/or questions printed thereon and may further have the voting selections made by the participant marked by printing 1450 thereon. This provides an additional opportunity for the participant to review and verify that the marked ballot sheet accurately and completely reflects the intended voting selections before it is cast by being scanned by a ballot reader. Preferably, the ballot sheet is printed 1450 on a sheet that provides copy-evident security features, as described in certain of Applicant's patents listed herein above and incorporated herein by reference, e.g., in U.S. Pat. No. 8,066,184. In addition, the uniformity and consistency of selection markings on a printed ballot sheet serves to assure a more consistent reading of the ballot sheet.

To complete 1452 the voting, the voter places the printed 1450 ballot sheet into a ballot "box" that includes a ballot sheet scanner and/or reader that decodes the VID to identify the ballot jurisdiction and style, and to decode the voting selections marked (printed 1450) thereon. Example embodiments of ballot readers that may be adapted for use with the present arrangement may be found in found in certain of Applicant's patents listed herein above and incorporated herein by reference, e.g., U.S. Pat. Nos. 7,635,087 and 7,828,215. Upon completion 1452 of a participation session, but not of a day or session of voting 1452-N, the BVR unit awaits 1454 the next session which begins at the initiation and/or opening 1440 thereof.

When all participation sessions are completed 1452-Y, the voting session results stored 1450 by the BVR unit are communicated as described to regional and/or central locations to be counted, tabulated and reported 1460, as described herein. The count and/or tabulation may be audited 1460 if necessary or desired, and the audit may be made on a participation session by participation session basis, e.g., on a ballot by ballot basis, with full transparency provided by the VID identifier being associated with both the electronic record of the participation session, e.g., the voting selections made in each voting session.

A biometric registration and verification system usable for registration, for verification and/or for participation, the system may comprise: a biometric sensor for capturing identifying biometric data of a person to be registered, a data entry device for receiving entered data; a computer processor coupled to the biometric sensor and to the data entry device for receiving captured identifying biometric data and entered data; a registration database coupled to the computer processor for storing registration records representing the identifying biometric data and the entered data for the person to be registered, wherein the identifying biometric data of the person to be registered is related to the entered data in the database registration record thereof; whereby the person to be registered is registered according to the stored registration record; wherein the biometric sensor captures verification biometric data of a person to be verified; wherein the data entry device receives verification data of the person to be verified, wherein the computer processor compares the verification biometric data and the received verification data of the person to be verified with the identifying biometric data and entered data from the registration database, and if the verification biometric data and the received verification data of the person to be verified corresponds to identifying biometric data and entered data from the registration database, then providing an indication of verification of the person to be verified, whereby the person to be verified is verified against the registration database record of the person registered. The biometric sensor may include: a fingerprint scanner, a 4-4-2 fingerprint scanner, an image camera, an eye scanner, a digital signature touch pad, or a combination thereof. The biometric data may include: a fingerprint, a set of fingerprints, a facial image, an eye scan, an iris scan, a digital signature, or a combination thereof. The computer processor may enhance an image of the biometric data. At least one measurable characteristic of the identifying biometric data may be tested against one or more predetermined quality thresholds, wherein the one or more predetermined quality thresholds relate to measurable characteristics of fingerprint biometric data, facial image biometric data, iris image biometric data, and digital signature biometric data, or a combination thereof. The predetermined quality threshold for fingerprint biometric data may include at least one of: an area of a captured fingerprint image, a number of distinguishable fingerprint characteristics, a number of distinguishable fingerprint minutiae, a number of distinguishable fingerprint minutiae for each individual finger, a number of finger segments for a finger, or a combination thereof. The at least one predetermined quality threshold for fingerprint biometric data may be different for different fingers and/or for a thumb. At least one predetermined quality threshold for fingerprint biometric data may be automatically changed by a predetermined amount if the quality threshold is not met after a predetermined number of repeated attempts. A predetermined quality threshold for facial image biometric data may include at least one of head tilt, facial completeness, an eye being open, an eye being closed, face size, or a combination thereof. The entered data may include: name data, address data, physical data, age data, gender data, birth date data, occupation data, location data, passport data, identity card data, or a combination thereof. The biometric registration and verification system may further comprise: a printer providing a tangible record of a registration including all or part of the identifying biometric data, the entered data, or both. The biometric registration and verification system may be configured for conducting voter registration and voting, wherein the provided indication of verification of the person to be verified enables the data entry device and the computer processor to conduct a voting session and generate a unique randomized voting session identifier, wherein voting selections made in the voting session are stored and are associated with the voting session identifier. The voting session identifier preferably is not related to and cannot be related to the identity or registration of the person registered or of the person to be verified. The biometric registration and verification system may further comprise a printer, wherein the printer prints a ballot sheet having the voting selections made in the voting session and the voting session identifier printed thereon. The captured biometric data may comprise: fingerprint images, 4-4-2 fingerprint images, enhanced fingerprint images, fingerprint minutiae points, or a combination thereof, and the computer processor may compare captured biometric data for each fingerprint with the biometric data captured for all previous fingerprints for identifying duplicate registrations. The captured biometric data may be de-duplicated; or the captured biometric data may be communicated to a regional and/or central database, and the regional and/or central database may be de-duplicated; or the captured biometric data may be de-duplicated and may be communicated to a regional and/or central database and the regional and/or central database may be de-duplicated. The captured biometric data may include fingerprint biometric data and may be tested for a minimum fingerprint area, for minimum minutiae points, for a number of finger segments, for finger spacing, for finger order, or for any combination thereof. The minimum fingerprint area, the minimum minutiae points, the number of finger segments, the finger spacing, the finger order, or any combination thereof may be different for different fingers and/or for thumbs. The biometric registration and verification system may further comprise: an uninterruptible power supply, or an external power source, or a solar power source, or a barcode scanner, or an RFID reader, or an RFID writer, or a document scanner, or a signature digitizer, or any combination thereof.

A biometric registration and verification method usable for registration, for verification and/or for participation, the method may comprise: capturing identifying biometric data of a person to be registered; receiving entered data; receiving captured identifying biometric data and entered data; storing registration records representing the identifying biometric data and the entered data for the person to be registered in a database, wherein the identifying biometric data of the person to be registered may be related to the entered data in the database registration record thereof; whereby the person to be registered is registered according to the stored registration record; then: capturing verification biometric data of a person to be verified; receiving verification data of the person to be verified, comparing the verification biometric data and the received verification data of the person to be verified with the identifying biometric data and entered data from the registration database, and if the verification biometric data and the received verification data of the person to be verified corresponds to identifying biometric data and entered data from the registration database, then providing an indication of verification of the person to be verified, whereby the person to be verified is verified against the registration database record of the person registered. The biometric data may be captured by: a fingerprint scanner, a 4-4-2 fingerprint scanner, an image camera, an eye scanner, a digital signature touch pad, or a combination thereof. The biometric data may include: a fingerprint, a set of fingerprints, a facial image, an eye scan, an iris scan, a digital signature, or a combination thereof. The biometric registration and verification method may further comprise enhancing an image of the biometric data. The biometric registration and verification method may further comprise: testing at least one measurable characteristic of the identifying biometric data against one or more predetermined quality thresholds, wherein the one or more predetermined quality thresholds relate to measurable characteristics of fingerprint biometric data, facial image biometric data, iris image biometric data, and digital signature biometric data, or a combination thereof. The predetermined quality threshold for fingerprint biometric data may include at least one of: an area of a captured fingerprint image, a number of distinguishable fingerprint characteristics, a number of distinguishable fingerprint minutiae, a number of distinguishable fingerprint minutiae for each individual finger, a number of finger segments for a finger, or a combination thereof. At least one predetermined quality threshold for fingerprint biometric data may be different for different fingers and/or for a thumb. The biometric registration and verification method may further comprise: automatically changing at least one predetermined quality threshold for fingerprint biometric data by a predetermined amount if the quality threshold is not met after a predetermined number of repeated attempts. A predetermined quality threshold for facial image biometric data may include at least one of head tilt, facial completeness, an eye being open, an eye being closed, face size, or a combination thereof. The entered data may include: name data, address data, physical data, age data, gender data, birth date data, occupation data, location data, passport data, identity card data, or a combination thereof. The biometric registration and verification method may further comprise: printing a tangible record of a registration including all or part of the identifying biometric data, the entered data, or both. The biometric registration and verification method may be configured for conducting voter registration and voting, and the providing an indication of verification of the person to be verified may enable conducting a voting session and generating a unique randomized voting session identifier, and storing voting selections made in the voting session in association with the voting session identifier. The voting session identifier preferably is not related to and cannot be related to the identity or registration of the person registered or of the person to be verified. The biometric registration and verification method may further comprise printing a ballot sheet having the voting selections made in the voting session and the voting session identifier printed thereon. The captured biometric data may comprise: fingerprint images, 4-4-2 fingerprint images, enhanced fingerprint images, fingerprint minutiae points, or a combination thereof, and wherein the computer processor compares captured biometric data for each fingerprint with the biometric data captured for all previous fingerprints for identifying duplicate registrations. The biometric registration and verification method may include: de-duplicating the captured biometric data; or communicating the captured biometric data to a regional and/or central database, and de-duplicating the regional and/or central database; or de-duplicating the captured biometric data, communicating the captured biometric data to a regional and/or central database and de-duplicating the regional and/or central database. The captured biometric data may include fingerprint biometric data, may further comprise testing the fingerprint biometric data for a minimum fingerprint area, for minimum minutiae points, for a number of finger segments, for finger spacing, for finger order, or for any combination thereof. The minimum fingerprint area, the minimum minutiae points, the number of finger segments, the finger spacing, the finger order, or any combination thereof are different for different fingers and/or for thumbs. The biometric registration and verification method may further comprise: providing a biometric registration device including one or more biometric sensors, a data entry device, and a computer processor, the biometric registration device optionally including: an uninterruptible power supply, or an external power source, or a solar power source, or a barcode scanner, or an RFID reader, or an RFID writer, or a document scanner, or a signature digitizer, or any combination thereof.

A biometric registration system may comprise: a biometric sensor for capturing identifying biometric data of a person to be registered; a data entry device for receiving entered data; a computer processor configured for receiving captured identifying biometric data and entered data; the computer processor testing whether the received captured identifying biometric data satisfies predetermined quality thresholds and for a predetermined number of minutiae; and a registration database for storing registration records representing the tested satisfactory identifying biometric data and the entered data for the person to be registered, wherein the tested satisfactory identifying biometric data of the person to be registered is related to the entered data in the database registration record thereof; whereby the person to be registered is registered according to the stored registration record if the tested identifying biometric data satisfies the predetermined quality thresholds. The biometric sensor may include: a fingerprint scanner, a 4-4-2 fingerprint scanner, an image camera, an eye scanner, a digital signature touch pad, or a combination thereof. The biometric data may include: a fingerprint, a set of fingerprints, a facial image, an eye scan, an iris scan, a digital signature, or a combination thereof. The computer processor may enhance an image of the biometric data. The predetermined quality thresholds may relate to measurable characteristics of fingerprint biometric data, facial image biometric data, iris image biometric data, and digital signature biometric data, or a combination thereof. The predetermined quality thresholds for fingerprint biometric data may include an area of a captured fingerprint image, a number of distinguishable fingerprint characteristics, a number of finger segments for a finger, or a combination thereof; or the predetermined number of minutiae may include a number of distinguishable fingerprint minutiae or a number of distinguishable fingerprint minutiae for each individual finger; or the predetermined quality thresholds for fingerprint biometric data may include an area of a captured fingerprint image, a number of distinguishable fingerprint characteristics, a number of finger segments for a finger, or a combination thereof, and the predetermined number of minutiae may include a number of distinguishable fingerprint minutiae or a number of distinguishable fingerprint minutiae for each individual finger.

A biometric registration method may comprise: capturing identifying biometric data of a person to be registered; receiving entered data; receiving captured identifying biometric data; testing whether the received captured identifying biometric data satisfies predetermined quality thresholds and for a predetermined number of minutiae; storing registration records representing the tested satisfactory identifying biometric data and the entered data for the person to be registered in a database; and relating the tested satisfactory identifying biometric data of the person to be registered to the entered data in the database registration record thereof; whereby the person to be registered is registered according to the stored registration record if the tested identifying biometric data satisfies the predetermined quality thresholds. The biometric data may be captured by: a fingerprint scanner, a 4-4-2 fingerprint scanner, an image camera, an eye scanner, a digital signature touch pad, or a combination thereof. The biometric data may include: a fingerprint, a set of fingerprints, a facial image, an eye scan, an iris scan, a digital signature, or a combination thereof. The biometric registration method may further comprise enhancing an image of the biometric data. The predetermined quality thresholds may relate to measurable characteristics of fingerprint biometric data, facial image biometric data, iris image biometric data, and digital signature biometric data, or a combination thereof. The predetermined quality thresholds for fingerprint biometric data may include an area of a captured fingerprint image, a number of distinguishable fingerprint characteristics, a number of finger segments for a finger, or a combination thereof; or the predetermined number of minutiae may include a number of distinguishable fingerprint minutiae or a number of distinguishable fingerprint minutiae for each individual finger; or the predetermined quality thresholds for fingerprint biometric data may include an area of a captured fingerprint image, a number of distinguishable fingerprint characteristics, a number of finger segments for a finger, or a combination thereof, and the predetermined number of minutiae may include a number of distinguishable fingerprint minutiae or a number of distinguishable fingerprint minutiae for each individual finger.

A biometric verification system may comprise: a registration database storing registration records representing identifying biometric data and entered data for a registered person; a biometric sensor for capturing verification biometric data of a person to be verified; a data entry device for receiving entered verification data relating to the person to be verified; a computer processor configured to receive captured verification biometric data and entered verification data, and for testing whether the received captured verification biometric data satisfies predetermined quality thresholds and for a predetermined number of minutiae; and if the tested satisfactory verification biometric data and the received verification data of the person to be verified corresponds to identifying biometric data and entered data from the registration database, then providing an indication of verification of the person to be verified; whereby the person to be verified is verified against the registration database record of the person registered. The tested satisfactory verification biometric data and the received verification data of the person to be verified may be compared with the identifying biometric data and entered data from the registration database. The biometric sensor may include: a fingerprint scanner, a 4-4-2 fingerprint scanner, an image camera, an eye scanner, an iris scanner, a digital signature touch pad, or a combination thereof. The predetermined quality thresholds may relate to measurable characteristics of fingerprint biometric data, facial image biometric data, iris image biometric data, and digital signature biometric data, or a combination thereof. At least one predetermined quality threshold for fingerprint biometric data may automatically be changed by a predetermined amount if the quality threshold is not met after a predetermined number of repeated attempts. The entered data may include: name data, address data, physical data, age data, gender data, birth date data, occupation data, location data, passport data, identity card data, or a combination thereof.

A biometric verification method may comprise: accessing a database of registration records representing identifying biometric data and entered data for a person to be verified, wherein the identifying biometric data of the person registered is related to the entered data in the database registration record thereof; capturing verification biometric data of a person to be verified; receiving entered verification data; testing whether the captured verification biometric data satisfies predetermined quality thresholds and for a predetermined number of minutiae; comparing the tested satisfactory verification biometric data and the received verification data of the person to be verified with the identifying biometric data and entered data from the registration database; and if the tested satisfactory verification biometric data and the received verification data of the person to be verified corresponds to identifying biometric data and entered data from the registration database, then providing an indication of verification of the person to be verified; whereby the person to be verified is verified against the registration database record of the person registered. The biometric data may include: a fingerprint, a set of fingerprints, a facial image, an eye scan, an iris scan, a digital signature, or a combination thereof. The predetermined quality thresholds may relate to measurable characteristics of fingerprint biometric data, facial image biometric data, iris image biometric data, and digital signature biometric data, or a combination thereof. The entered verification data may include: name data, address data, physical data, age data, gender data, birth date data, occupation data, location data, passport data, identity card data, or a combination thereof. The captured verification biometric data may comprise: fingerprint images, 4-4-2 fingerprint images, enhanced fingerprint images, fingerprint minutiae points, or a combination thereof, and the computer processor may compare captured biometric data for each fingerprint with the biometric data captured for all previous fingerprints for identifying duplicate registrations.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate"whether or not expressly stated to be such. It is noted that embodiments of very different sizes, shapes and dimensions may employ the described arrangements.

Further, what is stated as being "optimum" or "deemed optimum" may or may not be a true optimum condition, but is the condition deemed to be desirable or acceptably "optimum" by virtue of its being selected in accordance with the decision rules and/or criteria defined by the designer and/or applicable controlling function, e.g., the number of minutiae and/or other quality limits for biometric data, and the like, The term battery is used herein to refer to an electrochemical device comprising one or more electro-chemical cells and/or fuel cells, and so a battery may include a single cell or plural cells, whether as individual units or as a packaged unit. A battery is one example of a type of an electrical power source suitable for a portable device. Other devices could include fuel cells, super capacitors, solar cells, and the like.

In the drawing, paths for analog signals and for digital signals are generally shown as single lines and single line arrows, and as broad arrows. A diagonal slash across a single line arrow or a broad arrow accompanied by a number nearby may be used to indicate the number of bits of the digital signals passing along the path indicated thereby.

It is noted that while data acquired and/or stored, e.g., in a database, may be referred to as "numbers," each may include numerical, alphabetic, alpha-numeric and other characters and symbols, conventional or arbitrary, as may be desired. Information is typically represented and/or stored in a memory in accordance with a predetermined formula or algorithm or other scheme, either on a character by character basis or on the basis of one or more combinations of the characters or values, for example, binary, binary coded decimal, hexadecimal, or any other digital coding representation thereof. A parity or check number or code, if any, may likewise be representative of the information represented or stored in accordance with a predetermined formula or algorithm or other scheme, either on a character by character basis or on the basis of one or more combinations of the characters or values stored. Suitable formula and algorithms therefor include, for example, binary, binary coded decimal, other digital coding representations thereof, parity checks or other parity representations, sum checks, field relationship checks or any other predetermined relationship between the stored data or information and the parity or check number or code.

The present arrangement can be and preferably is at least in part embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the process or processes. Storage media for containing such computer program include, for example, floppy disks and diskettes, compact disk (CD)-ROMs (whether or not writeable), DVD digital disks, RAM and ROM memories, computer hard drives and back-up drives, external hard drives, "thumb" drives, and any other storage medium readable by a computer. The process or processes can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the process or processes. The process or processes may be implemented on a general purpose microprocessor or on a digital processor specifically configured to practice the process or processes. When a general-purpose microprocessor is employed, the computer program code configures the circuitry of the microprocessor to create specific logic circuit arrangements. Storage medium readable by a computer includes medium being readable by a computer per se or by another machine that reads the computer instructions for providing those instructions to a computer for controlling its operation. Such machines may include, for example, a punched card reader, a magnetic tape reader, a magnetic card reader, a memory card reader, an optical scanner, as well as machines for reading the storage media mentioned above.

It is noted that various data, sensor values and alarm values may represent actual physical conditions of different places and/or different equipment and/or different parts of an installation, article, vessel and/or other place, e.g., generally local conditions, that may be transformed by the system and method described herein to provide a representation of the overall state and/or condition of the installation, article, vessel and/or place, e.g. a representation of the complete installation, vessel, article and/or place. That representation may be transformative of a representation of a nominal overall state and/or condition thereof, e.g., in a prior or different condition and/or time, to a representation of an actual overall state and/or condition thereof, e.g., in a present or more recent or otherwise different condition and/or time. Further, the system and method may generate tasks and commands that are executed to transform the installation, vessel, article and/or place into a different configuration, i.e. into a different installation, vessel, article and/or place, and a representation of that different configuration is provided or displayed, e.g., to human operators. The system described herein may include one or more general purpose and/or special purpose computers, or microprocessors or other processors, and the method described herein may be performed in part by one or more general purpose and/or special purpose computers, or microprocessors or other processors.

As used herein, image and/or information may be used interchangeably with respect to what is captured by an imaging device and/or displayed on a display device, and are intended to encompass any and all of the wide variety of devices that a user may desire, including, but not limited to, visual images and pictures, whether still or moving, whether captured and/or generated by a camera, computer or any other source, whether true, representative or abstract or arbitrary, whether or not including symbols or characters such as alphanumeric characters or mathematical notations, whether captured and/or displayed in black and white, monochrome, polychrome or full color.

While the present invention has been described in terms of the foregoing example embodiments, variations within the scope and spirit of the present invention as defined by the claims following will be apparent to those skilled in the art. For example, the BVR unit, system and method described herein may be employed for identification and/or verification of persons presenting themselves to participate, e.g., to register to vote, and for capturing records of the biometric data of such persons, without being employed for receiving the vote, e.g., ballots. Ordinary paper ballots or copy-evident ballots may be employed, whether hand marked or marked by printing on copy evident paper, with conventional and/or electronic ballot boxes that scan, decode and record the voting selections thereon.

Further, the BVR unit, system and method described may be employed with direct recording electronic (DRE) voting machines, including voter verified paper audit trail (VVPAT) DRE voting machines, wherein the registration and verification of voters as described herein provides biometric identification and/or verification for the DRE and/or DRE-VVPAT voting machines.

The system and method described herein are suitable for use with regular voting, absentee voting (in issuing absentee ballots), early voting, extended voting, remote voting, and any other form of voting as may be desired to have enhanced security, verification and auditability through biometric registration and verification.

The registration system and method described herein are suitable for use with registration for regular voting, absentee voting (in issuing absentee ballots), early voting, extended voting, remote voting, and any other form of voting as may be desired to have enhanced security, verification and auditability through biometric registration and verification.

In addition to hashing and encrypting, other security and authentication enhancing techniques, e.g., authentication marks, tracking numbers, relational and other check codes, as may be desired. Further records of voting sessions and/or vote selections may be automatically scrambled by scrambling software so that the order in which the voting sessions occurred, which could at least point to one or more persons who likely cast a particular vote, can not be reconstructed from the order in which the votes are stored.

Still further, databases for registration, verified voters, voting records, event logs and asset management, are preferably maintained separately and independently of each other. Further, stored data is preferably stored on three different media—a hard drive which is a magnetic storage device, a flash drive which is an electronic (integrated circuit) memory device, and a printed paper record—for security against loss, damage and/or alteration.

Each of the U.S. Provisional Patent Applications, U.S. Patent Applications, and/or U.S. patents identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:
1. A biometric registration system comprising:
a biometric sensor for capturing identifying biometric data of a person to be registered;
a data entry device for receiving entered data;
a computer processor configured for receiving captured identifying biometric data and entered data;
said computer processor testing whether the received captured identifying biometric data satisfies predetermined quality thresholds and for a predetermined number of minutiae;
wherein the testing for predetermined quality thresholds for fingerprint biometric data includes testing for an area of a captured fingerprint image, for a number of distinguishable fingerprint characteristics, for a number of finger segments for a finger, or for a combination thereof, and
wherein the testing for predetermined quality thresholds for facial image biometric data include testing for head tilt, for facial completeness, for an eye being open, for an eye being closed, for face size, or for a combination thereof; and
a registration database coupled to the computer processor for storing registration records representing the tested satisfactory identifying biometric data and the entered data for the person to be registered, wherein the tested satisfactory identifying biometric data of the person to be registered is related to the entered data in the database registration record thereof;
whereby the person to be registered is registered according to the stored registration record when the tested identifying biometric data satisfies the predetermined quality thresholds and the predetermined number of minutiae.

2. The biometric registration system of claim 1 wherein the biometric sensor includes: a fingerprint scanner, a 4-4-2 fingerprint scanner, an image camera, an eye scanner, an iris scanner, a digital signature touch pad, or a combination thereof.

3. The biometric registration system of claim 1 wherein the biometric data includes: a fingerprint, a set of fingerprints, a facial image, an eye scan, an iris scan, a digital signature, or a combination thereof.

4. The biometric registration system of claim 1 wherein the predetermined quality thresholds relate to measurable characteristics of fingerprint biometric data, facial image biometric data, iris image biometric data, and digital signature biometric data, or a combination thereof.

5. The biometric registration system of claim 1 wherein:
the predetermined number of minutiae includes a number of distinguishable fingerprint minutiae or a number of distinguishable fingerprint minutiae for each individual finger.

6. The biometric registration system of claim 5 wherein at least one predetermined quality threshold for fingerprint biometric data is different for different fingers and/or for a thumb.

7. The biometric registration system of claim 5 wherein at least one predetermined quality threshold for fingerprint biometric data is automatically changed by a predetermined amount if the quality threshold is not met after a predetermined number of repeated attempts.

8. The biometric registration system of claim 1 wherein the entered data includes: name data, address data, physical data, age data, gender data, birth date data, occupation data, location data, passport data, identity card data, or a combination thereof.

9. The biometric registration system of claim 1 further comprising:
a printer providing a tangible record of a registration including all or part of the identifying biometric data, the entered data, or both.

10. The biometric registration system of claim 1 wherein said computer processor generates a unique randomized identifier for a registration record and wherein that unique randomized identifier is associated and stored with the registration record.

11. The biometric registration system of claim 1 wherein:
the captured biometric data is de-duplicated; or
the captured biometric data is communicated to a regional and/or central database, and the regional and/or central database is de-duplicated; or
the captured biometric data is de-duplicated and is communicated to a regional and/or central database and the regional and/or central database is de-duplicated.

12. The biometric registration system of claim 1 wherein the captured biometric data includes fingerprint biometric data and wherein the fingerprint biometric data:
is tested for a minimum fingerprint area, for minimum minutiae points, for a number of finger segments, for finger spacing, for finger order, or for any combination thereof; or
is tested for a minimum fingerprint area, for minimum minutiae points, for a number of finger segments, for finger spacing, for finger order, or for any combination thereof, and wherein the minimum fingerprint area, the minimum minutiae points, the number of finger segments, the finger spacing, the finger order, or any combination thereof are different for different fingers and/or for thumbs.

13. A biometric registration method comprising:
capturing identifying biometric data of a person to be registered;
receiving entered data;
receiving captured identifying biometric data;
testing whether the received captured identifying biometric data satisfies predetermined quality thresholds and for a predetermined number of minutiae;
wherein the testing for predetermined quality thresholds for fingerprint biometric data include testing for an area of a captured fingerprint image, for a number of distinguishable fingerprint characteristics, for a number of finger segments for a finger, or for a combination thereof, and
wherein the testing for predetermined quality thresholds for facial image biometric data include testing for head tilt, for facial completeness, for an eye being open, for an eye being closed, for face size, or for a combination thereof; and
storing registration records representing the tested satisfactory identifying biometric data and the entered data for the person to be registered in a database, and
relating the tested satisfactory identifying biometric data of the person to be registered to the entered data in the database registration record thereof;
whereby the person to be registered is registered according to the stored registration record when the tested identifying biometric data satisfies the predetermined quality thresholds and the predetermined number of minutiae.

14. The biometric registration method of claim 13 wherein the biometric data includes: a fingerprint, a set of fingerprints, a facial image, an eye scan, an iris scan, a digital signature, or a combination thereof.

15. The biometric registration method of claim 13 wherein:
the predetermined number of minutiae includes a number of distinguishable fingerprint minutiae or a number of distinguishable fingerprint minutiae for each individual finger.

16. The biometric registration method of claim 13 further comprising:
automatically changing at least one predetermined quality threshold for fingerprint biometric data by a predetermined amount if the quality threshold is not met after a predetermined number of repeated attempts.

17. The biometric registration method of claim 13 wherein the entered data includes: name data, address data, physical data, age data, gender data, birth date data, occupation data, location data, passport data, identity card data, or a combination thereof.

18. The biometric registration method of claim 13 further comprising:
printing a tangible record of a registration including all or part of the identifying biometric data, the entered data, or both.

19. The biometric registration method of claim 13 further comprising generating a unique randomized identifier for a registration record, and storing the unique randomized identifier in association with that registration record.

20. The biometric registration method of claim 13 further comprising:
de-duplicating the captured biometric data; or communicating the captured biometric data to a regional and/or central database, and de-duplicating the regional and/or central database; or de-duplicating the captured biometric data, communicating the captured biometric data to a regional and/or central database and de-duplicating the regional and/or central database.

21. The biometric registration method of claim 13 wherein the captured biometric data includes fingerprint biometric data, further comprising testing the fingerprint biometric data for a minimum fingerprint area, for minimum minutiae points, for a number of finger segments, for finger spacing, for finger order, or for any combination thereof.

22. A biometric verification system comprising:
a registration database storing registration records representing identifying biometric data and entered data for a registered person;
a biometric sensor for capturing verification biometric data of a person to be verified;
a data entry device for receiving entered verification data relating to the person to be verified;
a computer processor configured to receive captured verification biometric data and entered verification data, and for testing whether the received captured verification biometric data satisfies predetermined quality thresholds and for a predetermined number of minutiae;
wherein the testing for predetermined quality thresholds for fingerprint biometric data include testing for an area of a captured fingerprint image, for a number of distinguishable fingerprint characteristics, for a number of finger segments for a finger, or for a combination thereof, and
wherein the testing for predetermined quality thresholds for facial image biometric data include testing for head tilt, for facial completeness, for an eye being open, for an eye being closed, for face size, or for a combination thereof; and
wherein the tested satisfactory verification biometric data and the received verification data of the person to be verified are compared with the identifying biometric data and entered data from the registration database; and
when the tested satisfactory verification biometric data and the received verification data of the person to be verified corresponds to identifying biometric data and entered data from the registration database, then providing an indication of verification of the person to be verified;
whereby the person to be verified is verified against the registration database record of the person registered when the received captured verification biometric data satisfies predetermined quality thresholds and the predetermined number of minutiae.

23. The biometric verification system of claim 22 wherein the biometric sensor includes: a fingerprint scanner, a 4-4-2 fingerprint scanner, an image camera, an eye scanner, an iris scanner, a digital signature touch pad, or a combination thereof.

24. The biometric verification system of claim 22 wherein the predetermined quality thresholds relate to measurable characteristics of fingerprint biometric data, facial image biometric data, iris image biometric data, and digital signature biometric data, or a combination thereof.

25. The biometric verification system of claim 22 wherein at least one predetermined quality threshold for fingerprint biometric data is automatically changed by a predetermined amount if the quality threshold is not met after a predetermined number of repeated attempts.

26. The biometric verification system of claim 22 wherein the entered data includes: name data, address data, physical data, age data, gender data, birth date data, occupation data, location data, passport data, identity card data, or a combination thereof.

27. A biometric verification method comprising:
accessing a database of registration records representing identifying biometric data and entered data for a person to be verified, wherein the identifying biometric data of the person registered is related to the entered data in the database registration record thereof;
capturing verification biometric data of a person to be verified;
receiving entered verification data;
testing whether the captured verification biometric data satisfies predetermined quality thresholds and for a predetermined number of minutiae;
wherein the testing for predetermined quality thresholds for fingerprint biometric data include testing for an area of a captured fingerprint image, for a number of distinguishable fingerprint characteristics, for a number of finger segments for a finger, or for a combination thereof, and
wherein the testing for predetermined quality thresholds for facial image biometric data include testing for head tilt, for facial completeness, for an eye being open, for an eye being closed, for face size, or for a combination thereof;
comparing the tested satisfactory verification biometric data and the received verification data of the person to be verified with the identifying biometric data and entered data from the registration database; and
when the tested satisfactory verification biometric data and the received verification data of the person to be verified corresponds to identifying biometric data and entered data from the registration database, then providing an indication of verification of the person to be verified;
whereby the person to be verified is verified against the registration database record of the person registered when the captured verification biometric data satisfies predetermined quality thresholds and the predetermined number of minutiae.

28. The biometric verification method of claim 27 wherein the biometric data includes: a fingerprint, a set of fingerprints, a facial image, an eye scan, an iris scan, a digital signature, or a combination thereof.

29. The biometric verification method of claim 27 wherein the predetermined quality thresholds relate to measurable characteristics of fingerprint biometric data, facial image biometric data, iris image biometric data, and digital signature biometric data, or a combination thereof.

30. The biometric verification method of claim 27 wherein the entered verification data includes: name data, address data, physical data, age data, gender data, birth date data, occupation data, location data, passport data, identity card data, or a combination thereof.

31. The biometric verification method of claim 27 wherein the captured verification biometric data comprises: fingerprint images, 4-4-2 fingerprint images, enhanced fingerprint images, fingerprint minutiae points, or a combination thereof, and wherein the computer processor compares captured biometric data for each fingerprint with the biometric data captured for all previous fingerprints for identifying duplicate registrations.

* * * * *